(12) United States Patent
Bodoin

(10) Patent No.: US 12,431,480 B2
(45) Date of Patent: Sep. 30, 2025

(54) METHODS FOR FORMING AN ENERGY STORAGE DEVICE

(71) Applicant: Pure Lithium Corporation, Charlestown, MA (US)

(72) Inventor: Emilie Bodoin, Charlestown, MA (US)

(73) Assignee: PURE LITHIUM CORPORATION, Charlestown, MA (US)

( * ) Notice: Subject to any disclaimer, the term of this patent is extended or adjusted under 35 U.S.C. 154(b) by 0 days.

(21) Appl. No.: 18/824,719

(22) Filed: Sep. 4, 2024

(65) Prior Publication Data
US 2025/0006886 A1   Jan. 2, 2025

Related U.S. Application Data

(63) Continuation-in-part of application No. 17/581,517, filed on Jan. 21, 2022, now Pat. No. 12,100,828, and
(Continued)

(51) Int. Cl.
*H01M 4/04*     (2006.01)
*C25D 1/04*     (2006.01)
(Continued)

(52) U.S. Cl.
CPC ............ *H01M 4/0452* (2013.01); *C25D 1/04* (2013.01); *C25D 1/20* (2013.01); *C25D 5/611* (2020.08);
(Continued)

(58) Field of Classification Search
None
See application file for complete search history.

(56) References Cited

U.S. PATENT DOCUMENTS

| | | |
|---|---|---|
| 3,909,202 A | 9/1975 | Becker et al. |
| 3,953,234 A | 4/1976 | Hoffmann |

(Continued)

FOREIGN PATENT DOCUMENTS

| | | |
|---|---|---|
| CN | 110474053 A | 11/2019 |
| EP | 3547416 A1 | 10/2019 |

(Continued)

OTHER PUBLICATIONS

Aetukuri, N.B. et al., Flexible Ion-Conducting Composite Membranes for Lithium Batteries. Advanced Energy Materials 5:1500265, 6 pages (2015).

(Continued)

*Primary Examiner* — Stefanie S Wittenberg
(74) *Attorney, Agent, or Firm* — WILSON SONSINI GOODRICH & ROSATI

(57) ABSTRACT

Methods are proposed for manufacturing dendrite-resistant lithium metal electrodes suitable for incorporation into lithium metal batteries. In an embodiment, the method involves first electroplating a copper sheet onto a surface of a single crystal of silicon, the silicon being doped to form a p-type or an n-type semiconductor, and then further electroplating the copper sheet with lithium metal. The lithium-electroplated copper sheet thus manufactured provides a lithium electrode that is resistant to dendrite formation during cycling of lithium metal batteries when compared to conventionally manufactured lithium electrodes. Methods are further provided of manufacturing lithium sheets by directly electroplating lithium metal onto single crystals of doped silicon, the lithium sheets configured for incorporation into lithium metal electrodes that are resistant to dendrite formation during cycling of lithium metal batteries.

29 Claims, 17 Drawing Sheets

Related U.S. Application Data a continuation-in-part of application No. 18/236,257, filed on Aug. 21, 2023, which is a continuation-in-part of application No. 18/101,261, filed on Jan. 25, 2023, which is a continuation of application No. 17/006,048, filed on Aug. 28, 2020, now Pat. No. 11,588,146, said application No. 18/236,257 is a continuation-in-part of application No. 17/006,073, filed on Aug. 28, 2020, now Pat. No. 12,027,691.

(60) Provisional application No. 63/143,178, filed on Jan. 29, 2021.

(51) Int. Cl.
| | |
|---|---|
| *C25D 1/20* | (2006.01) |
| *C25D 5/00* | (2006.01) |
| *H01M 4/134* | (2010.01) |
| *H01M 4/1395* | (2010.01) |
| *C25D 5/10* | (2006.01) |
| *C25D 5/12* | (2006.01) |
| *H01M 4/02* | (2006.01) |

(52) U.S. Cl.
CPC ......... *H01M 4/134* (2013.01); *H01M 4/1395* (2013.01); *C25D 5/10* (2013.01); *C25D 5/12* (2013.01); *H01M 2004/021* (2013.01); *H01M 2004/027* (2013.01)

(56) References Cited

U.S. PATENT DOCUMENTS

| | | | |
|---|---|---|---|
| 4,009,052 A | 2/1977 | Whittingham | |
| 4,405,416 A | 9/1983 | Raistrick et al. | |
| 4,546,055 A | 10/1985 | Coetzer et al. | |
| 4,781,756 A | 11/1988 | Frianeza-Kullberg et al. | |
| 5,558,953 A | 9/1996 | Matsui et al. | |
| 8,501,339 B2 | 8/2013 | Visco et al. | |
| 8,999,571 B2 | 4/2015 | Chiang et al. | |
| 9,048,507 B2 | 6/2015 | Eitouni et al. | |
| 9,246,159 B2 | 1/2016 | Bahr et al. | |
| 9,520,627 B2 | 12/2016 | Aetukuri et al. | |
| 9,705,167 B2 | 7/2017 | Khiterer et al. | |
| 10,074,839 B2 | 9/2018 | Hammond-Cunningham et al. | |
| 10,090,564 B2 | 10/2018 | Chung et al. | |
| 10,177,366 B2 | 1/2019 | Swonger et al. | |
| 10,256,448 B2 | 4/2019 | Cui et al. | |
| 11,145,851 B2 | 10/2021 | Cui et al. | |
| 11,251,430 B2 | 2/2022 | Siu et al. | |
| 11,453,948 B2 | 9/2022 | Gallant et al. | |
| 11,588,146 B2 | 2/2023 | Bodoin | |
| 12,027,691 B2 | 7/2024 | Bodoin | |
| 12,100,828 B2 | 9/2024 | Sadoway | |
| 12,188,140 B2 | 1/2025 | Jastrzebski | |
| 12,188,141 B2 | 1/2025 | Jastrzebski | |
| 2001/0041294 A1 | 11/2001 | Chu et al. | |
| 2002/0069278 A1 | 6/2002 | Forslöw | |
| 2002/0069282 A1 | 6/2002 | Reisman | |
| 2005/0191545 A1 | 9/2005 | Bowles et al. | |
| 2009/0272650 A1* | 11/2009 | Kakuta ................... H01M 4/13 204/243.1 |
| 2013/0177798 A1 | 7/2013 | Ueda | |
| 2013/0236764 A1 | 9/2013 | Hu et al. | |
| 2014/0170303 A1 | 6/2014 | Rayner et al. | |
| 2015/0014184 A1 | 1/2015 | Swonger | |
| 2016/0351889 A1 | 12/2016 | Swonger et al. | |
| 2017/0271639 A1 | 9/2017 | Yoshima et al. | |
| 2018/0097221 A1 | 4/2018 | Swonger et al. | |
| 2018/0198170 A1 | 7/2018 | Fujita et al. | |
| 2018/0371632 A1 | 12/2018 | Bodoin et al. | |
| 2019/0036165 A1 | 1/2019 | Zhamu et al. | |
| 2019/0048483 A1 | 2/2019 | Swonger et al. | |
| 2019/0051885 A1 | 2/2019 | Swonger et al. | |
| 2019/0194373 A1 | 6/2019 | Ma et al. | |
| 2019/0226108 A1 | 7/2019 | Swonger | |
| 2019/0245251 A1 | 8/2019 | Park et al. | |
| 2019/0260091 A1 | 8/2019 | Rho et al. | |
| 2019/0273258 A1 | 9/2019 | Thomas-Alyea et al. | |
| 2019/0348668 A1 | 11/2019 | Kim et al. | |
| 2019/0376198 A1 | 12/2019 | Dow et al. | |
| 2020/0002153 A1 | 1/2020 | Delmas et al. | |
| 2020/0086281 A1 | 3/2020 | Hryn et al. | |
| 2020/0087806 A1 | 3/2020 | Hryn et al. | |
| 2020/0091509 A1* | 3/2020 | Hryn ................... H01M 4/0452 |
| 2020/0136178 A1 | 4/2020 | Ku et al. | |
| 2020/0149174 A1 | 5/2020 | Swonger | |
| 2020/0203705 A1 | 6/2020 | Swonger et al. | |
| 2020/0203707 A1 | 6/2020 | Hellring et al. | |
| 2020/0220163 A1 | 7/2020 | Li et al. | |
| 2020/0274142 A1 | 8/2020 | Youn et al. | |
| 2021/0091433 A1 | 3/2021 | Hammond et al. | |
| 2021/0336274 A1 | 10/2021 | Jung et al. | |
| 2021/0381115 A1 | 12/2021 | Kang et al. | |
| 2022/0069278 A1 | 3/2022 | Bodoin | |
| 2022/0069282 A1 | 3/2022 | Bodoin | |
| 2022/0166021 A1 | 5/2022 | Siu et al. | |
| 2022/0223848 A1 | 7/2022 | Sadana | |
| 2022/0246901 A1 | 8/2022 | Sadoway | |
| 2022/0255057 A1 | 8/2022 | Sadoway | |
| 2022/0267918 A1 | 8/2022 | Jastrzebski et al. | |
| 2022/0367849 A1 | 11/2022 | Sadoway et al. | |
| 2022/0367874 A1 | 11/2022 | Sadoway et al. | |
| 2022/0393173 A1 | 12/2022 | Sadoway et al. | |
| 2022/0393234 A1 | 12/2022 | Sadoway et al. | |
| 2022/0416220 A1 | 12/2022 | Bobel et al. | |
| 2023/0102679 A1 | 3/2023 | Sadoway et al. | |
| 2023/0207779 A1 | 6/2023 | Bodoin | |
| 2023/0395779 A1 | 12/2023 | Bodoin | |
| 2025/0070115 A1 | 2/2025 | Sadoway | |
| 2025/0105248 A1 | 3/2025 | Bodoin | |

FOREIGN PATENT DOCUMENTS

| | | |
|---|---|---|
| GB | 2526312 A | 11/2015 |
| JP | 6866289 B2 | 4/2021 |
| KR | 20160052323 A | 5/2016 |
| WO | WO-9816960 A2 | 4/1998 |
| WO | WO-0005774 A1 | 2/2000 |
| WO | WO-2016007761 A1 | 1/2016 |
| WO | WO-2019018386 A1 | 1/2019 |
| WO | WO-2022046327 A1 | 3/2022 |
| WO | WO-2022046328 A1 | 3/2022 |
| WO | WO-2022173578 A1 | 8/2022 |
| WO | WO-2022240696 A1 | 11/2022 |
| WO | WO-2022240768 A1 | 11/2022 |
| WO | WO-2022256685 A1 | 12/2022 |
| WO | WO-2022256692 A1 | 12/2022 |
| WO | WO-2023049353 A2 | 3/2023 |
| WO | WO-2024054984 A1 | 3/2024 |

OTHER PUBLICATIONS

Bertrand, M. et al., Compatibility assessment of solid ceramic electrolytes and active materials based on thermal dilatation for the development of solid-state batteries, Material Advances 2:2989-2999 (2021).

Bian, P. et al., Rediscovering Silicones: The Anomalous Water Permeability of 'Hydrophobic' PDMS Suggests Nanostructure and Applications in Water Purification and Anti-Icing, Macromolecular Rapid Communications 42(5) (2021), abstract only, https://onlinelibrary.wiley.com/doi/abs/10.1002/marc.202000682.

Cai, H. et al., Microstructure and ionic conductivities of NASICON-type Li1.3Al0.3Ti1.7(PO4)3 solid electrolytes produced by cold sintering assisted process. Journal of Alloys and Compounds 939:168702 (pp. 1-12) (2023).

Choudhury et al., A Highly Reversible Room-Temperature Lithium Metal Battery Based on Crosslinked Hairy Nanoparticles. Nature Communications 6:10101, 9 pages (Dec. 2015).

Choudhury et al., Designer Interphases for the Lithium-Oxygen Electrochemical Cell. Sci. Adv., 3(4):e1602809 (pp. 1-17) (Apr. 19, 2017).

(56) References Cited

OTHER PUBLICATIONS

Choudhury et al., Electroless Formation of Hybrid Lithium Anodes for Fast Interfacial Ion Transport. Agnew. Chem. Int. Ed. 56:13070-13077 (2017).
Conway, B. et al., Flexible Lithium-Ion Conducting Composite Electrolyte. Batteries and Supercaps 3:653-657 (2020) (Abstract Only) https://chemistry-europe.onlinelibrary.wiley.com/doi/10.1002/batt.201900212.
Gannett et al., Cross-Linking Effects on Performance Metrics of Phenazine-Based Polymer Cathodes. ChemSusChem 13:2428-2435 (2020).
Harry et al., Detection of Subsurface Structures Underneath Dendrites Formed on Cycled Lithium Metal Electrodes. Nature materials 13:69-73 (2014).
Jiang, W. et al., Improvement of the Interface between the Lithium Anode and a Garnet-Type Solid Electrolyte of Lithium Batteries Using an Aluminum-Nitride Layer, Nanomaterials 12:2023 (pp. 1-12) (2022).
Lacivita, V. et al., Structural and Compositional Factors That Control the Li-Ion Conductivity in LiPON Electrolytes, Chemistry of Materials 30:7077-7090 (2018).
Lee et al., Dendrite-Free Lithium Deposition for Lithium Metal Anodes with Interconnected Microsphere Protection. Them. Mater., 29:5906-5914 (2017).
Mashtalir et al., High-Purity Lithium Metal Films from Aqueous Mineral Solutions. ACS Omega 3:181-187 (2018).
Molenda, J. et al., Structural, Transport and Electrochemical Properties of LifePO4 Substituted in Lithium and Iron Sublattices (Al, Zr, W, Mn, Co and Ni), Materials 6(5):1656-1687 (2013).
Mozammal Raju, M. et al., Crystal Structure and Preparation of Li7La3Zr2O12 (LLZO) Solid-State Electrolyte and Doping Impacts on the Conductivity: An Overview, Electrochem 2:390-414 (2021).
MSE Supplies, We Enable Innovation, MSE PRO Solid Electrolyte LATP 300 nm Poweder Lithium Aluminum Titanium Phosphate, https://www.msesupplies.com/products/ampcera-solid-electrolyte-latp-300-nm-powder-lithium-aluminum-titanium-phosphate?variant=31032808079418, last accessed on Nov. 2, 2023.
Nakajima et al., Lithium Ion Conductive Glass Ceramics: Properties and Application in Lithium Metal Batteries. Symposium on Energy Storage Beyond Lithium Ion, Oak Ridge National Laboratory (pp. 1-28) (Oct. 8, 2010).
Ohara, Inc., Lithium Ion Conductive Glass Ceramics: Properties and Application in Lithium Metal Batteries, Symposium on Energy Storage Beyond Lithium Ion; Materials Perspective, Oct. 7-8, 2010, Oak Ridge National Laboratory, Kousuke Nakajima, 28 pages (Oct. 8, 2010).
Pan et al., A review of solid-slate lithium-sulfur battery: Ion transport and polysulfide chemistry. Energy Fuels 34:11942-11961 (Sep. 3, 2020).
Park, M. et al., A review of conduction phenomena in Li-ion batteries, Journal of Power Sources 195(24):7904-7929 (2010).
Qian et al. Dendrite-Free Li Deposition Using Trace-Amounts of Water as an Electrolyte Additive. Nano Energy 15:135-144 (2015).
Shi, et al. The Development of Vanadyl Phosphate Cathode Materials for Energy Storage Systems: A Review. Chemistry 26(37):8190-8204 (2020).
Sigma-Aldrich. Certificate of Analysis. Product Name: Lithium—ribbon, thickness × W 0.38 mm × 23 mm, 99.9% trace metals basis. Product No. 265985. Batch No. SHBM9629. Quality Release Date Jan. 22, 2021. Retrieved online Jul. 23, 2023 at URL: https://www.sigmaaldrich.com/certificates/COFA/26/265985/265985-BULK_SHBM9629_.pdf.
Sigma-Aldrich. Product Specification Sheet. Product Name: Lithium—ribbon, thickness × W 0.38 mm × 23 mm, 99.9% trace metals basis. Product No. 265985. Retrieved online Jul. 23, 2023 at URL: https://www.sigmaaldrich.com/specification-sheets/221/584/265985-BULK_ALDRICH_.pdf.
Siu, et al. Enabling multi-electron reaction of ε-VOPO4 to reach theoretical capacity for lithium-ion batteries. Chem Commun (Camb). 54(56):7802-7805. (2018).

Stalin et al., Designing Polymeric Interphases for Stable Lithium Metal Deposition. American Chemical Society 20(8):5749-5758 (Jun. 1, 2020).
Trapa et al., Block copolymer electrolytes synthesized by atom transfer radical polymerization for solid-slate, thin-film lithium batteries. Electrochemical and Solid State Letters 5:A85-A88 (Feb. 26, 2002).
Wang, M.J. et al., Mixed Electronic and Ionic Conduction Properties of Lithium Lanthanum Titanate, Advanced Functional Materials 30(10):1909140 (2020).
Whittingham, et al. Can Multielectron Intercalation Reactions Be the Basis of Next Generation Batteries? Acc Chem Res. 51(2):258-264 (Jan. 12, 1018).
Zhang, et al. Pushing the limit of 3d transition metal-based layered oxides that use both cation and anion redox for energy storage. Nat Rev Mater 7:522-540 (2022).
Zhang, T. et al., Aqueous Lithium/Air Rechargeable Batteries, Chemical Letters 40:668-673 (2011).
Zhao et al., Solid-State Polymer Electrolytes with In-Built Fast Interfacial Transport for Secondary Lithium Batteries. Nature Energy 4:365-373 (2019).
Co-pending U.S. Appl. No. 18/095,844, inventors Sadoway; Donald R. et al., filed on Jan. 11, 2023.
Co-pending U.S. Appl. No. 18/805,067, inventor Sadoway; Donald R., filed Aug. 14, 2024.
Dong, Yongteng. et al. Unveiling the adsorption tendency of film-forming additives to enable fast-charging hard carbon anodes with regulated Li plating. Energy & Environmental Science 17(7):2500-2511 (2024).
Fan, Huailin et al. Flower-like carbon cathode prepared via in situ assembly for Zn-ion hybrid supercapacitors. Carbon 180:254-264 (2021).
Gong, Huaxin et al. An emerging class of carbon materials: Synthesis and applications of carbon flowers. Matter 6(7):2206-2234 (2023).
Gong, Huaxin. et al. Carbon flowers as electrocatalysts for the reduction of oxygen to hydrogen peroxide. Nano Research 16(9):11556-11563 (2023).
Gong, Huaxin. et al. Fast-charging of hybrid lithium-ion/lithium-metal anodes by nanostructured hard carbon host. ACS Energy Letters 7(12):4417-4426 (2022).
Guo, Daying. et al. Controllable synthesis of highly uniform flower-like hierarchical carbon nanospheres and their application in high performance lithium-sulfur batteries. Journal of Materials Chemistry A 5(13):6245-6256 (2017).
PCT/US2021/042694 International Search Report and Written Opinion dated Nov. 4, 2021.
PCT/US2021/042696 International Search Report and Written Opinion dated Nov. 5, 2021.
PCT/US2022/028179 International Search Report and Written Opinion dated Sep. 5, 2022.
PCT/US2022/028380 International Search Report and Written Opinion dated Sep. 12, 2022.
PCT/US2022/032209 International Search Report and Written Opinion dated Oct. 14, 2022.
Tan, Suchong. et al. The progress of hard carbon as an anode material in sodium-ion batteries. Molecules 28(7):3134, 1-21 (2023).
Tsao, Yuchi. et al. A nickel-decorated carbon flower/sulfur cathode for lean-electrolyte lithium-sulfur batteries. Advanced Energy Materials 11(36):2101449, 1-8 (2021).
U.S. Appl. No. 17/006,048 Notice of Allowance dated Nov. 3, 2022.
U.S. Appl. No. 17/006,048 Office Action dated Apr. 7, 2022.
U.S. Appl. No. 17/006,073 Notice of Allowance dated Apr. 16, 2024.
U.S. Appl. No. 17/006,073 Office Action dated May 4, 2023.
U.S. Appl. No. 17/006,073 Office Action dated Nov. 10, 2022.
U.S. Appl. No. 17/581,517 Notice of Allowance dated Jun. 11, 2024.
U.S. Appl. No. 17/581,517 Notice of Allowance dated Jun. 5, 2024.
U.S. Appl. No. 17/738,798 Office Action dated Feb. 20, 2024.
U.S. Appl. No. 17/738,798 Office Action dated Jun. 12, 2024.
U.S. Appl. No. 17/738,798 Office Action dated Nov. 8, 2024.
U.S. Appl. No. 18/236,257 Office Action dated Jun. 18, 2024.

(56) References Cited

OTHER PUBLICATIONS

U.S. Appl. No. 18/236,257 Office Action dated Oct. 23, 2023.
Wang, Jun. et al. Intercalated Co (OH) 2-derived flower-like hybrids composed of cobalt sulfide nanoparticles partially embedded in nitrogen-doped carbon nanosheets with superior lithium storage. Journal of Materials Chemistry A 5(7):3628-3637 (2017).
Wang, Shuhui. et al. The application of hard carbon with internal quasi-lithium metal deposition in high-energy Li-ion/Li-metal hybrid batteries. Electrochimica Acta 468:143194, 1-11 (2023).
Yuan, Qiong. et al. Polysulfides anchoring and enhanced electrochemical kinetics of 3D flower-like FeS/carbon assembly materials for lithium-sulfur battery. Applied Surface Science 508:145286, 1-9 (2020).
Co-pending U.S. Appl. No. 18/657,599, inventor Bodoin; Emilie, filed May 7, 2024.
U.S. Appl. No. 17/738,798 Office Action dated Mar. 4, 2025.
U.S. Appl. No. 18/236,257 Office Action dated Dec. 27, 2024.
U.S. Appl. No. 18/942,105 Office Action dated Feb. 26, 2025.
U.S. Appl. No. 18/942,105 Office Action dated Jan. 26, 2025.
U.S. Appl. No. 18/236,257 Notice of Allowance dated Jun. 17, 2025.
U.S. Appl. No. 18/942,105 Office Action dated Apr. 10, 2025.

\* cited by examiner

METHODS FOR FORMING AN ENERGY STORAGE DEVICE

CROSS-REFERENCE

This patent application is a continuation-in-part of U.S. patents application Ser. Nos. 17/581,517, filed Jan. 21, 2022, now U.S. Pat. No. 12,100,828, issued Sep. 24, 2024, which claims priority to U.S. Provisional Patent Application No. 63/143,178, filed Jan. 29, 2021, and U.S. patent application Ser. No. 18/236,257, filed Aug. 21, 2023, which is a continuation-in-part of U.S. patents application Ser. Nos. 18/101,261, filed Jan. 25, 2023, which is a continuation of U.S. patent application Ser. No. 17/006,048, filed Aug. 28, 2020, now U.S. Patent No. 11,588,146, issued Feb. 21, 2023, and U.S. patent application Ser. No. 17/006,073, filed Aug. 28, 2020, now U.S. Pat. No. 12,027,691 each of which is incorporated herein by reference in its entirety.

BACKGROUND

Lithium metal batteries have intrinsically higher capacity than lithium-ion batteries, and are thus the preferred technology for primary batteries. However, rechargeable lithium metal batteries tend to form dendrites on the lithium metal electrode, which can short batteries, leading to reduced battery life and the potential for hazardous combustion.

Lithium metal electrodes comprise a flat electronically conductive substrate, typically copper, that functions as the current collector of the negative electrode, onto which lithium metal is deposited.

In part, dendrite formation results from a lack of uniform contact between the conductive substrate and electrolytically deposited lithium metal. If the lithium metal deposited is not in uniform contact with the conductive substrate, this can lead to an uneven distribution of current during the electrolytic process, which can in turn lead to an uneven distribution of deposited lithium, and eventually can promote dendrite formation. Microscopically smooth conductive surfaces provide more uniform contact, which should deter dendrite formation compared to macroscopically rough surfaces. A need exists for inexpensive methods to provide microscopically smooth conductive surfaces suitable for lithium metal batteries. A specific need exists for smooth copper surfaces for metal electrodes, and a particular need exists for microscopically smooth copper surfaces for lithium metal electrodes in rechargeable lithium metal batteries.

Lithium ion batteries (LIBs) dominate the lithium battery market. LIBs contain lithium which is only present in an ionic form. Such batteries have good charging density and can function effectively through multiple charge/discharge cycles. Lithium metal batteries (LMBs) by contrast, use non-ionic lithium metal at the negative electrode. During discharge of an LMB, lithium ions are released from this electrode, as electrons flow through an external circuit. As the LMB recharges, lithium ions are reduced back to lithium metal as electrons flow back into the negative electrode. Because LMBs have intrinsically higher capacity than LIBs, they are the preferred technology for primary batteries. Moreover, since LMBs can be manufactured in the fully charged state, they do not require the lengthy formation process needed for LIBs, which can take between 20-30 days. However, poor cycle life, volumetric expansion, and the tendency to form lithium metal dendrites, which can lead to violent combustion of LMBs, have limited their practical use as rechargeable batteries.

SUMMARY

According to an embodiment of the disclosure, a method of manufacturing a lithium metal electrode is disclosed that includes the steps of (1) obtaining a single crystal of silicon, doped to increase its electronic conductivity; (2) electroplating a conductive metal onto the surface of the single crystal of silicon, thereby forming a conductive metal substrate having a first face in contact with the single crystal of silicon and a second face, disposed opposite the first face, not in contact with the single crystal of silicon; (3) electroplating a layer of lithium metal onto the second face of the conductive metal substrate, thereby forming the lithium metal electrode comprising the conductive metal substrate and the layer of lithium metal.

In some embodiments, the arithmetic mean roughness Ra of the layer of lithium metal on the second face of the conductive metal substrate is a value less than 0.5 μm. In some embodiments, Ra is a value less than 0.2 μm. In some embodiments, Ra is a value less than 0.1 μm. In some embodiments, Ra is a value less than 0.05 μm.

According to a further embodiment, the conductive metal substrate is lifted from the surface of the single crystal of silicon prior to electroplating a layer of lithium on the first face of the conductive metal substrate and a layer of lithium on the second face of the conductive metal substrate.

In some embodiments, the arithmetic mean roughness Ra of the layer of lithium metal on the first face of the conductive metal substrate is a value less than 0.5 μm. In some embodiments, Ra is a value less than 0.2 μm. In some embodiments, Ra is a value less than 0.1 μm. In some embodiments, Ra is a value less than 0.05 μm.

In some embodiments, the conductive metal is chosen from a group consisting of copper, nickel, silver, gold, lead, cadmium, zinc, and tin. In some embodiments, the conductive metal is copper. In some embodiments, the conductive metal is an alloy. In some embodiments, the conductive metal is an alloy comprising two or more metals selected from the group consisting of copper, nickel, silver, gold, lead, cadmium, zinc, and tin. In some embodiments, the alloy is a stainless steel. In some embodiments, the stainless steel alloy includes iron, nickel, and chromium. In some embodiments, the conductive metal is an alloy comprising copper. In some embodiments, the conductive metal is an alloy comprising copper and one or more precious metals selected from the group consisting of gold, silver, platinum, and palladium. In some embodiments, the conductive metal is an alloy comprising copper and one or more metals selected from the group consisting of nickel, lead, tin, cadmium, and zinc.

In some embodiments, the conductive metal substrate is lifted from the surface of the single crystal of silicon prior to electroplating the conductive metal substrate with lithium metal, thereby forming a lithium metal electrode comprising the conductive metal substrate coated on at least two faces with lithium metal. In some embodiments, the arithmetic mean roughness Ra of the layers of lithium metal is a value less than 0.5 μm. In some embodiments, Ra is a value less than 0.2 μm. In some embodiments, Ra is a value less than 0.1 μm. In some embodiments, Ra is a value less than 0.05 μm.

In some embodiments, the single crystal of silicon is doped to form an n-type semiconductor. In some such embodiments, the single crystal of silicon is doped with an element selected from the group consisting of phosphorous, arsenic, antimony, bismuth, sulfur, selenium, tellurium, and combinations thereof. In some embodiments, the single crystal is doped with an element selected from the group of phosporous, arsenic, antimony, bismuth, and combinations thereof.

In further embodiments, the single crystal of silicon is doped to form a p-type semiconductor. In some such embodiments, the single crystal of silicon is doped with an element selected from the group consisting of boron, aluminum, gallium, indium, zinc, cadmium, mercury, and combinations thereof. In some such embodiments, the single crystal of silicon is doped with an element selected from the group consisting of boron, aluminum, gallium, indium, and combinations thereof.

In some embodiments, the lithium is electroplated under an inert atmosphere. In some embodiments, the lithium metal is electroplated under an argon atmosphere. In some embodiments, the layer of lithium includes no more than five ppm of non-metallic elements by mass.

In one embodiment of the disclosure, a method is provided of manufacturing a smooth lithium metal sheet that includes the steps of: (1) obtaining a single crystal of silicon, doped to increase its electronic conductivity; and (2) electroplating lithium onto a surface of the single crystal of silicon, thereby forming a sheet of lithium metal. In some embodiments Ra of the electrodeposited lithium is a value less than 0.5 µm.

Lithium anodes in rechargeable lithium metal batteries (LMBs) are considered the "Holy Grail" of anode materials due to their remarkably high theoretical specific capacity of 3860 mAh/g and low reaction voltage. Lithium metal is the lightest metal on the periodic table, and it is especially desired for applications that require a low ratio of volume to weight, such as electric vehicles. The most promising LMB's are Lithium Sulfur (Li—S), Lithium Air (Li—$O_2$), and Solid-State or Semi-Solid LMB's. While primary batteries manufactured with lithium metal foils are widely commercialized, numerous barriers to the commercialization of rechargeable LMB's include low Coulombic efficiency, poor cycle life, soft shorts, volumetric expansion and the growth of Li dendrites during plating—which can lead to thermal runaway and other catastrophic failures. Tremendous efforts have been made to suppress dendrite formation including by providing additives in electrolytes, varying the salt concentration, creating artificial passivating layers on lithium metal (allowing one to handle lithium metal in dry air for a brief amount of time, but at the cost of higher impedance), and manipulating electrode-electrolyte interfacial structure-which is extremely difficult to do when a foil is mechanically fused to a substrate to create a negative electrode, and that negative electrode is then mechanically fused to a solid-state electrolyte.

Other barriers include the quality and cost of available lithium metal raw material, handling of lithium metal, and the mechanical challenges of manufacturing a lithium anode. These barriers increase by orders of magnitude when attempting to mechanically manufacture a solid-state LMB. Since 1976, researchers—including Nobel Prize winners—have attempted to solve all these problems to no avail. It is 2020 and the absence of a commercially viable battery for consumer applications—despite the efforts of the best minds in the field—is stinging.

The current commercially available supply of lithium metal is produced by molten salt electrolysis of lithium chloride. Lithium is poured into a mold and extruded into foils that range in thickness from 100 µm-750 µm. For environmental reasons, lithium metal foils are generally produced in China. Because of lithium's classification as a flammable and potentially explosive material, these foils must then be shipped under mineral oil to a battery manufacturer. The process yields an impure foil that, under SEM imaging, appears intrinsically dendritic, with an uneven surface that can vary by +/−50 µm (U.S. Pat. No. 10,177,366, FIG. 11A). The resulting impure product, while sufficient for primary lithium batteries, is not usable in rechargeable LMB's.

Shipping and handling, and the required immersion in mineral oil compromise the integrity of the lithium metal. Prior to use in batteries, the mineral oil must be removed, which further compromises the lithium. Some battery developers manually scrape lithium from under the top layer to use and spread it on the copper or other substrate like peanut butter. Some take the lithium metal foil, and vapor deposit it onto a substrate, which is both expensive and energy intensive.

Impurities in the present supply of lithium metal foil provide an additional barrier to the commercialization of LMB's. As an alkali metal, lithium has one loosely held valence electron, causing it to be inherently reactive. Notably, lithium is the only alkali metal that reacts with nitrogen in the air, forming the nitride LisN. Due to undesirable sidereactions, the introduction of impurities into the lithium foil severely limits the operation of a working battery. In particular, a recent study found that such impurities can lead to the nucleation of sub-surface dendritic structures. (Harry et al., Nat. Mater. 13, 69-73 (2014)). The manufacturer of the lithium foil in the study (FMC Lithium) listed a number of elements other than lithium, the most abundant at a concentration of 300 ppm by weight is nitrogen, likely in the form of $Li_3N$. (U.S. Pat. No. 4,781,756). Other common impurities include: Na, Ca, K, Fe, Si, Cl, B, Ti, Mg and C. While this is not an exhaustive list, the elements mentioned are the most common. Nitrogen in any form is particularly undesirable in rechargeable LMBs. Nitrogen forms voids and pits in the lithium metal as a battery cycles and also consumes lithium with these reactions. The presence of impurities such as nitrogen leads to slowed and uneven lithium deposition on a negative electrode during charging, affecting the overall current distribution in the battery and creating hot spots.

The unevenness of the lithium foil surface caused by nitrogen and other impurities is also highly problematic because it prevents uniform contact of the substrate with the electrode, leading to soft shorts and again, uneven distribution of current, which in turn can lead to dendrites and other undesirable effects.

In part, dendrite formation results from a lack of uniform contact between the conductive substrate and electrolytically deposited lithium metal. If the lithium metal deposited is not in uniform contact with the conductive substrate, this can lead to an uneven distribution of current during the electrolytic process, which can in turn lead to an uneven distribution of deposited lithium, and eventually can promote dendrite formation. Microscopically smooth conductive surfaces provide more uniform contact, which can deter dendrite formation compared to macroscopically rough surfaces. A need exists for inexpensive methods to provide microscopically smooth conductive surfaces suitable for lithium metal batteries. A specific need exists for smooth copper surfaces for metal electrodes, and a particular need exists for microscopically smooth copper surfaces for lithium metal electrodes in rechargeable lithium metal batteries.

Lithium metal electrodes can comprise a flat electronically conductive substrate, e.g., copper, that functions as the current collector of the negative electrode, onto which lithium metal is deposited.

A method is needed to provide a pure lithium metal anode, which overcomes the purity issues heretofore limiting the capacity and recycling life of LMBs.

The present disclosure relates to compositions and methods of producing microscopically smooth conductive substrates suitable for lithium metal electrodes. In particular, microscopically smooth copper substrates provide surfaces suitable for electrodepositing lithium metal to provide microscopically smooth lithium metal electrodes for lithium metal batteries.

According to an embodiment of the disclosure, a method of manufacturing a lithium metal electrode is disclosed that includes the steps of (1) obtaining a single crystal of silicon, doped to increase its electronic conductivity; (2) electroplating a conductive metal onto the surface of the single crystal of silicon, thereby forming a conductive metal substrate having a first face in contact with the single crystal of silicon and a second face, disposed opposite the first face, not in contact with the single crystal of silicon; (3) electroplating a layer of lithium metal onto the second face of the conductive metal substrate, thereby forming the lithium metal electrode comprising the conductive metal substrate and the layer of lithium metal.

In some embodiments, the arithmetic mean roughness Ra of the layer of lithium metal on the second face of the conductive metal substrate is a value less than 50, 40, 30, 20, 10, 9, 8, 7, 6, 5, 4, 3, 2, or 1 µm. In some embodiments, the arithmetic mean roughness Ra of the layer of lithium metal on the second face of the conductive metal substrate is a value less than 0.5 µm. In some embodiments, Ra is a value less than 0.2 µm. In some embodiments, Ra is a value less than 0.1 µm. In some embodiments, Ra is a value less than 0.05 µm.

According to a further embodiment, the conductive metal substrate is lifted from the surface of the single crystal of silicon prior to electroplating a layer of lithium on the first face of the conductive metal substrate and a layer of lithium on the second face of the conductive metal substrate.

In some embodiments, the arithmetic mean roughness Ra of the layer of lithium metal on the first face of the conductive metal substrate is a value less than 50, 40, 30, 20, 10, 9, 8, 7, 6, 5, 4, 3, 2, or 1 µm. In some embodiments, the arithmetic mean roughness Ra of the layer of lithium metal on the first face of the conductive metal substrate is a value less than 0.5 µm. In some embodiments, Ra is a value less than 0.2 µm. In some embodiments, Ra is a value less than 0.1 µm. In some embodiments, Ra is a value less than 0.05 µm.

In some embodiments, the conductive metal is chosen from a group consisting of copper, nickel, silver, gold, lead, cadmium, zinc, and tin. In some embodiments, the conductive metal is copper. In some embodiments, the conductive metal is an alloy. In some embodiments, the conductive metal is an alloy comprising two or more metals selected from the group consisting of copper, nickel, silver, gold, lead, cadmium, zinc, and tin. In some embodiments, the alloy is a stainless steel. In some embodiments, the stainless steel alloy includes iron, nickel, and chromium. In some embodiments, the conductive metal is an alloy comprising copper. In some embodiments, the conductive metal is an alloy comprising copper and one or more precious metals selected from the group consisting of gold, silver, platinum, and palladium. In some embodiments, the conductive metal is an alloy comprising copper and one or more metals selected from the group consisting of nickel, lead, tin, cadmium, and zinc.

In some embodiments, the conductive metal substrate is lifted from the surface of the single crystal of silicon prior to electroplating the conductive metal substrate with lithium metal, thereby forming a lithium metal electrode comprising the conductive metal substrate coated on at least two faces with lithium metal. In some embodiments, the arithmetic mean roughness Ra of the layers of lithium metal is a value less than 50, 40, 30, 20, 10, 9, 8, 7, 6, 5, 4, 3, 2, or 1 µm. In some embodiments, the arithmetic mean roughness Ra of the layers of lithium metal is a value less than 0.5 µm. In some embodiments, Ra is a value less than 0.2 µm. In some embodiments, Ra is a value less than 0.1 µm. In some embodiments, Ra is a value less than 0.05 µm.

In some embodiments, the single crystal of silicon is doped to form an n-type semiconductor. In some such embodiments, the single crystal of silicon is doped with an element selected from the group consisting of phosphorous, arsenic, antimony, bismuth, sulfur, selenium, tellurium, and combinations thereof. In some embodiments, the single crystal is doped with an element selected from the group of phosporous, arsenic, antimony, bismuth, and combinations thereof.

In further embodiments, the single crystal of silicon is doped to form a p-type semiconductor. In some such embodiments, the single crystal of silicon is doped with an element selected from the group consisting of boron, aluminum, gallium, indium, zinc, cadmium, mercury, and combinations thereof. In some such embodiments, the single crystal of silicon is doped with an element selected from the group consisting of boron, aluminum, gallium, indium, and combinations thereof.

In some embodiments, the lithium is electroplated under an inert atmosphere. In some embodiments, the lithium metal is electroplated under an argon atmosphere. In some embodiments, the layer of lithium includes no more than five ppm of non-metallic elements by mass.

In one embodiment of the disclosure, a method is provided of manufacturing a smooth lithium metal sheet that includes the steps of: (1) obtaining a single crystal of silicon, doped to increase its electronic conductivity; and (2) electroplating lithium onto a surface of the single crystal of silicon, thereby forming a sheet of lithium metal. In some embodiments Ra of the electrodeposited lithium is a value less than 0.5 µm.

In some aspects, the present disclosure provides a method of manufacturing a lithium metal electrode comprising: electroplating a conductive metal onto a surface of a single crystal of silicon, thereby forming a conductive metal substrate, the conductive metal substrate having a first face in contact with the single crystal of silicon, and a second face, disposed opposite the first face, not in contact with the single crystal of silicon, wherein the single crystal of silicon is doped to increase its electronic conductivity; electroplating a layer of lithium metal onto the second face of the conductive metal substrate, thereby forming the lithium metal electrode comprising the conductive metal substrate and the layer of lithium metal coated on the second face of the conductive metal substrate, wherein the arithmetic mean roughness of the layer of lithium metal on the second face of the conductive metal substrate is a value less than 0.5 µm.

In some embodiments, the conductive metal substrate is lifted from the surface of the single crystal of silicon prior to electroplating the conductive metal substrate with lithium metal, so that the conductive metal substrate is electroplated on both of the first face and the second face with a layer of lithium metal, thereby forming the lithium metal electrode comprising the conductive metal substrate and layers of lithium metal coated on the first face and the second face of the conductive metal substrate, wherein the arithmetic mean roughness of the deposited lithium layer on the first face of the conductive metal substrate is a value less than 0.5 µm.

In some embodiments, the conductive metal is chosen from the group consisting of copper, nickel, silver, gold, lead, cadmium, zinc, and tin.

In some embodiments, the conductive metal is copper.

In some embodiments, the conductive metal is an alloy.

In some embodiments, the alloy comprises two or more metals selected from the group consisting of Cu, Ni, Ag, Au, Pt, Pd, Pb, Cd, Zn, and Sn.

In some embodiments, the alloy is a copper alloy.

In some embodiments, the copper alloy comprises one or more precious metals selected from the group consisting of Ag, Au, Pt, and Pd.

In some embodiments, the copper alloy comprises one or more metals selected from the group consisting of Ni, Pb, Sn, Cd, and Zn.

In some embodiments, the alloy is a stainless steel.

In some embodiments, the stainless steel alloy includes Fe, Ni, and Cr.

In some embodiments, the single crystal of silicon is doped to form an n-type semiconductor.

In some embodiments, the single crystal of silicon is doped with an element selected from the group consisting of P, As, Sb, Bi, S, Se, Te, and combinations thereof.

In some embodiments, the single crystal of silicon is doped to form a p-type semiconductor.

In some embodiments, the single crystal of silicon is doped with an element selected from the group consisting of B, Al, Ga, In, Zn, Cd, Hg, and combinations thereof.

In some embodiments, the lithium is electroplated under an argon atmosphere.

In some aspect, the present disclosure provides a method of manufacturing a smooth lithium metal sheet comprising: electroplating lithium onto a surface of a single crystal of silicon, thereby forming a smooth sheet of lithium metal, wherein the single crystal of silicon is doped to increase its conductivity, wherein the arithmetic average surface roughness (Ra) of the electrodeposited lithium is a value less than 0.5 µm.

In some embodiments, the lithium is electroplated under an inert atmosphere.

In some embodiments, the inert atmosphere is an argon atmosphere.

In some embodiments, the layer of lithium includes no more than five ppm of non-metallic elements by mass.

In some embodiments, the arithmetic mean roughness of the lithium layers is a value less than 0.2 µm.

In some embodiments, the arithmetic mean roughness of the lithium layers is a value less than 0.1 µm.

In some embodiments, the arithmetic mean roughness of the lithium layers is a value less than 0.05 µm.

In some aspects, the present disclosure relates to the production of highly pure lithium for use in lithium metal batteries, and the integration of lithium metal production with the production of Li batteries. The resultant batteries are manufactured in a fully charged state, and have increased cycle life compared to conventional manufacturing methods.

While the general approach is to suppress all the problems inherent in the existing supply of raw material, an approach which has not been successful in over forty-three years, the inventor proposes to address the materials problem and the manufacturing problem simultaneously by producing a highly improved lithium metal product (a full negative electrode) and vertically integrating lithium metal production into battery manufacturing facilities.

In preferred embodiments, a lithium metal electrode includes a conductive substrate, and a first layer of lithium metal having an inner face and an outer face, the inner face bonded to the conductive substrate, wherein the first layer includes no more than five ppm of non-metallic elements by mass. In some embodiments first layer includes no more than one ppm of non-metallic element by mass. In some embodiments first layer includes no more than one ppm of nitrogen by mass. In some embodiments, the outer face of the first layer of lithium metal is bonded to a first lithium ion-selective membrane. In some embodiments, the first lithium ion-selective membrane is configured as a solid state electrolyte.

In some embodiments, the conductive substrate includes a plate having a first face and a second face, wherein the inner face of the first layer of lithium metal is bonded to the first face of the conductive substrate. In some embodiments, the conductive substrate further includes a second layer of lithium metal having an inner face and an outer face, the inner face of the second layer of lithium metal being bonded to the second face of the conductive substrate, wherein the second layer includes no more than five ppm of non-metallic elements by mass. In some embodiments, the outer face of the first layer of lithium metal is bonded to the first lithium ion-selective membrane and the outer face of the second layer of lithium metal is bonded to a second lithium ion-selective electrode. In some embodiments, the first and the second lithium ion-selective membranes are configured as solid state electrolytes.

In some embodiments, the electrode has a specific capacity of greater than about 3800 mAh per gram of lithium metal. In some embodiments, the first layer of lithium metal has a density of between about 0.45 $g/cm^3$ and about 0.543 $g/cm^3$. In some embodiments, the second layer of lithium metal has a density of between about 0.45 $g/cm^3$ and about 0.543 $g/cm^3$.

In some embodiments, the conductive substrate is selected from the group consisting of copper, aluminum, graphite coated copper, and nickel. In some embodiments, the first lithium metal electrode has a thickness between about 1 micron and about 50 microns. In some embodiments, the second lithium metal electrode has a thickness between about 1 micron and about 50 microns. In some embodiments, the first lithium metal electrode between about 1 micron and 100 microns. In some embodiments, the second lithium metal electrode has a thickness between about 50 micron and about 100 microns. In some embodiments, the second lithium metal electrode has a thickness between about 1, 2, 3, 4, 5, 10, 20, 30, 40 microns and about 50, 60, 70, 80, 90, or 100 microns.

In some embodiments, a lithium metal battery incorporates one or more lithium metal electrodes of the instant disclosure.

In some embodiments, the lithium metal electrode is manufactured according to a method comprising:
1. providing a gas-impermeable container, the container enclosing: a blanketing atmosphere, the blanketing atmosphere having no more than 10 ppm of lithium reactive components on a molar basis; an electrolytic cell, the electrolytic cell being blanketed completely by the blanketing atmosphere, and including: a first chamber containing a positive electrode, and an aqueous lithium salt solution in contact with the positive electrode; a second chamber containing a conductive substrate configured as a negative electrode, the conductive substrate being immovable within the second chamber, a lithium ion-selective membrane separating the first chamber from the second chamber, a space separating the conductive substrate and the lithium ion-selective membrane, and a non-aqueous electrolyte disposed in the space between the conductive substrate and the lithium ion-selective membrane, physically contacting both the conductive substrate and the lithium ion-selective membrane; the electrolytic cell being configured to allow passage of lithium ions through the lithium ion-selective membrane between the first and the second chambers, and to preclude the passage of other chemical species between the first and the second chambers;

2. applying a variable voltage in order to maintain a constant current across the negative electrode and the positive electrode, thereby causing lithium ions to cross from the first chamber to the second chamber, through the lithium ion-selective membrane and the non-aqueous electrolyte, and electroplate a layer of lithium onto the conductive substrate, the layer of lithium having an inner face bonded to the conductive substrate and an outer face directed towards the lithium ion-selective membrane, thereby forming the lithium metal electrode, comprising the layer of lithium bonded to the conductive substrate, wherein the constant current is between about 10 mA/cm² and about 50 mA/cm², and wherein the constant current is applied for a time between about 1 minute and about 60 minutes.

In some embodiments, when the lithium metal electrode is manufactured in this manner, the lithium ion-selective membrane is stationary within the electrolytic cell, and as the layer of lithium is formed, the layer of lithium displaces non-aqueous electrolyte from the space between the conductive substrate and the lithium ion-selective membrane, thereby bonding an inner face of the first layer of lithium to the conductive substrate and the outer face of the first layer of lithium to the ion-selective membrane, thereby forming a lithium metal electrode comprising the conductive substrate and the layer of lithium metal, with the inner face of the layer of lithium bonded to the conductive substrate, and the outer face of the layer of lithium bonded to the lithium ion-selective membrane, which is configured to function as a solid state electrolyte when the lithium metal electrode is incorporated into a galvanic cell.

In some embodiments, when the lithium metal electrode is manufactured in this manner, the aqueous lithium salt solution comprises a lithium salt selected from the group consisting of $Li_2SO_4$, $L_2CO_3$, and combinations thereof. In some embodiments, the aqueous lithium salt solution comprises $Li_2SO_4$. In some embodiments, the blanketing atmosphere comprises argon with a purity of greater than 99.999 mole percent.

In some embodiments, a lithium metal electrode is manufactured according to a method comprising:

1. providing a gas-impermeable container, the container enclosing: a blanketing atmosphere, the blanketing atmosphere having no more than 10 ppm of lithium reactive components on a molar basis; an electrolytic cell, the electrolytic cell being blanketed completely by the blanketing atmosphere, and including: a conductive substrate, immovable within the container, configured as a negative electrode; a positive electrode; an aqueous lithium salt solution interposed between the conductive substrate and the positive electrode; a lithium ion-selective membrane covering the conductive substrate, configured as a solid state electrolyte, and forming a barrier separating the aqueous lithium salt solution and the conductive substrate; the electrolytic cell being configured to allow passage of lithium ions from the lithium salt solution through the lithium ion-selective membrane and onto the surface of the conductive substrate, and to preclude the passage of other chemical species;

2. applying a variable voltage in order to maintain a constant current across the negative electrode and the positive electrode, thereby causing lithium ions to cross from the lithium salt solution through the lithium ion-selective membrane, and electroplate the first layer of lithium onto the conductive substrate, the inner face of the first layer of lithium thereupon being bonded to the conductive substrate, and the outer face being bonded to the lithium ion-selective membrane; wherein the constant current is between about 10 mA/cm² and about 50 mA/cm², and wherein the constant current is applied for a time between about 1 minute and about 60 minutes.

In some embodiments, when the lithium metal electrode is manufactured in this manner, the aqueous lithium salt solution comprises a lithium salt selected from the group consisting of $Li_2SO_4$, $Li_2CO_3$, and combinations thereof. In some embodiments, the aqueous lithium salt solution comprises $Li_2SO_4$. In some embodiments, the blanketing atmosphere comprises argon with a purity of greater than 99.999 mole percent.

In some embodiments, the lithium ion-selective membrane comprises a polymeric matrix and a plurality of ion-conducting particles disposed within the polymeric matrix.

In accordance with an embodiment of the disclosure, a method of manufacturing a lithium electrode is described, the method including the steps of:

(1) providing an electrolytic cell, the electrolytic cell including: a first chamber containing a positive electrode, and an aqueous lithium salt solution in contact with the positive electrode; a second chamber containing a conductive substrate configured as a negative electrode, the conductive substrate being stationary in the chamber during lithium metal electrodeposition, a lithium ion-selective membrane separating the first chamber from the second chamber, and a non-aqueous electrolyte disposed between the conductive substrate and the lithium ion-selective membrane, physically contacting both the conductive substrate and the lithium ion-selective membrane; the electrolytic cell being configured to allow passage of lithium ions through the lithium ion-selective membrane between the first and the second chambers, and to preclude the passage of other chemical species between the first and the second chambers;

(2) blanketing the electrolytic cell with a blanketing atmosphere, the blanketing atmosphere being substantially free of lithium reactive components;

(3) applying a variable voltage in order to maintain a constant current across the negative electrode and the positive electrode, thereby causing lithium ions to cross from the first chamber to the second chamber, through the lithium ion-selective membrane and the non-aqueous electrolyte, and electrodeposit a first layer of lithium onto the conductive substrate, thereby forming the lithium electrode, the first layer of lithium having an inner face and an outer face, the inner face of the first layer of lithium bonded to the conductive substrate; wherein the constant current is between about 10 mA/cm² and about 50 mA/cm², and wherein the constant current is applied for a time between about 1 minute and about 60 minutes.

According to some embodiments, the blanketing atmosphere includes no more than 10 ppm of lithium reactive components on a molar basis. In some embodiments the blanketing atmosphere includes no more than 10 ppm nitrogen on a molar basis. In some embodiments, the blanketing atmosphere includes no more than 5 ppm nitrogen on a molar basis.

According to some embodiments, the conductive substrate comprises a plate having a first face and a second face, wherein the inner face of the first layer of lithium metal bonds to the first face of the conductive substrate.

According to some embodiments, the aqueous lithium salt solution comprises a lithium salt selected from the group consisting of $Li_2SO_4$, $Li_2CO_3$, and combinations thereof. In some embodiments, the aqueous lithium salt solution includes $Li_2SO_4$.

According to some embodiments, the conductive substrate is selected from a group consisting of copper, aluminum, graphite coated copper, and nickel.

According to some embodiments, the lithium ion-selective membrane includes a polymeric matrix and a plurality of ion-conducting particles disposed within the polymeric matrix. In some embodiments, the lithium ion-selective membrane comprises a glass frit with lithium ion conducting particles disposed within. According to some embodiments, the blanketing atmosphere comprises argon with a purity of greater than 99.998 weight percent. According to some embodiments, the lithium electrode has a specific capacity of greater than about 3800 mAh per gram of lithium.

In accordance with an embodiment of the disclosure, a method of manufacturing a lithium electrode is described, the method including the steps of:
(1) providing a gas-impermeable container, the container enclosing: a blanketing atmosphere, the blanketing atmosphere being substantially free of lithium reactive components; an electrolytic cell, the electrolytic cell being blanketed completely by the blanketing atmosphere, and including: a conductive substrate, stationary within the cell, configured as a negative electrode; a positive electrode; an aqueous lithium salt solution interposed between the conductive substrate and the positive electrode; a lithium ion-selective membrane configured to function as a solid state electrolyte, covering the conductive substrate, and forming a barrier separating the aqueous lithium salt solution and the conductive substrate; the electrolytic cell being configured to allow passage of lithium ions from the lithium salt solution through the lithium ion-selective membrane and onto the surface of the conductive substrate, and to preclude the passage of other chemical species;
(2) applying a variable voltage in order to maintain a constant current across the negative electrode and the positive electrode, thereby causing lithium ions to cross from the lithium salt solution through the lithium ion-selective membrane, and electroplate a layer of lithium onto the conductive substrate, thereby forming the lithium electrode, the layer of lithium having an inner face and an outer face, the inner face bonding to the conductive substrate and the outer face bonding to the lithium ion-selective membrane; wherein the constant current is between about 10 mA/cm² and about 50 mA/cm², and wherein the constant current is applied for a time between about 1 minute and about 60 minutes.

In accordance with an embodiment of the disclosure, a method of manufacturing a lithium metal battery is described, comprising:
(1) manufacturing a lithium electrode according to methods of the instant disclosure;
(2) assembling a casing with contents including the lithium electrode configured as an anode, and other components necessary to form the lithium metal battery;
(3) sealing the casing to isolate the contents of the casing from reactants present in the air, thereby providing the lithium metal battery.

In preferred embodiments, LIMBs are fabricated in a single manufacturing facility. In some embodiments, all steps of battery manufacture are performed under a blanketing atmosphere substantially free of lithium reactive components.

In some embodiments the lithium metal battery is fabricated with a lithium metal electrode having a layer of lithium metal bonded to the conductive substrate, wherein the layer of lithium metal includes no more than 5 ppm of non-metallic elements by mass.

In accordance with an embodiment of the disclosure, a method of manufacturing a lithium metal battery is described, comprising:
(1) providing an electrolytic cell, the electrolytic cell including: a conductive substrate, stationary within the electrolytic cell, the conductive substrate comprising a plate having a first face and a second face; a first chamber containing a first positive electrode, and a first aqueous lithium salt solution in contact with the first positive electrode; a second chamber containing a first lithium ion-selective membrane separating the first chamber from the second chamber, and a first non-aqueous electrolyte disposed between the first face of the conductive substrate and the first lithium ion-selective membrane, physically contacting both the first face of the conductive substrate and the lithium ion-selective membrane; a third chamber containing a second lithium ion-selective membrane and a non-aqueous electrolyte disposed between the second face of the conductive substrate and the second lithium ion-selective membrane, physically contacting both the second face of the conductive substrate and the second lithium ion-selective membrane; a fourth chamber containing a second positive electrode, and a second aqueous lithium salt solution in contact with the second positive electrode; the second lithium ion-selective membrane separating the third chamber from the fourth chamber; the electrolytic cell being configured to allow passage of lithium ions through the first lithium ion-selective membrane between the first and the second chambers, and to preclude the passage of other chemical species between the first and the second chambers; the electrolytic cell being configured to allow passage of lithium ions through the second lithium ion-selective membrane between the fourth and the third chambers, and to preclude the passage of other chemical species between the fourth and the third chambers;
(2) blanketing completely the electrolytic cell with a blanketing atmosphere, the blanketing atmosphere being inert to chemical reaction with lithium;
(3) applying a variable voltage in order to maintain a constant current across the conductive substrate and the first positive electrode, and across the conductive substrate and the second positive electrode, thereby causing lithium ions to cross from the first chamber to the second chamber, through the first lithium ion-selective membrane and the first nonaqueous electrolyte, and electroplate a first layer of lithium onto the first face of the conductive substrate, and further causing lithium ions to cross from the fourth chamber to the third chamber, through the second lithium ion-selective membrane and the second nonaqueous electrolyte, and electroplate a second layer of lithium onto the second face of the conductive substrate, thereby forming the lithium electrode, the lithium electrode comprising the conductive substrate, the first layer of lithium, and the second layer of lithium, the first layer of lithium having an inner face and an outer face, the inner face bonded to the first face of the conductive substrate, the second layer of having an inner face and an outer face, the inner face bonded to the second face of the conductive substrate; wherein the constant current is between about 10 mA/cm$^2$ and about 50 mA/cm$^2$, and wherein the constant current is applied for a time between about 1 minute and about 60 minutes.

In accordance with an embodiment of the disclosure, a method of manufacturing a lithium metal battery is described, comprising:

(1) providing an electrolytic cell, the electrolytic cell including: a conductive substrate, stationary within the cell, the conductive substrate comprising a plate having a first face and a second face, the first face covered with a first lithium ion-selective membrane, and the second face covered with a second lithium ion-selective membrane, the first and second lithium ion-selective membranes configured to function as solid state electrolytes; a first chamber containing a first positive electrode, and a first aqueous lithium salt solution in contact with the first positive electrode and with the first lithium ion-selective membrane; a second chamber containing a second positive electrode, and a second aqueous lithium salt solution in contact with the first positive electrode and with the second lithium ion-selective membrane; the electrolytic cell being configured to allow passage of lithium ions through the first lithium ion-selective membrane between the first chamber and the first face of the conductive substrate, and to preclude the passage of other chemical species between the first chamber and the first face of the conductive substrate; the electrolytic cell being configured to allow passage of lithium ions through the second lithium ion-selective membrane between the second chamber and the second face of the conductive substrate, and to preclude the passage of other chemical species between the second chamber and the second face of the conductive substrate;

(2) blanketing completely the electrolytic cell with a blanketing atmosphere, the blanketing atmosphere being inert to chemical reaction with lithium;

(3) applying a variable voltage in order to maintain a constant current across the conductive substrate and the first positive electrode, and across the conductive substrate and the second positive electrode, thereby causing lithium ions to cross from the first chamber through the first lithium ion-selective membrane, and electroplate a first layer of lithium onto the first face of the conductive substrate, and further causing lithium ions to cross from the second chamber through the second lithium ion-selective membrane, and electroplate a second layer of lithium onto the second face of the conductive substrate, thereby forming the lithium electrode, the lithium electrode comprising the conductive substrate, the first layer of lithium, and the second layer of lithium, the first layer of lithium having an inner face and an outer face, the inner face of the first layer of lithium bonded to the first face of the conductive substrate, and the outer face of the first layer of lithium bonded to the first lithium ion-selective membrane, the second layer of lithium having an inner face and an outer face, the inner face of the second layer of lithium bonded to the second face of the conductive substrate, and the outer face of the second layer of lithium bonded to the second lithium ion-selective membrane; wherein the constant current is between about 10 mA/cm$^2$ and about 50 mA/cm$^2$, and wherein the constant current is applied for a time between about 1 minute and about 60 minutes.

In accordance with an embodiment of the disclosure, a method of manufacturing a lithium metal electrode is described, wherein a lithium ion-selective membrane is immoveable in an electrolytic cell, and wherein as a first layer of lithium is formed, the first layer of lithium displaces non-aqueous electrolyte from a space between the conductive substrate and the lithium ion-selective membrane, thereby bonding the inner face of the first layer of lithium to the conductive substrate and the outer face of the first layer of lithium to the ion-selective membrane, thereby forming a lithium metal electrode comprising the conductive substrate and the first layer of lithium metal, with the inner face of the first layer of lithium bonded to the conductive substrate, and the outer face of the first layer of lithium bonded to the lithium ion-selective membrane, which is configured to function as a solid state electrolyte when the lithium metal electrode is incorporated into a galvanic cell.

In accordance with an embodiment of the disclosure, a method of manufacturing a lithium metal battery is described, wherein first and second lithium ion-selective membranes are immovable in an electrolytic cell, and wherein as a first layer of lithium is formed, the first layer of lithium displaces a first non-aqueous electrolyte from a space between a first face of the conductive substrate and the first lithium ion-selective membrane, thereby bonding the inner face of the first layer of lithium to the first face of the conductive substrate and the outer face of the first layer of lithium to the first lithium ion-selective membrane, and wherein as a second layer of lithium is formed, the second layer of lithium displaces a second non-aqueous electrolyte from a space between the second face of the conductive substrate and the second lithium ion-selective membrane, thereby bonding the inner face of the second layer of lithium to the second face of the conductive substrate and the outer face of the second layer of lithium to the second lithium ion-selective membrane, thereby forming a lithium metal electrode comprising the conductive substrate and the first and second layers of lithium metal, with the inner face of the first layer of lithium bonded to the first face of the conductive substrate, and the outer face of the first layer of lithium bonded to the first lithium ion-selective membrane, and further with the inner face of the second layer of lithium bonded to the second face of the conductive substrate, and the outer face of the second layer of lithium bonded to the second lithium ion-selective membrane, wherein the first and second lithium ion-selective membranes are configured to function as solid state electrolytes when the lithium metal electrode is incorporated into a galvanic cell.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

The foregoing features of embodiments will be more readily understood by reference to the following detailed description, taken with reference to the accompanying drawings, in which.

DETAILED DESCRIPTION

Definitions. As used in this description and the accompanying claims, the following terms shall have the meanings indicated, unless the context otherwise requires:

"Dendrite resistant lithium metal electrodes" are metal electrodes, coated with lithium, that resist dendrite formation when cycled in a lithium metal battery. Batteries with dendrite resistant lithium metal electrodes resist shorting from negative to positive electrode over the entire life of the battery.

The "arithmetic mean roughness" Ra of a surface is defined as the arithmetic average deviation of surface valleys and peaks about a center line average.

A "microscopically smooth surface" is a surface with an arithmetic mean roughness value of less than 0.5 µm, preferably less than 0.2 µm, preferably less than 0.1 µm.

A "cathode" is an electrode where reduction occurs.

An "anode" is an electrode where oxidation occurs.

A "working anode" is the anode in a galvanic cell.

A "positive electrode" is the anode in an electrolytic cell, and the cathode in a galvanic cell.

A "negative electrode" is the cathode in an electrolytic cell and the anode in a galvanic cell. Consequently, a lithium metal electrode is always a "negative electrode" even though it is a cathode in an electrolytic cell and an anode in a galvanic cell.

In the context of this application, a "lithium metal electrode" and a "lithium electrode" are synonymous, and each refers to a negative electrode comprising lithium metal.

A "lithium metal battery" (or "LMB") is a battery that utilizes a negative electrode comprising pure lithium metal (i.e. a lithium metal electrode). The positive electrode for such a battery is typically an intercalation compound such as $Ti_2S$, which, during discharge, accepts electrons through an external circuit from the anode, and intercalates $Li^+$ into its lattice structure.

A "lithium ion battery" is a rechargeable battery where lithium ions shuttle between a negative electrode and an intercalation compound as the positive electrode.

A blanketing atmosphere is "substantially free" of lithium reactive components when the atmosphere includes no more than 10 ppm of lithium reactive components.

In the context of this disclosure, a "vertically integrated" lithium metal manufacturing facility is a facility where lithium metal anodes are fabricated by electrodepositing at the facility, and integrated into the battery manufacturing process.

Figure 1:
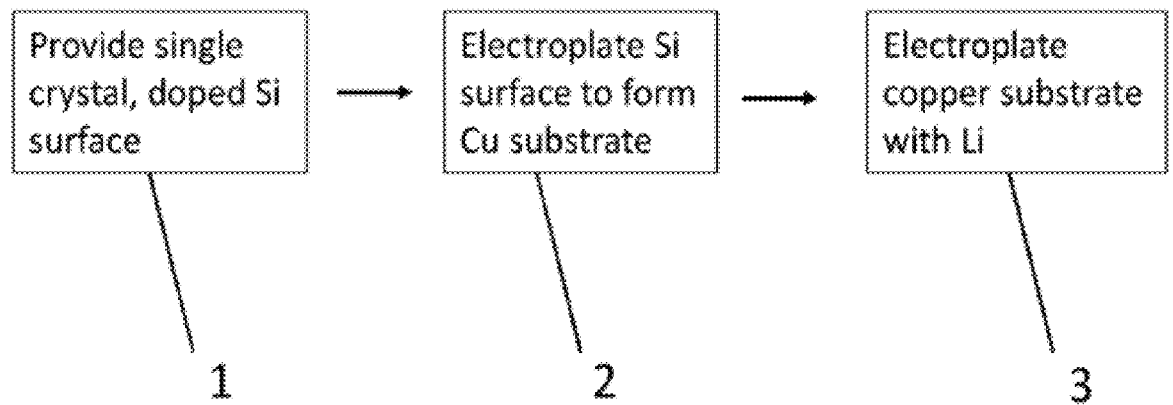
FIG. 1 provides an embodiment of the method for manufacturing a dendrite-resistant lithium metal electrode by a process of first electroplating a doped silicon surface with a copper substrate and then further electroplating a layer of lithium onto the smooth copper substrate, and finally removing the lithium coated copper substrate to provide a dendrite-resistant lithium metal electrode.
Figure 2:
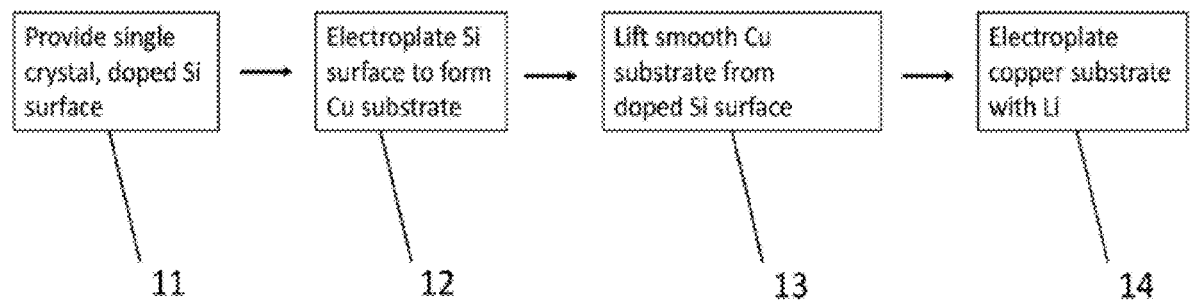
FIG. 2 provides an embodiment of a method for manufacturing a dendrite-resistant lithium metal electrode by first electroplating a doped silicon surface with a copper substrate, then removing the smooth copper substrate, and finally electroplating the copper substrate with lithium metal to form the dendrite-resistant lithium metal electrode.
Figure 3:
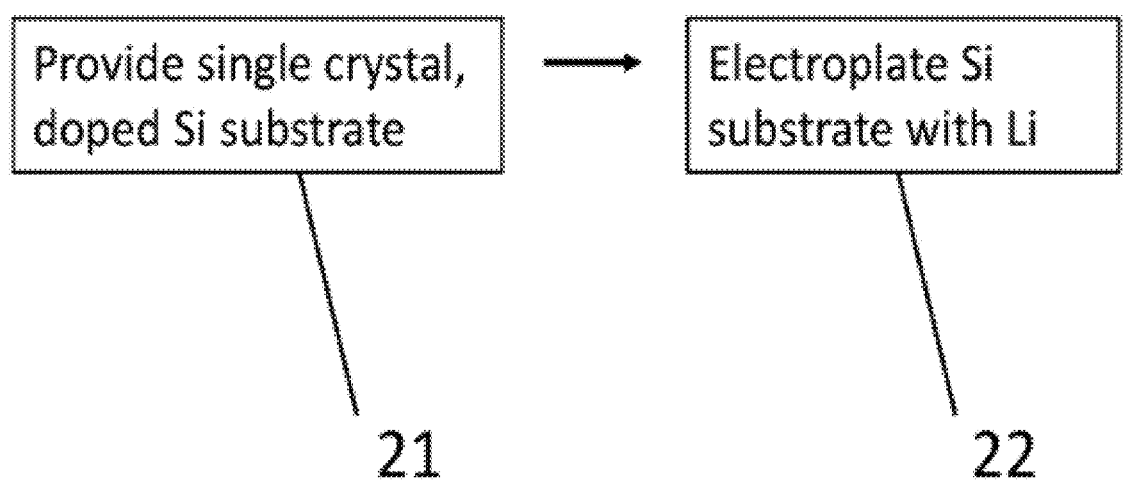
FIG. 3 provides an embodiment of a method for manufacturing a lithium sheet by electroplating lithium metal directly onto a conductive substrate of doped silicon, the sheet being suitable for incorporation into a dendrite-resistant lithium metal electrode.

FIGS. 1-3 provide some embodiments of the instant disclosure. In some embodiments, a single crystal of doped Si is cleaved by standard methods used in the production of silicon wafers to provide a microscopically smooth doped Si surface. In preferred embodiments, the crystal is formed by the Czochralski method.

In some embodiments the dopants are n-dopants. In preferred embodiments, the n-dopants are selected from Group 15 elements. In preferred embodiments, the n-dopants are Group 15 elements selected from the group consisting of phosphorous, arsenic, antimony, bismuth, and combinations thereof.

In some embodiments the dopants are p-dopants. In some embodiments the p-dopants are selected from Group 13 elements. In some embodiments, the p-dopants are Group 13 elements selected from the group consisting of boron, aluminum, gallium, indium, and combinations thereof.

As embodied in FIG. 1, the doped Si crystal 1 is incorporated as a cathode in an electrolytic cell containing salts of copper, and the surface of the doped Si crystal 1 is electrolytically coated with a microscopically smooth surface of copper, thereby providing a copper substrate 2 suitable for lithium deposition. Following this process, the copper coated silicon crystal is incorporated as a cathode in an electrolytic cell containing salts of lithium, and the copper surface is in turn electrolytically coated with a microscopically smooth layer of lithium 3. Following this process, the lithium-coated copper surface can be incorporated as a negative electrode in a lithium metal battery.

In another embodiment, shown in FIG. 2, the doped Si crystal 11 is incorporated as a cathode in an electrolytic cell containing salts of copper, and the surface of the doped Si crystal 11 is electrolytically coated with a microscopically smooth surface of copper, thereby providing a flat copper substrate 12 suitable for lithium deposition. In this embodiment, the copper substrate 12 is lifted from the doped silicon surface 13 and further electroplated with a microscopically smooth layer of lithium 14. An advantage of the embodiment of FIG. 2 is that the copper substrate can be electroplated on two flat surfaces, whereas the embodiment of FIG. 1 can only be coated on one surface.

According to the embodiment of FIG. 3, a single crystal of doped Si 21 is electroplated directly with lithium metal 22, to form a microscopically smooth lithium metal sheet for incorporation into a lithium metal electrode 23.

The embodiments of the disclosure described above are intended to be merely exemplary; numerous variations and modifications will be apparent to those skilled in the art. All such variations and modifications are intended to be within the scope of the present disclosure as defined in any appended claims.

Figure 4:
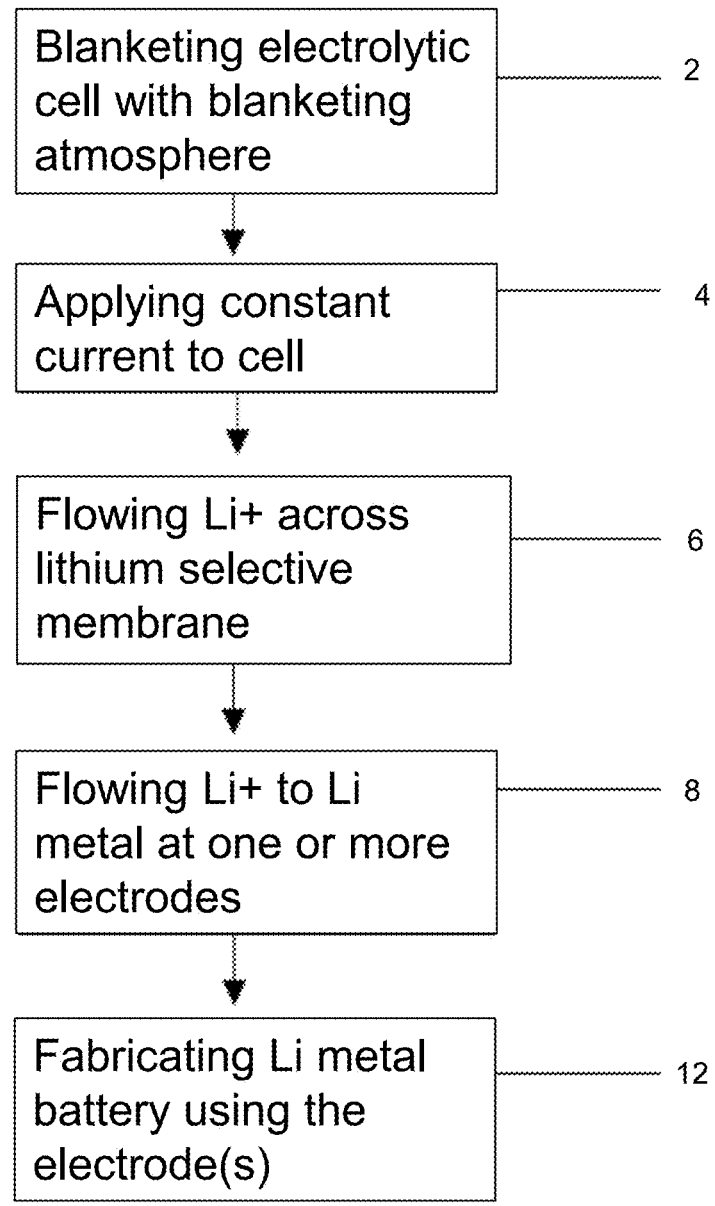
FIG. 4 shows steps in manufacturing a lithium metal battery according to an embodiment of the present disclosure.

FIG. 4 shows steps in manufacturing a lithium metal battery (LMB) according to embodiments of the current disclosure. An electrolytic cell, such as in the embodiments of FIGS. 5, 7, 9, 10, 12, and 13 is blanketed with blanketing atmosphere 2, the blanketing atmosphere being substantially free of lithium reactive components, including nitrogen, oxygen, ozone, oxides of nitrogen, sulfur and phosphorous, carbon dioxide, halogens, hydrogen halides, and water. In some embodiments, the blanketing atmosphere includes no more than 10 ppm of lithium reactive components on a molar basis. In some embodiments, the blanketing atmosphere includes no more than 5 ppm of lithium reactive components on a molar basis. In preferred embodiments, the blanketing atmosphere contains no more than 10 ppm nitrogen on a molar basis. In preferred embodiments, the blanketing atmosphere contains no more than 5 ppm nitrogen on a molar basis. In preferred embodiments, the blanketing atmosphere contains no more than 1 ppm nitrogen on a molar basis. In preferred embodiments, the blanketing atmosphere is argon gas. In preferred embodiments, the argon gas has a purity of greater than 99.998 weight percent. The electrolytic cell operates at or near room temperature, and uses an aqueous lithium salt solution as an anolyte providing a lithium feed for electrodepositing to form a negative electrode. In preferred embodiments, the aqueous lithium salt solution includes lithium sulfate ($Li_2SO_4$) and/or lithium carbonate ($Li_2CO_3$). When a $Li_2SO_4$ solution is used as feed, the only byproduct is $O_2$ gas which is generated at the anode, vented from the anolyte, and does not come into contact with the inert catholyte area. $Li_2SO_4$ is a lithium feedstock that is very low in the process chain, and thus $Li_2SO_4$ solutions provide an economical source of lithium ions for methods according to the instant disclosure. When $Li_2CO_3$ is used as feedstock, the minimal amount of carbon dioxide generated can likewise be vented off at the anode of the electrolysis cell. Typically, $Li_2CO_3$ is more expensive than $Li_2SO_4$. However, it is not uncommon for battery manufacturers to receive lithium carbonate that fails to meet quality control standards, and such lithium carbonate could be easily repurposed for lithium metal production. The aqueous lithium salt solutions do not need to be highly concentrated since as lithium ions are depleted by electrodeposition, flow cells may allow depleted lithium ions to be replaced.

Voltage across the electrolytic cell is regulated in order to apply a constant current to the cell 4. The applied voltage causes lithium ions to flow across a lithium ion-selective membrane from the anolyte to a catholyte 6, wherein the lithium ion-selective membrane is configured to allow the passage of lithium ion but to preclude the passage of other chemical species. At the cathode, lithium ion is reduced to the lithium metal, thereby plating onto a conductive substrate, and forming a lithium metal electrode 8. In some embodiments the conductive substrate is selected from the group consisting of copper, aluminum, graphite coated copper, and nickel. In some embodiments, the conductive substrate is copper. When constant current is applied within the range of about 10 mA/cm$^2$ to about 50 mA/cm$^2$, the lithium ions crossing the lithium ion-selective membrane and electrodepositing onto a conductive substrate do not produce nanorods or dendrites. The nanorods can be, e.g., a morphology of self-aligned nanorods as described in Mashtalir et al., High-Purity Lithim Metal Films from Aqueous Mineral Solutions. ACS Omega, 2018, Vo. 3, pp. 181-187, which is incorporated by reference herein in its entirety. Rather, current within this range produces an extremely dense lithium metal deposit and allows electrodeposition to proceed to completion in between one and 60 minutes. In preferred embodiments, the constant current applied is about 10 mA/cm$^2$ to about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the density of the lithium metal deposited ranges from about 0.4 g/cm$^3$ to 0.543 g/cm$^3$. In some preferred embodiments the density of lithium metal deposited ranges from 0.45 g/cm$^3$ to 0.543 g/cm$^3$. A constant current of about 10 mA/cm$^2$ to about 50 mA/cm$^2$ is substantially higher than the operating current during charge/discharge cycles of operating batteries manufactured using lithium metal electrodes of the disclosure. Lithium metal electrodes formed at higher current densities than are used in an operating battery enhance the charge-discharge recycling capacity of such batteries. Without being bound by theory, it is believed that lithium metal electrodes formed at higher current densities than are used in an operating battery will not form dendrites upon cycling if there are no impurities elsewhere in the battery. During the electrodeposition process, lithium continually passes through a lithium ion-selective membrane and accumulates on the conductive substrate until the desired thickness is achieved (a film of 15 pm can be made in under five minutes). Only lithium ions pass through from the lithium ion containing aqueous electrolyte, allowing for the use of inexpensive impure feed solutions containing $Li_2SO_4$ and/or $Li_2CO_3$. The lithium electrodeposited on the negative electrode is elementally pure and remains so because it is never handled or exposed to air prior to entering a battery. Because the electrodepositing occurs in a blanketing atmosphere substantially free of lithium-reactive components, including nitrogen, the formation of impurities, including in particular $Li_3N$, is avoided.

In some embodiments, the lithium metal layer electrodeposited on the negative electrode may be characterized by its smooth and densely packed surface microstructure. The microstructure of the lithium metal layer may be closely compacted without any surface irregularities or roughness. In some embodiments, the lithium metal layer may be devoid of any dendrites or self-aligned nanorod morphology. In some embodiments, the lithium metal layer comprises no porous microstructures.

In some embodiments, the lithium electrodeposited on the negative electrode coats all sides of the negative electrode. In some embodiments, the copper is in the form of a mesh. In some embodiments, the copper is in the form of a foam. In some embodiments, the conductive substrate comprises a plate with two faces, and lithium metal coats at least one face of the plate. In some embodiments, the lithium metal coats both of the two faces of the plate.

In some embodiments, the lithium ion-selective membrane is a hybrid organic-inorganic membrane including a polymeric matrix and a plurality of ion-conducting particles disposed within the polymeric matrix, forming an interconnected network for lithium ion transport. The polymeric matrix may serve as the structural framework of the lithium ion-selective membrane and may provide mechanical stability, maintaining its shape. In some embodiments, the polymeric matrix is a thermoplastic. In some embodiments, the polymeric matrix is a thermoset. In some embodiments, the polymeric matrix is a bulk polymer. In some embodiments, the polymeric matrix is a concentrated polymer, a semi-dilute polymer, or a dilute polymer. This polymeric matrix can be constructed from a variety of polymers, which could include, but are not limited to, polyethylene, polypropylene, polyurethane, polyethylene oxide, polystyrene, polyamide or other suitable polymer materials. The choice of polymer can depend on the specific requirements of the battery system, including factors such as temperature stability, mechanical strength, and compatibility with the electrolyte. In some embodiments, the polymer may be a silica-based polyurethane, polyethylene oxide, polystyrene, or polyamide. The silica-based polymer may provide high thermal stability and mechanical strength of the lithium ion-selective membrane and enhance the ionic conductivity of the membrane. Within the polymeric matrix, ion-conducting particles can be embedded. These particles may provide pathways for lithium ions to move through the polymeric matrix while preventing the passage of other ions. In some embodiments, the ion conducting particles are selected from the group consisting of $LifePO_4$, $LiCoO_2$, NASICON electrolytes, lithium-lanthanum titanates (LLTO), garnet type electrolytes, LISICON and Thio-LISICON electrolytes, $Li_7La_3Zr_3O_{12}$ (LLZO), the cubic phase (c-LLZO). In some embodiments, the lithium ion-selective membrane is configured to function as a solid state electrolyte. The lithium ion-selective membrane functioning as a solid state electrolyte may provide enhanced mechanical stability, superior selectivity for lithium ions, and potentially, a higher degree of safety due to the absence of a free-flowing liquid electrolyte. The lithium ion-selective membrane disclosed herein is different from gel polymer electrolytes, in that gel polymer electrolytes are a type of electrolyte that combines the characteristics of both liquid and solid electrolytes, and typically is made by infusing/impregnating a polymer with a liquid electrolyte solution. The polymer absorbs the liquid electrolyte forming a semi-solid or gel material. In contrast, the lithium ion-selective membrane, comprising polymeric matrix and ion-conducting particles disposed in the polymer matrix, can provide a solid-like structure and mechanical stability with high ionic conductivity. This combination of properties can allow the lithium ion-selective membrane to conduct ions while also maintaining its shape.

In some such embodiments, an inorganic coating is deposited on the polymeric matrix, the inorganic coating being a uniform layer of 1 to 10,000 atoms (0.1 nanometer to 5 micrometers) thick.

In some embodiments, the lithium ion-selective membrane comprises a glass frit with lithium ion conducting particles disposed within.

Finally, the lithium electrode thus formed is used in the fabrication of a LMB 12. In some embodiments, all of the steps in the manufacturing method are performed at a single manufacturing facility. In some embodiments, the single manufacturing facility is contained in an area of no greater than 10 km². In some embodiments the manufacturing facility is contained in an area less than about 1 km². Because lithium metal batteries of the instant disclosure are fabricated in a fully charged state, the invention reduces the footprint, cost and time of rechargeable batteries compared to conventional LIBs, which are initially fabricated in an uncharged state, and require time-consuming finishing steps to obtain a fully charged battery. The manufacturing facility can be operatively coupled to a lithium resource mining facility. The manufacturing facility and a lithium resource mining facility can be contained in an area of no greater than 10 km². The manufacturing facility and a lithium resource mining facility can be contained in an area of no greater than 1 km². The lithium resource can comprise brine.

A lithium resource can be a natural resource, e.g., a geological resource comprising ore, minerals, or brine, or seawater. A lithium resource can be a salar brine, a salt-lake brine, an oil-field brine, a bromine-plan tail brine, a geothermal brine, a fracking brine, a leachate from mining, an effluent from an industrial process (e.g., from a battery recycling plant), or a combination thereof.

In some embodiments, the lithium resource comprises an aqueous solution of metal salts comprising (i) a lithium salt and (ii) a sodium salt, a magnesium salt, a calcium salt, a potassium salt, or any combination thereof. In some embodiments, the lithium resource comprises an aqueous salt solution. In some embodiments, the lithium resource comprises sodium, potassium, magnesium, calcium, boron, chlorine, $SO_4^{2-}$, nitrogen, an alkali metal, an alkali earth metal, or any combination thereof. In some embodiments, the magnesium salt comprises $MgCl_2$. In some embodiments, the sodium salt comprises NaCl. In some embodiments, the lithium resource comprises LiCl, $Li_2SO_4$, or both.

In some embodiments, a ratio of magnesium to lithium in the lithium resource is at least 0, 1, 2, 3, 4, 5, 6, 7, 8, 9, 10, 20, 30, 40, 50, 60, 70, 80, 90, 100, 200, 300, 400, 500, 600, 700, 800, 900, or 1000 on a molar basis. In some embodiments, a ratio of magnesium to lithium in the lithium resource is at most 1, 2, 3, 4, 5, 6, 7, 8, 9, 10, 20, 30, 40, 50, 60, 70, 80, 90, 100, 200, 300, 400, 500, 600, 700, 800, 900, or 1000 on a molar basis. In some embodiments, a ratio of magnesium to lithium in the lithium resource is at least 0, 1, 2, 3, 4, 5, 6, 7, 8, 9, 10, 20, 30, 40, 50, 60, 70, 80, 90, 100, 200, 300, 400, 500, 600, 700, 800, 900, or 1000 on a mass basis. In some embodiments, a ratio of magnesium to lithium in the lithium resource is at most 1, 2, 3, 4, 5, 6, 7, 8, 9, 10, 20, 30, 40, 50, 60, 70, 80, 90, 100, 200, 300, 400, 500, 600, 700, 800, 900, or 1000 on a mass basis.

In some embodiments, the lithium resource comprises a total dissolved solid concentration of at least 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, or 100000 mg/L. In some embodiments, the lithium resource comprises a total dissolved solid concentration of at most 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, or 100000 mg/L.

In some embodiments, the lithium resource is pretreated to remove a metal cation. In some embodiments, the metal cation comprises magnesium, calcium, sodium, potassium, iron, or any combination thereof. In some embodiments, the metal cation is removed by adsorption, extraction, absorption, electrodialysis, precipitation, nanofiltration, solvent extraction, or any combination thereof. In some embodiments, the adsorption or the extraction comprises binding the metal cation to a coordination compound. In some embodiments, the absorption is performed by contacting the lithium resource with lithium-manganese oxide, titanium oxide, aluminum hydroxide, iron phosphate, clay minerals, zeolite, zirconium phosphate, tin antimonate, antimony oxide, tantalum oxide, niobium oxide, or any combination thereof.

In some embodiments, lithium can be extracted from a geological resource, such as clay and/or ore. In some embodiments, the geological resource can comprise a lithium mineral (e.g., $LiAlSi_2O_6$). The geological resource can be treated with sulfuric acid to obtain solution comprising $Li_2SO_4$. The $Li_2SO_4$ can be crystallized or further treated with a base to obtain LiOH (e.g., by adding $Ca(OH)_2$) or $Li_2CO_3$ (e.g., by adding $Na_2CO_3$). In some embodiments, $CaSO_4$ can be added to the geological resource. In some embodiments, the geological resource can be baked at high temperature. In some embodiments, $Li_2SO_4$ can be extracted using water to obtain an aqueus solution. In some embodiments, the aqueous solution can be concentrated to obtain $Li_2SO_4$ as a crystal.

In some embodiments, the lithium resource or the electrolyte comprises an additive, wherein the additive is configured to bind with lithium ions in the lithium resource preferentially over the lithium ions binding with water. In some embodiments, the lithium resource comprises an anion with a chemical structure of $(RS(O)_2)_2N^-$, where R is a substituent selected from the group of alkyl, perfluorinated alkyl, partially fluorinated alkyl, aryl, perfluorinated aryl, partially fluorinated aryl, and combinations thereof.

In some embodiments, the lithium resource comprises at least 1, 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, or 50000 mg/L of lithium. In some embodiments, the lithium resource comprises at most 1, 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, or 50000 mg/L of lithium.

In some embodiments, an aqueous solution composed of lithium salts is a lithium source. Given that the process of manufacturing the lithium metal electrode employs a lithium-ion-selective membrane, the process ensures selective passage of only lithium ions, effectively blocking all other chemical species. Consequently, the purity of the resulting lithium metal layer is independent of the purity of the original aqueous solution, even if it contains other ions. This enhances the overall effectiveness and reliability of the process in producing a high-purity lithium metal layer.

Figure 5:
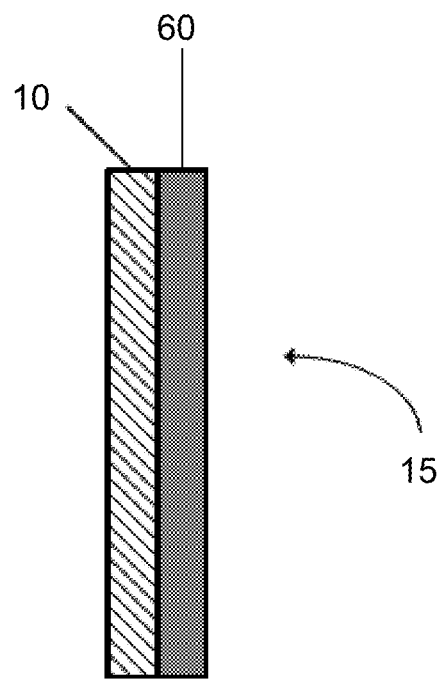
FIG. 5 shows an improved, single-sided lithium metal electrode, suitable for use as a working anode of a lithium metal battery, according to an embodiment of the present disclosure.

FIG. 5 provides a single-sided lithium metal electrode 15 according to an embodiment of the disclosure. The electrode 15 includes a conductive substrate 10, in the form of a plate having two faces. In preferred embodiments, the conductive substrate is selected from the group consisting of copper, aluminum, graphite coated copper, and nickel. Bonded to one of the two faces of the conductive substrate is a layer of lithium metal 60, the lithium metal including no more than 5 ppm of non-metallic elements by mass. In some embodiments, the lithium metal includes no more than 1 ppm of non-metallic elements by mass. In some embodiments, the lithium metal includes no more than 5 ppm of nitrogen by mass. In some embodiments, the lithium metal includes no more than 10, 15, 20, 25, 30, 35, 40, 45, or 50 ppm of nitrogen by mass. In some embodiments, the lithium metal includes no more than 1 ppm of nitrogen by mass. In some embodiments, the lithium metal does not contain any compounds that include nitrogen. In some embodiments, the layer of lithium metal 60 has a thickness between about 1 micron and about 10 microns. The conductive substrate 10 and the layer of lithium metal 60 together comprise the single-sided lithium metal electrode 15, suitable for use as a fully charged working anode in a LMB. In some embodiments, the lithium metal electrode 15 has a specific capacity of greater than about 3800 mAh per gram of lithium metal. In some embodiments, the layer of lithium metal 60 has a density of between about 0.4 g/cm$^3$ and about 0.534 g/cm$^3$. In some embodiments, the layer of lithium metal 60 has a density of between about 0.45 g/cm$^3$ and about 0.543 g/cm$^3$.

Figure 6:
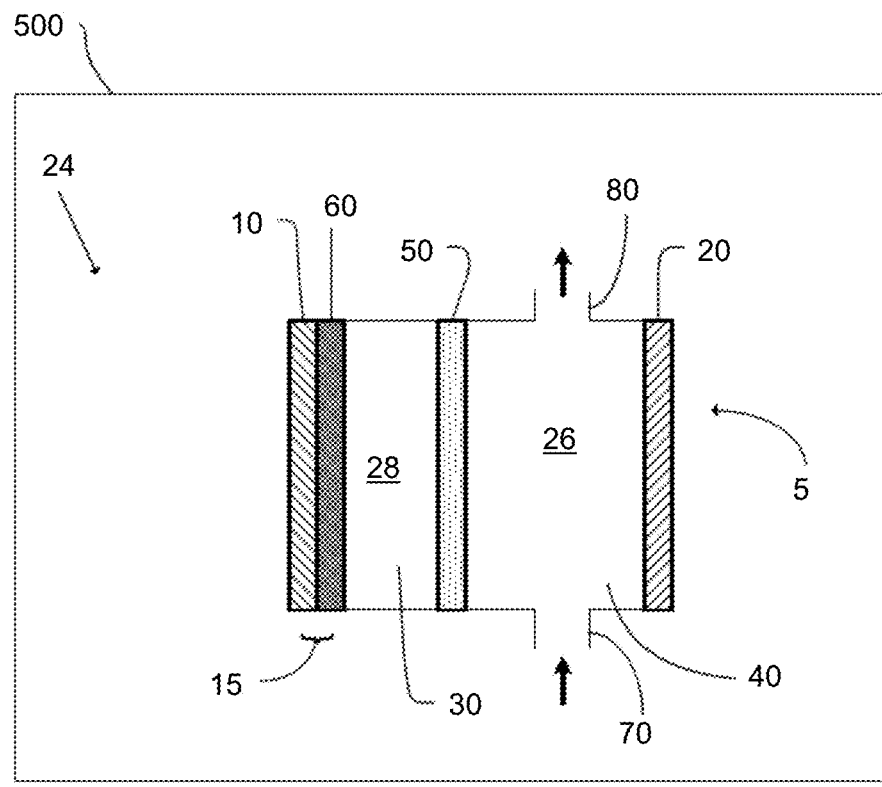
FIG. 6 shows an electrolytic cell for manufacturing an improved, single-sided lithium metal electrode suitable for use as a working anode in a lithium metal battery, according to an embodiment of the present disclosure.

In a method of manufacturing the single-sided lithium electrode 15 shown in FIG. 5, an electrolytic cell 5 is used, as shown in FIG. 6. During the manufacturing process, the electrolytic cell 5 of this embodiment is completely blanketed with a blanketing atmosphere 24, the blanketing atmosphere being substantially free of lithium reactive components. In some embodiments, the blanketing atmosphere includes no more than 10 ppm of lithium reactive components on a molar basis. In some embodiments, the blanketing atmosphere includes no more than 5 ppm of lithium reactive components on a molar basis. In some embodiments, the blanketing atmosphere includes no more than 10 ppm of nitrogen on a per molar basis. In some embodiments, the blanketing atmosphere includes no more than 5 ppm of nitrogen on a per molar basis. In some embodiments, the blanketing atmosphere includes no more than 1 ppm of nitrogen on a per molar basis. In a preferred environment, the blanketing atmosphere comprises argon with a purity of greater than 99.998 weight percent. In the embodiment of FIG. 6, the blanketing atmosphere 24 and the electrolytic cell 5 are enclosed in a gas-impermeable container 500. The cell 5 includes a first chamber 26 and a second chamber 28. The first chamber 26 contains a positive electrode 20 and an aqueous lithium salt solution 40 in contact with the positive electrode 20. The second chamber 28 contains the lithium metal electrode 15, a lithium ion-selective membrane 50, and a non-aqueous electrolyte 30. The lithium ion-selective membrane 50 has a first side and a second side, and physically separates the first chamber 26 from the second chamber 28, contacting the aqueous lithium salt solution 40 on the first side. In the second chamber 28, the non-aqueous electrolyte 30 is disposed between the lithium metal electrode 15 and the second side of the lithium ion-selective membrane 50, physically contacting both the lithium metal electrode 15 and the second side of the lithium ion-selective membrane 50. The lithium metal electrode 15 includes a conductive substrate 10, stationary during lithium metal electrodeposition within the second chamber, electrodeposited with a layer of elemental lithium 60. The lithium ion-selective membrane 50 allows lithium ions to pass between the first chamber 26 and the second chamber 28, but precludes the passage of other chemical species between the two chambers. In particular, the lithium ion-selective membrane does not allow water to pass from the first chamber 26 to the second chamber 28.

In manufacturing the single-sided lithium metal electrode 15 embodied in FIG. 5, a variable voltage is applied across the positive electrode 20 and the conductive substrate 10 of the electrolytic cell 5, in order to maintain a constant current, thereby causing lithium ions to move through the aqueous lithium salt solution 40, cross from the first chamber 26 to the second chamber 28, through the lithium ion-selective membrane 50, into the non-aqueous electrolyte, travel to the surface of the stationary conductive substrate 10, where each lithium ion gains an electron, thereby causing the layer of elemental lithium 60 to be electrodeposited on the conductive substrate 10, thereby forming the single-sided lithium metal electrode 15.

In some embodiments, the first chamber 26 of the electrolytic cell 5 of FIG. 5 is a flow chamber, with an entrance port 70 and an exit port 80 allowing aqueous lithium salt solution to enter the first chamber 26 to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 40 is selected from the group consisting of $Li_2SO_4$, $Li_2CO_3$, and combinations thereof. In preferred embodiments, the aqueous lithium salt solution 40 includes $Li_2SO_4$. In some embodiments, the aqueous lithium salt solution comprises brine. In preferred embodiments, the lithium ion-selective membrane 50 comprises a polymeric matrix and a plurality of ion-conducting particles disposed within the polymeric matrix. In some embodiments, the lithium ion-selective membrane 50 includes a glass frit with lithium ion conducting particles disposed within.

Figure 7:
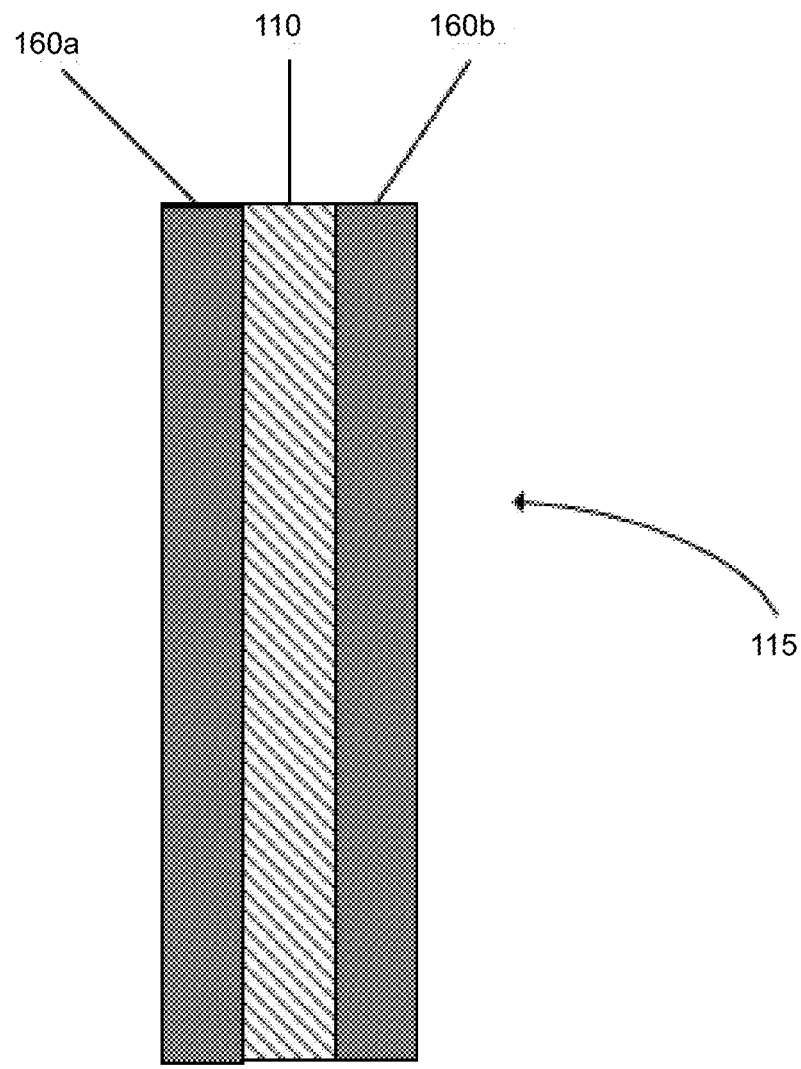
FIG. 7 shows an improved, double-sided lithium electrode, suitable for use as a working anode in a lithium metal battery, according to an embodiment of the present disclosure.

FIG. 7 provides a double-sided lithium metal electrode, according to an embodiment of the disclosure. The double-sided lithium metal electrode 115 includes a conductive substrate 110, in the form of a plate having a first face and a second face. In preferred embodiments, the conductive substrate 115 is selected from the group consisting of copper, aluminum, graphite coated copper, and nickel. The first face and a second face of the conductive substrate 115 are coated with a layer of lithium metal, 160*a* and 160*b*, respectively, the lithium metal including no more than 5 ppm of non-metallic elements by mass. In some embodiments, the lithium metal includes no more than 1 ppm of non-metallic elements by mass. In some embodiments, the layer of lithium metal 160*a*, 160*b* has a thickness between about 1 micron and about 10 microns. The conductive substrate 110 and the layers of lithium metal 160*a* and 160*b* together comprise the double-sided lithium metal electrode 115, which is suitable for use as a fully charged working anode in a LMB. In some embodiments, the lithium metal electrode 115 has a specific capacity of greater than about 3800 mAh per gram of lithium metal. In some embodiments, the layers of lithium metal 160*a*, 160*b* each have a density of between about 0.4 g/cm$^3$ and about 0.543 g/cm$^3$. In some embodiments, the layers of lithium metal 160*a*, 160*b* each have a density of between about 0.45 g/cm$^3$ and about 0.543 g/cm$^3$.

Figure 8:
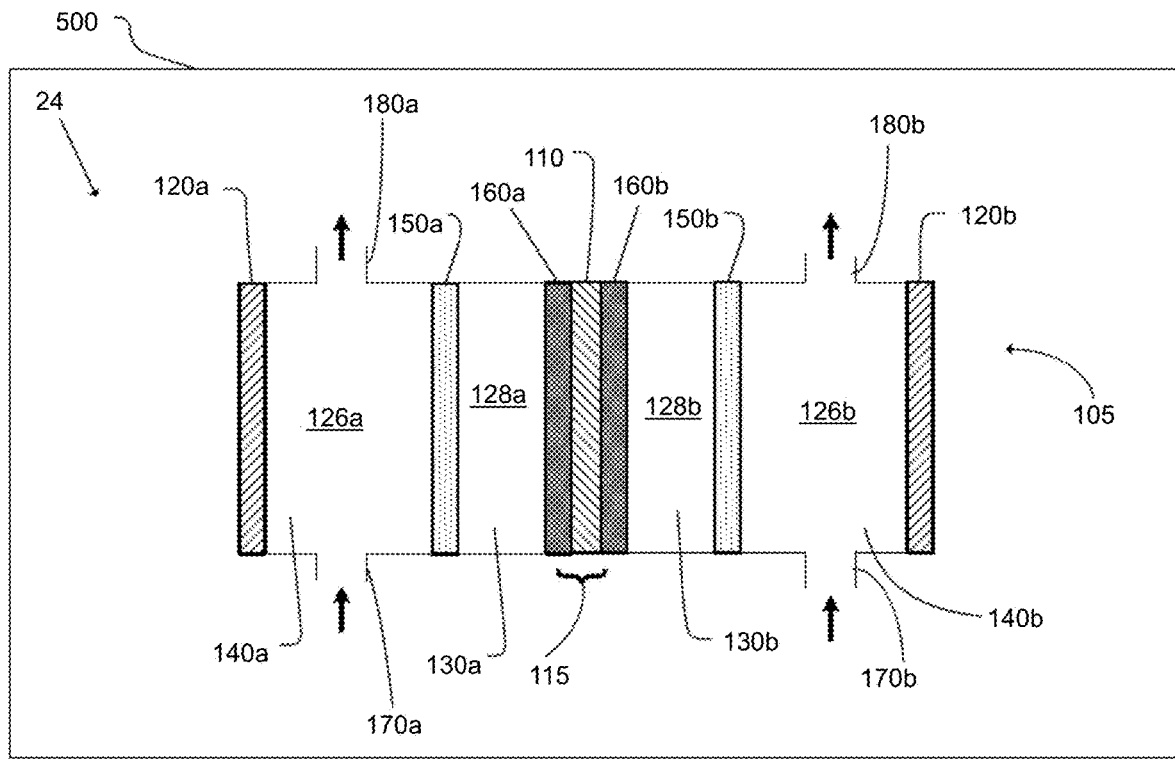
FIG. 8 shows an electrolytic cell suitable for manufacturing a double-sided electrode suitable for use as a working anode in a lithium metal battery, according to an embodiment of the present disclosure.

In a method of manufacturing the double-sided lithium electrode 115 shown in FIG. 7, an electrolytic cell 105 is used, as shown in FIG. 8. During the manufacturing process, the electrolytic cell 105 of this embodiment is blanketed with a blanketing atmosphere 24, the blanketing atmosphere 24 being inert to chemical reaction with lithium. In some embodiments, the blanketing atmosphere includes no more than 10 ppm of lithium reactive components on a molar basis. In some embodiments, the blanketing atmosphere includes no more than 5 ppm of lithium reactive components on a molar basis. In some embodiments, the blanketing atmosphere includes no more than 10 ppm of nitrogen on a per molar basis. In some embodiments, the blanketing atmosphere includes no more than 5 ppm of nitrogen on a per molar basis. In some embodiments, the blanketing atmosphere includes no more than 1 ppm of nitrogen on a per molar basis. In a preferred environment, the blanketing atmosphere comprises argon with a purity of greater than 99.998 weight percent. In the embodiment of FIG. 8, the blanketing atmosphere 24 and the electrolytic cell 105 are enclosed in a gas-impermeable container 500. The cell 105 includes a first chamber 126a, a second chamber 128a, a third chamber 126b, and a fourth chamber 128b. The first chamber 126a contains a positive electrode 120a and an aqueous lithium salt solution 140a in contact with the positive electrode 120a and the third chamber 126b contains a positive electrode 120b and an aqueous lithium salt solution 140b in contact with the positive electrode 120b. The second chamber 128a and the fourth chamber 128b share the double-sided lithium metal electrode 115, which bounds the two chambers, the double-sided lithium metal electrode 115 including a central conductive substrate 110 having a first face and a second face, the first and the second faces electrodeposited with the layers of lithium metal 160a, 160b, respectively, with the layer of lithium metal 160a extending into the second chamber 128a, and the layer of lithium metal 160b extending into the fourth chamber. The second chamber 128a contains a lithium ion-selective membrane 150a, and a non-aqueous electrolyte 130a. The lithium ion-selective membrane 150a has a first side and a second side, and physically separates the first chamber 126a from the second chamber 128a, contacting the aqueous lithium salt solution 140a on the first side. In the second chamber 128a, the non-aqueous electrolyte 130a is disposed between the lithium metal layer 160a and the second side of the lithium ion-selective membrane 150a. The fourth chamber contains a lithium ion-selective membrane 150b, and a non-aqueous electrolyte 130b. The lithium ion-selective membrane 150b has a first side and a second side, and physically separates the third chamber 126b from the fourth chamber 128b, contacting the aqueous lithium salt solution 140b on the first side. In the fourth chamber 128b, the non-aqueous electrolyte 130b is disposed between the lithium metal layer 160b and the second side of the lithium ion-selective membrane 150b. The lithium ion-selective membranes 150a, 150b allow lithium ions to pass between first chamber 126a and the second chamber 128a, and between the third chamber 126b and the fourth chamber 128b, respectively, but preclude the passage of other chemical species between the first and second chambers 126a, 128a and between the third and the fourth chambers 126b, 128b, respectively.

In manufacturing the double-sided lithium metal electrode 115 embodied in FIG. 7 using the electrolytic cell 105, a variable voltage is applied across the positive electrodes 120a, 120b and the conductive substrate 110 of the electrolytic cell 105, in order to maintain a constant current, thereby causing lithium ions to move through the aqueous lithium salt solutions 140a, 140b, cross from the first and third chambers 126a, 126b to the second and fourth chambers 128a, 128b, respectively, through the respective lithium ion-selective membranes 150a, 150b, and into the non-aqueous electrolytes 130a, 130b, respectively, travel to the first and second faces of the conductive substrate, where each lithium ion gains an electron, thereby causing layers of elemental lithium 160a, 160b to be electrodeposited, respectively, on the first face and the second face of the conductive substrate 110, thereby forming the double-sided lithium metal electrode 115. During electrodeposition of the lithium metal layers 160a, 160b onto the first face and the second face of the conductive substrate 110, the conductive substrate 110 remains stationary. In some embodiments, the first and third chambers 126a, 126b of the electrolytic cell 105 of FIG. 7 are flow chambers, with entrance ports 170a, 170b and exit ports 180a, 180b allowing aqueous lithium salt solutions 140a, 140b to enter the first chamber 126a and the third chamber 126b to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 140a, 140b is selected from the group consisting of $Li_2SO_4$, $Li_2CO_3$, and combinations thereof. In preferred embodiments, the aqueous lithium salt solution 140a, 140b includes $Li_2SO_4$. In preferred embodiments, the lithium ion-selective membrane 150a, 150b comprises a polymeric matrix and a plurality of ion-conducting particles disposed within the polymeric matrix. In some embodiments, the lithium ion-selective membrane 150a, 150b includes a glass frit with lithium ion conducting particles disposed within.

Figure 9:
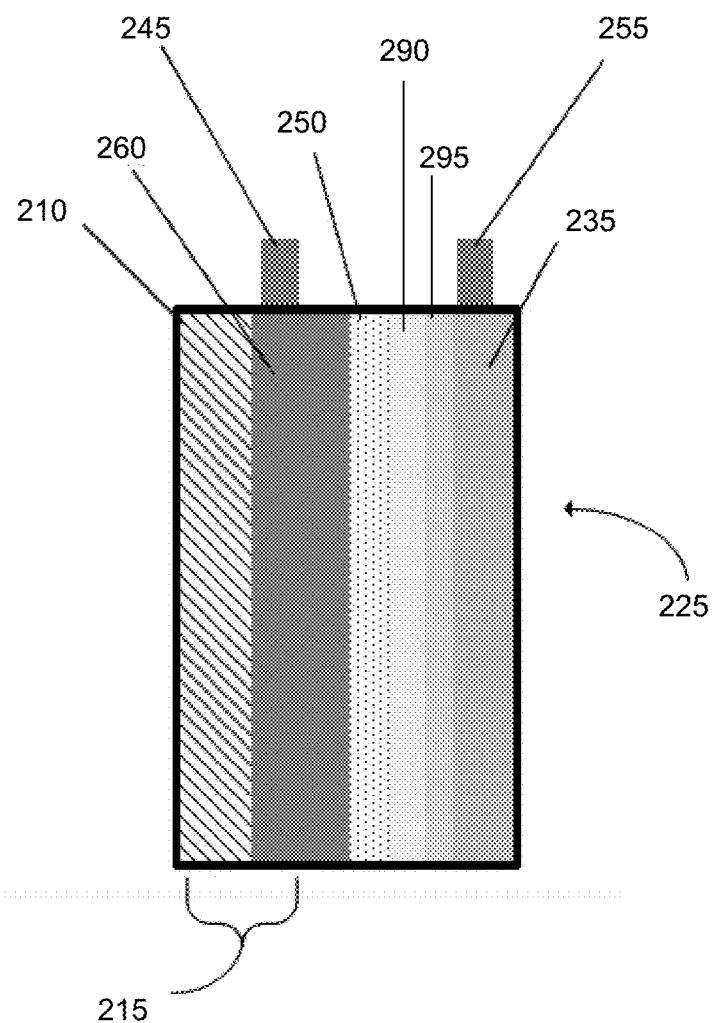
FIG. 9 shows a battery having as a working anode a single-sided lithium metal electrode, with a layer of highly pure lithium metal sandwiched between a conductive substrate and a lithium ion-selective membrane, the lithium ion-selective membrane configured to function as a solid state electrolyte.

FIG. 9 provides a galvanic cell 225 manufactured with a single-sided lithium metal electrode 215 configured to function as an anode. The lithium metal electrode 215 includes a conductive substrate 210, bonded to a layer of lithium metal 260, the lithium metal including no more than 5 ppm of non-metallic elements by mass. In some embodiments, the lithium metal includes no more than 1 ppm of non-metallic elements by mass. In some embodiments, the lithium metal includes no more than 1 ppm of nitrogen by mass. The conductive substrate 210 and the layer of lithium metal 260 together comprise the single-sided lithium metal electrode 215, of the galvanic cell 225. In some embodiments, the lithium metal electrode 215 has a specific capacity of greater than about 3800 mAh per gram of lithium metal. In some embodiments, the layer of lithium metal 260 has a density of between about 0.4 g/cm$^3$ and about 0.534 g/cm$^3$. In some embodiments, the layer of lithium metal 260 has a density of between about 0.45 g/cm$^3$ and about 0.543 g/cm$^3$. In preferred embodiments, the conductive substrate is selected from the group consisting of copper, aluminum, graphite coated copper, and nickel. The layer of lithium metal 260 has a first face and a second face and is bonded on the first face to the conductive substrate 210 and on the second face to the lithium ion-selective membrane 250. The lithium ion-selective membrane 250, is configured to function as a solid state electrolyte. The lithium ion-selective membrane 250 separates the layer of lithium metal 260 from a catholyte 290. In preferred embodiments, the catholyte 290 includes ionic liquid-forming salts. In preferred embodiments, the catholyte 290 comprises an ionic liquid. The catholyte 290 in turn separates the lithium ion-selective membrane 250 from a cathode/catholyte interface 295, which covers a face of a cathode 235, separating the cathode 235 from the catholyte 290. Electrical contacts to the anode 245 allow electrons to flow from the electrode 215 to corresponding electrical contacts to the cathode 255, and then on to the cathode 235. In this configuration, the lithium ion-selective membrane 250 is configured to function as a solid state electrolyte. By at least in part using the lithium ion-selective membrane as disclosed herein, the system herein can eliminate the need for an additional separator, which is typically utilized in conventional lithium batteries. The lithium ion-selective membrane not only separates the cathode and anode effectively but also allows for the selective passage of lithium ions.

During discharge of the battery, the layer of pure lithium metal is oxidized to lithium ions, releasing electrons which flow through the electrical contacts 245, 255 from the single-sided electrode 215 to the cathode 235, and lithium ions, which flow through the lithium ion-selective membrane 250 into the catholyte 290, and into the cathode 235, where electrons are taken up. In various embodiments, the catholyte 290 can include an organic cation and an inorganic ion, comprising a salt capable of forming an ionic liquid. In embodiments, the catholyte 290 comprises an ionic liquid. In embodiments, the catholyte 290 comprises lithium salts of an organic anion capable of forming ionic liquids, the organic anions selected from the group consisting of trifluoromethanesulfonyl-imide (TFSI), N-butyl-N-methylpyrrolidinium bis(trifluoromethanesulfonyl)imide (PyruTFSI), trifluoromethanesulfonyl-imide, bis(trifluoromethanesulfonyl)imide (LiTFSI), and 1-ethyl-3-methylimidazolium-bis(trifluoromethylsulfonyl)imide (EMI-TFSI). In some embodiments, the catholyte 290 comprises ionic liquid-forming salts dissolved in 1,3-dioxolane (DOL), 1,2 dimethoxyethane (DME), or tetraethylene glycol dimethyl ether (TEGDME). In an embodiment, the catholyte comprises concentrated (4.0-5.0 M) lithium bis(fluorosulfonyl)imide (LiFSI) in 1:1 DOL/DME.

Without being bound by theory, it is believed that elementally pure lithium metal chemically bonded to a substrate which is then chemically bonded to a lithium ion-selective membrane configured to function as a solid state electrolyte will eliminate impedance variations at the electrode/solid electrolyte separator interface, thereby minimizing dendrite formation. The lithium metal can be electrochemically bonded to a substrate. In some embodiments, the lithium metal layer and the current collector may be in close uniform contact with each other. In some embodiments, the lithium metal layer uniformly formed on the surface of the current collector may prevent any gaps between the lithium metal layer and the current collector.

Figure 10:
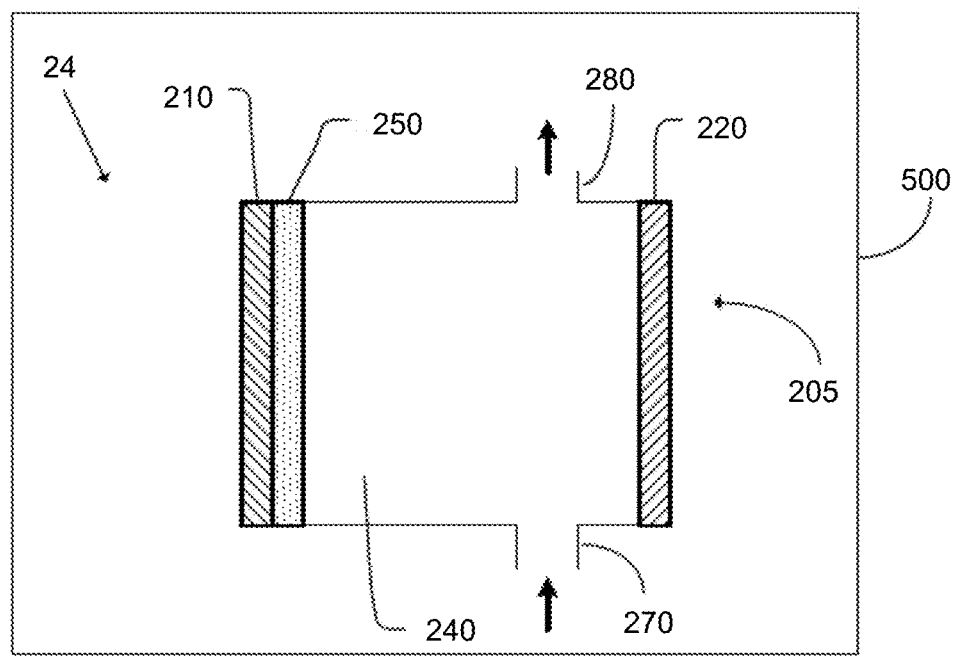
FIG. 10 shows an electrolytic cell suitable for manufacturing a single-sided lithium metal electrode as shown in FIG. 9, prior the plating of lithium metal on a conductive substrate of the cell, with a conductive substrate coated with a lithium ion-selective membrane.
Figure 11:
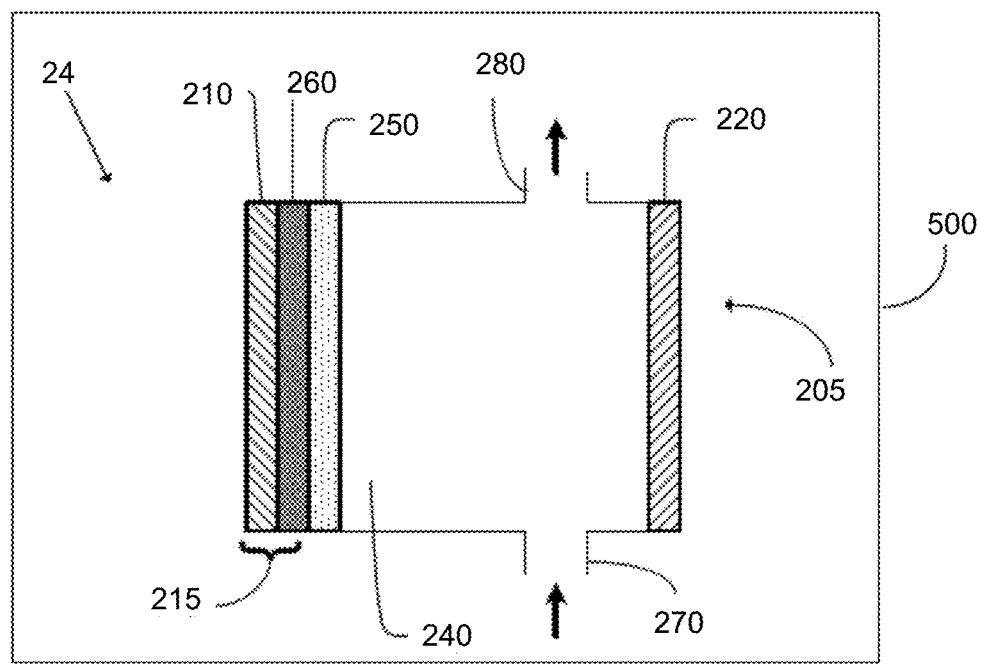
FIG. 11 shows the electrolytic cell of FIG. 10, after plating of lithium metal on the conductive substrate, the lithium metal being bonded on one side to the conductive substrate, and on the opposite side to the solid-state electrolyte, the electrode being suitable for use as a working anode in a lithium metal battery, according to an embodiment of the present disclosure.

In a method of manufacturing by electrodeposition the single-sided lithium electrode 215 of the galvanic cell 225 of FIG. 9, an electrolytic cell 205 is used. FIG. 10 shows the electrolytic cell 205 prior to electrodeposition and FIG. 11 shows the electrolytic cell following electrodeposition. According to the method, the electrolytic cell 205 is completely blanketed with a blanketing atmosphere 24, the blanketing atmosphere being inert to chemical reaction with lithium. In some embodiments, the blanketing atmosphere includes no more than 10 ppm of lithium reactive components on a molar basis. In some embodiments, the blanketing atmosphere includes no more than 5 ppm of lithium reactive components on a molar basis. In some embodiments, the blanketing atmosphere includes no more than 10 ppm of nitrogen on a per molar basis. In some embodiments, the blanketing atmosphere includes no more than 5 ppm of nitrogen on a per molar basis. In some embodiments, the blanketing atmosphere includes no more than 1 ppm of nitrogen on a per molar basis. In a preferred environment, the blanketing atmosphere comprises argon with a purity of greater than 99.998 weight percent. In the embodiment of FIGS. 10 and 11, the blanketing atmosphere 24 and the electrolytic cell 5 are enclosed in a gas-impermeable container 500. During the process of electrodeposition, the electrolytic cell 205 is confined to the blanketing atmosphere 24.

The electrolytic cell 205 includes a conductive substrate 210, configured as a negative electrode, an ion-selective membrane 250, an aqueous lithium salt solution 240, and a positive electrode 220. The aqueous lithium salt solution 240 is interposed between the conductive substrate 210 and the positive electrode 220. Prior to electrodeposition, as shown in FIG. 10, the lithium ion-selective membrane 250 covers the conductive substrate 210, and forms a barrier separating the lithium salt solution 240 and the conductive substrate 210. Prior to electrodeposition, as shown in FIG. 10, the conductive substrate 210 is physically coated with a lithium ion-selective membrane 250, configured to function as a solid state electrolyte. After electrodeposition, as shown in FIG. 11, a layer of lithium metal 260 is electrodeposited between the conductive substrate 210 and the lithium ion-selective membrane 250, bonding to both the conductive substrate 210 and to the lithium ion-selective membrane 250. During the process of electrodeposition, the lithium ion-selective membrane 250 separates the conductive substrate 210 and the electrodeposited lithium metal layer 260 from the lithium salt solution 240. The lithium ion-selective membrane 250 is configured to function as a solid state electrolyte, allowing the passage of lithium ions from the aqueous salt solution 240 to electrodeposit onto the surface of the conductive substrate 210, but precluding the passage of other chemical species.

In manufacturing the single-sided lithium metal electrode 215 for the galvanic cell embodied in FIG. 9, a variable voltage is applied across the positive electrode 220 and the conductive substrate 210 of the electrolytic cell 205, in order to maintain a constant current, thereby causing lithium ions to move through the aqueous lithium salt solution 240, through the lithium ion-selective membrane 250, travel to the surface of the conductive substrate 210, where each lithium ion gains an electron, thereby electrodepositing a layer of elemental lithium 260 onto the conductive substrate 210, the layer of elemental lithium thus forming and bonding to the conductive substrate on a first side of the layer of elemental lithium 260 and the lithium ion-selective membrane 250 on a second side of the layer of elemental lithium 260. In this manner, as shown in FIGS. 10 and 11, the single-sided lithium metal electrode 215 is manufactured so that a sandwich of the layer of lithium metal 260 is formed between the conductive substrate 210 and the lithium ion-selective membrane 250. During the process of electrodeposition, the conductive substrate 210 is stationary in the electrolytic cell.

In some embodiments, the electrolytic cell 205 of FIG. 10 is a flow chamber, with an entrance port 270 and an exit port 280 allowing aqueous lithium salt solution 240 to enter the electrolytic cell 205 to provide a renewable supply of lithium ions for electrodepositing.

In preferred embodiments, the constant current is between about 10 $mA/cm^2$ and about 50 $mA/cm^2$. In preferred embodiments, the constant current applied is about 25 $mA/cm^2$ to about 50 $mA/cm^2$. In preferred embodiments, the constant current applied is about 40 $mA/cm^2$ to about 50 $mA/cm^2$. In preferred embodiments, the constant current is applied for a time between about 1 minute and about 60 minutes.

In preferred embodiments, the aqueous lithium salt solution 240 is selected from the group consisting of $Li_2SO_4$, $Li_2CO_3$, and combinations thereof. In preferred embodiments, the aqueous lithium salt solution 240 includes Li$_2$SO$_4$. In some embodiments, the aqueous lithium salt solution comprises brine. In preferred embodiments, the lithium ion-selective membrane 250 comprises a polymeric matrix and a plurality of ion-conducting particles disposed within the polymeric matrix. In some embodiments, the lithium ion-selective membrane 250 includes a glass frit with lithium ion conducting particles disposed within.

In an alternative method of manufacturing by electrodeposition the single sided lithium electrode 215 of the galvanic cell 225 of FIG. 9, the electrolytic cell 5 of FIG. 6 is used. According to this method, the lithium ion-selective membrane 50 and the conductive substrate 10 both remain stationary in the electrolytic cell. A variable voltage is applied across the positive electrode 20 and the conductive substrate 10 of the electrolytic cell 5, in order to maintain a constant current, thereby causing lithium ions to move through the aqueous lithium salt solution 40, cross from the first chamber 26 to the second chamber 28, through the lithium ion-selective membrane 50, into the non-aqueous electrolyte, travel to the surface of the conductive substrate 10, where each lithium ion gains an electron, thereby causing the layer of elemental lithium 60 to be electrodeposited on the conductive substrate 10. As the layer of elemental lithium 60 grows, it displaces non-aqueous electrolyte 30 from the second chamber 28, eventually coming into contact with and bonding to the lithium ion-selective membrane 50, thereby forming the single-sided lithium metal electrode 215 of FIG. 9, comprising the conductive substrate 10 and the layer of lithium 60, wherein the layer of lithium 60 is bonded on one face to the conductive substrate 10 and on the other face to the lithium ion-selective membrane 50, which is configured to function as a solid state electrolyte.

Figure 12:
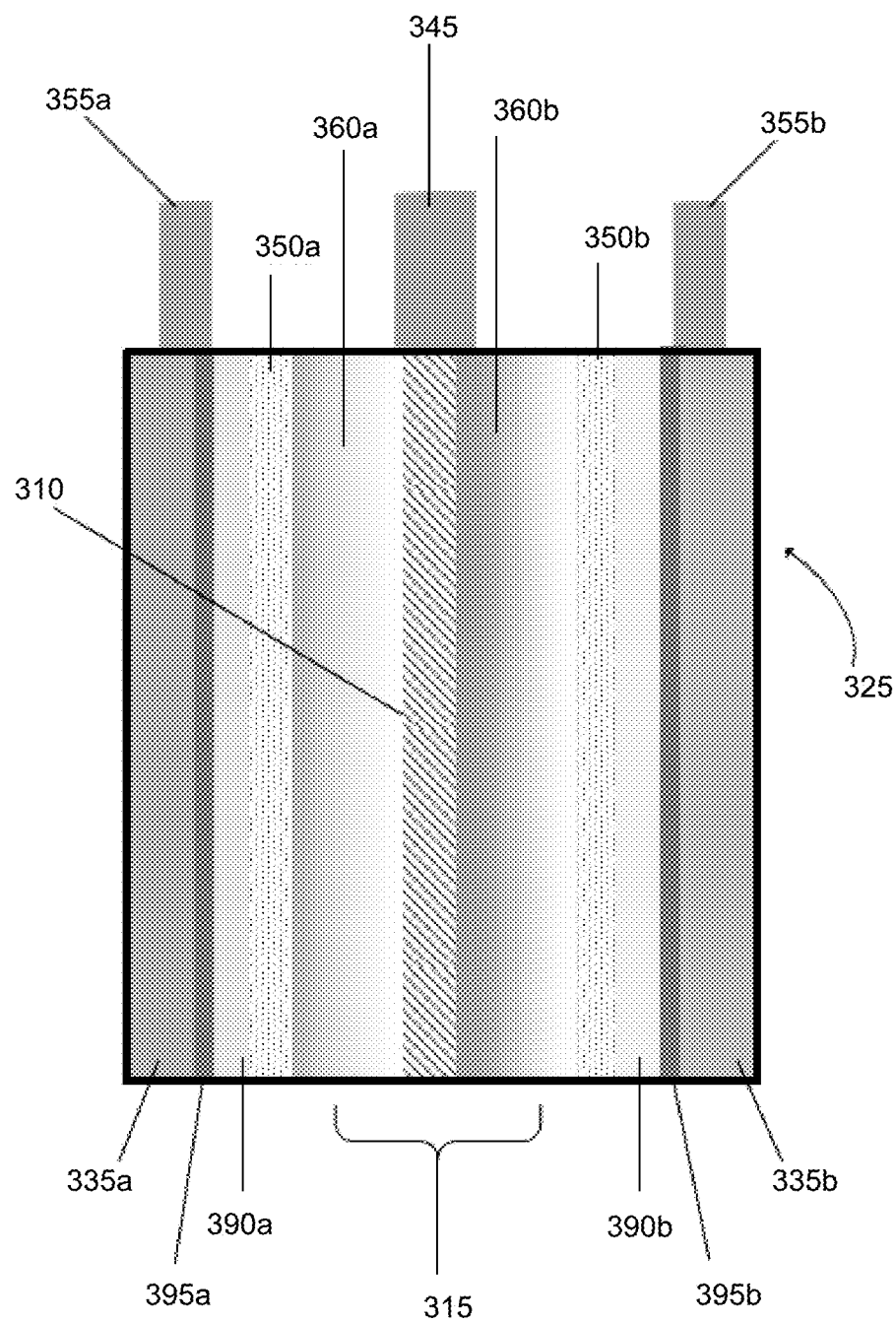
FIG. 12 shows a battery according to an embodiment of the invention, the battery having as a working anode a double-sided lithium electrode, with lithium metal sandwiched between a conductive substrate and a lithium ion-selective membrane, the lithium ion-selective membrane configured to function as a solid-state electrolyte.

FIG. 12 provides a galvanic cell 325 manufactured with a double-sided lithium metal electrode 315, configured to function as an anode. The double-sided lithium metal electrode 315 includes a conductive substrate 310, in the form of a plate having a first face and a second face, with the first face and the second face bonded to first and second lithium metal sheets, 360a and 360b, respectively, the lithium metal including no more than 5 ppm of non-metallic elements by mass. In some embodiments, the lithium metal includes no more than 1 ppm of non-metallic elements by mass. In some embodiments, the lithium metal includes no more than 1 ppm of nitrogen by mass. The conductive substrate 310 and the first and second layers of lithium metal, 360a, 360b, respectively, together comprise the double-sided lithium metal electrode 315 of the galvanic cell 325. In some embodiments, the lithium metal electrode 315 has a specific capacity of greater than about 3800 mAh per gram of lithium metal. In some embodiments, the first and the second layers of lithium metal 360a, 360b, each has a density of between about 0.4 g/cm$^3$ and about 0.534 g/cm$^3$. In some embodiments, the layers of lithium metal 360a, 360b, each has a density of between about 0.45 g/cm$^3$ and about 0.543 g/cm$^3$. In preferred embodiments, the conductive substrate is selected from the group consisting of copper, aluminum, graphite coated copper, and nickel. Each layer of lithium metal 360a, 360b has a first face and a second face and is bonded on the first face to the conductive substrate 310 and on the second face to the lithium ion-selective membrane 350a, 350b, respectively. The lithium ion-selective membranes 350a, 350b, are configured to function as solid state electrolytes. The lithium ion-selective membrane 350a separates the layer of lithium metal 360a from a catholyte 390a. In preferred embodiments, the catholyte 390a includes ionic liquid-forming salts. In preferred embodiments, the catholyte 390a comprises an ionic liquid. The catholyte 390a in turn separates the lithium ion-selective membrane 350a from a cathode/catholyte interface 395a, which covers a face of a cathode 335a, separating the cathode 335a from the ionic liquid 390a. The lithium ion-selective membrane 350b separates the layer of lithium metal 360b from a catholyte 390b. In preferred embodiments, the catholyte 390b includes ionic liquid-forming salts. In preferred embodiments, the catholyte 390b comprises an ionic liquid. The catholyte 390b in turn separates the lithium ion-selective membrane 350b from a cathode/catholyte interface 395b, which covers a face of a cathode 335b, separating the cathode 335b from the ionic liquid 390b.

An electrical contact to the anode 345 allows electrons to flow from the electrode 315 to corresponding electrical contacts to the two cathodes 355a, 355b and then on to the cathodes 335a, 335b, respectively. During discharge of the battery, the layers of pure lithium metal 360a, 360b are oxidized to lithium ions, releasing electrons which flow through the electrical contact 345, through the electrical contacts 355a, 355b from the double-sided electrode 315 to the cathodes 335a, 335b and lithium ions, which flow through the lithium ion-selective membranes 350a, 350b into the ionic liquids 390a, 390b, and into the cathodes, 335a, 335b, where they intercalate into the cathodes 335a, 335b where electrons are taken up. In various embodiments, the catholyte can include an organic cation and an inorganic ion, comprising a salt capable of forming an ionic liquid. In various embodiments, the catholytes 390a, 390b can include an organic cation and an inorganic ion, comprising a salt capable of forming an ionic liquid. In embodiments, the catholytes 390a, 390b comprise an ionic liquid. In embodiments, the catholytes 390a, 390b comprise lithium salts of an organic anion capable of forming ionic liquids, the organic anions selected from the group consisting of trifluoromethanesulfonyl-imide (TFSI), N-butyl-N-methylpyrrolidinium bis(trifluoromethanesulfonyl)imide (PyruTFSI), trifluoromethanesulfonyl-imide, bis(trifluoromethanesulfonyl)imide (LiTFSI), and 1-ethyl-3-methylimidazolium-bis (trifluoromethylsulfonyl)imide (EMI-TFSI). In some embodiments, the catholytes 390a, 390b comprise ionic liquid-forming salts dissolved in 1,3-dioxolane (DOL), 1,2 dimethoxyethane (DME), or tetraethyl ene glycol dimethyl ether (TEGDME). In an embodiment, the catholytes 390a, 390b comprise concentrated (4.0-5.0 M) lithium bis(fluorosulfonyl)imide (LiFSI) in 1:1 DOL/DME.

Without being bound by theory, it is believed that elementally pure lithium metal chemically bonded to a substrate which is then chemically bonded to a lithium ion-selective membrane configured to function as a solid state electrolyte will eliminate impedance variations at the electrode/solid electrolyte separator interface, thereby minimizing dendrite formation.

Figure 13:
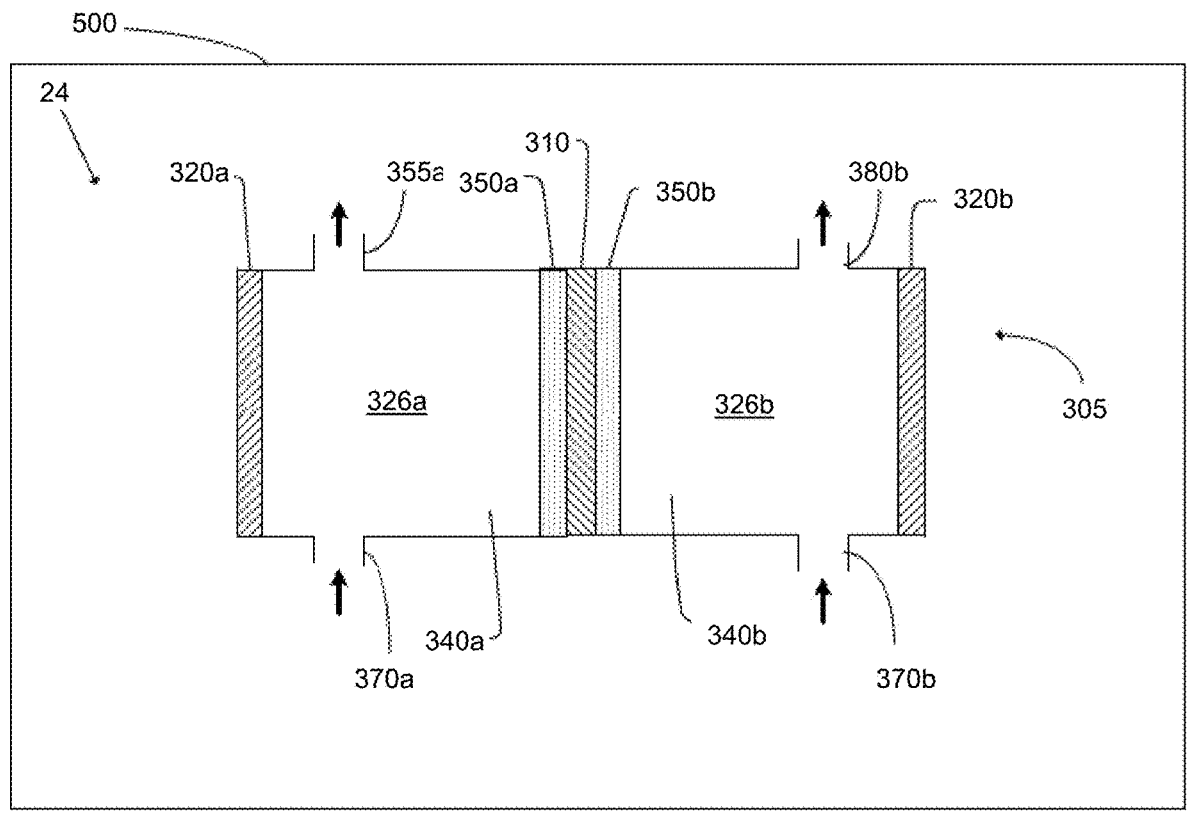
FIG. 13 shows an electrolytic cell suitable for manufacturing a double-sided lithium metal electrode of the type embodied in FIG. 12, prior to the plating of lithium metal on the two sides of the conductive substrate of the cell, wherein the conductive substrate is covered with a lithium ion-selective membrane on both of its two faces.
Figure 14:
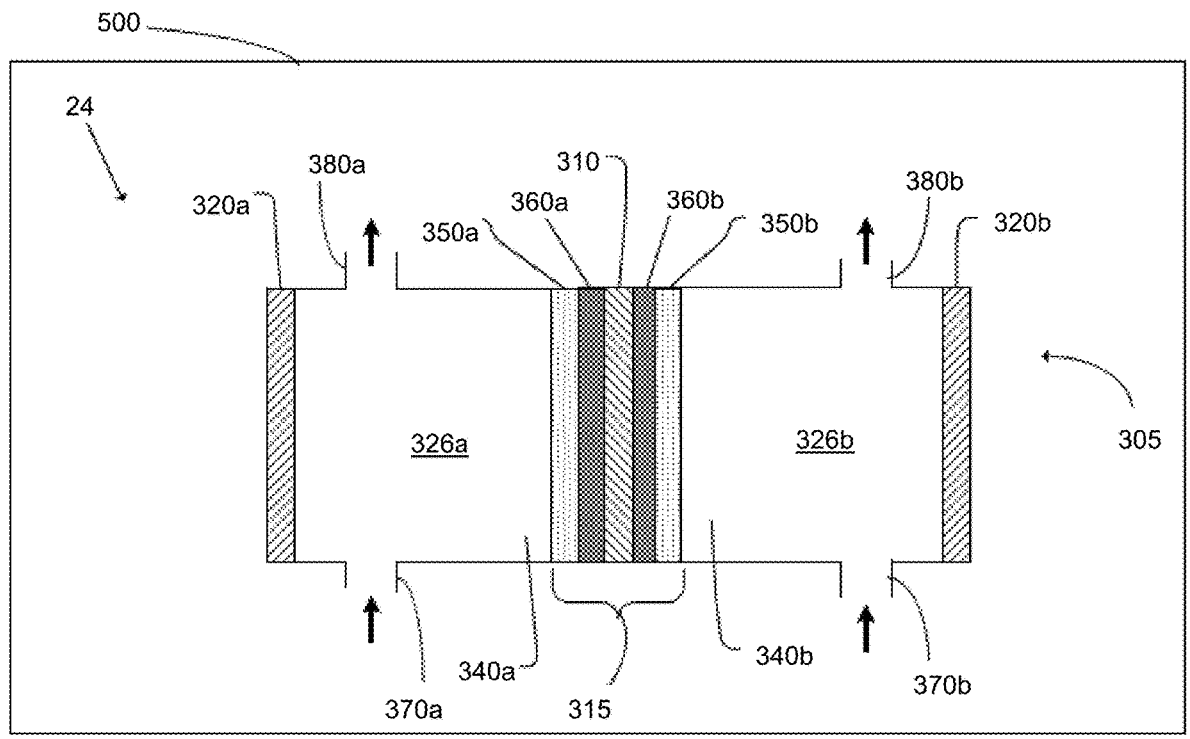
FIG. 14 shows the electrolytic cell of FIG. 13, after plating of lithium metal on each the two faces of a conductive substrate, where for each face, the lithium metal is bonded on one side to the conductive substrate, and on the opposite side to the solid-state electrolyte, the electrode being suitable for use as a working anode in a lithium metal battery, according to an embodiment of the present disclosure.

In a method of manufacturing by electrodeposition the double-sided lithium electrode 315 of the galvanic cell 325 of FIG. 12, an electrolytic cell 305 is used. FIG. 13 shows the electrolytic cell 305 prior to electrodeposition and FIG. 14 shows the electrolytic cell following electrodeposition. According to the method, the electrolytic cell 305 is completely blanketed with a blanketing atmosphere 24, the blanketing atmosphere being inert to chemical reaction with lithium. In some embodiments, the blanketing atmosphere includes no more than 10 ppm of lithium reactive components on a molar basis. In some embodiments, the blanketing atmosphere includes no more than 5 ppm of lithium reactive components on a molar basis. In some embodiments, the blanketing atmosphere includes no more than 10 ppm of nitrogen on a per molar basis. In some embodiments, the blanketing atmosphere includes no more than 5 ppm of nitrogen on a per molar basis. In some embodiments, the blanketing atmosphere includes no more than 1 ppm of nitrogen on a per molar basis. In a preferred environment, the blanketing atmosphere comprises argon with a purity of greater than 99.998 weight percent. In the embodiment of FIGS. 13 and 14, the blanketing atmosphere 24 and the electrolytic cell 5 are enclosed in a gas-impermeable container 500. During the process of electrodeposition, the electrolytic cell 305 is confined to the blanketing atmosphere 24.

The electrolytic cell 305 includes a first chamber 326a, and a second chamber 326b, the first chamber having a proximal end and a distal end, and the second chamber having a proximal and a distal end. Contiguous to and separating the first chamber 326a from the second chamber 326b is the conductive substrate 310, the conductive substrate 310 having a first side facing the first chamber 326a and a second side facing the second chamber 326b. Prior to electrodeposition, as embodied in FIG. 13, the first side and the second side of the conductive substrate 310 are coated with, respectively, a first lithium ion-selective membrane 350a configured to function as a solid state electrolyte, extending into the proximal end of the first chamber 326a, and a second lithium ion-selective membrane 350b, configured to function as a solid state electrolyte, extending into the proximal end of the second chamber 326b. At their distal ends, the first chamber 326a and the second chambers, 326b contain, respectively, positive electrodes 320a and 320b. The positive electrode 320a and the first lithium ion-selective membrane 350a are separated by an aqueous salt solution 340a, the aqueous salt solution 340a physically contacting both the positive electrode 320a and the lithium ion-selective membrane 350a. In a like manner, the positive electrode 320b and the first lithium ion-selective membrane 350b are separated by an aqueous salt solution 340b, the aqueous salt solution 340b physically contacting both the positive electrode 320b and the lithium ion-selective membrane 350b.

After electrodeposition, as shown in FIG. 14, layers of lithium metal, 320a, 320b, are electrodeposited between the conductive substrate 310 and the lithium ion-selective membranes, 350a, 350b, respectively, the layers of lithium metal 320a, 320b, bonding to the conductive substrate 310 and the lithium ion-selective membranes 350a, 350b, respectively.

During the process of electrodeposition, the lithium ion-selective membranes 350a, 350b, separate the conductive substrate 310 and the electrodeposited lithium metal layers 360a, 360b, respectively, from the lithium salt solutions 340a, 340b.

The lithium ion-selective membranes 350a, 350b are configured function as solid state electrolytes, allowing lithium ions to pass between the aqueous lithium salt solutions 340a, 340b, and the conductive substrate 310, but preventing the passage of other chemical species.

In manufacturing the double-sided lithium metal electrode 315 for the galvanic cell embodied in FIG. 12, a variable voltage is applied across the positive electrodes 320a, 320b and the conductive substrate 310 of the electrolytic cell 305, in order to maintain a constant current, thereby causing lithium ions to move through the aqueous lithium salt solutions 340a, 340b, respectively, through the lithium ion-selective membranes 350a, 350b, respectively, travel to the surface of the conductive substrate 310, where each lithium ion gains an electron, thereby electrodepositing the layers of elemental lithium 360a, 360b onto the first side and the second side, respectively, of the conductive substrate 310, the layers of elemental lithium 360a, 360b thus forming and bonding to the conductive substrate 310 and, respectively, to the lithium ion-selective membranes 350a, 350b. In this manner, as shown in FIGS. 13 and 14, the double-sided lithium metal electrode 315 is manufactured as a sandwich with a central conductive substrate 310 bounded on opposite sides by layers of elemental lithium 360s, 360b, the layers of elemental lithium 360a, 360b in turn bounded by layers of lithium ion-selective membrane 350a, 350b. During the process of electrodeposition, the conductive substrate 310 is stationary in the electrolytic cell.

In some embodiments, the first and second chambers 326a, 326b of the electrolytic cell 305 of FIGS. 13 and 14 are flow chambers, with entrance ports 370a, 370b and exit ports 380a, 380b allowing aqueous lithium salt solutions 340a, 340b to enter the first chamber 326a and the second chamber 326b to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 340a, 340b is selected from the group consisting of $Li_2SO_4$, $Li_2CO_3$, and combinations thereof. In preferred embodiments, the aqueous lithium salt solution 340a, 340b includes $Li_2SO_4$. In preferred embodiments, the lithium ion-selective membrane 350a, 350b comprises a polymeric matrix and a plurality of ion-conducting particles disposed within the polymeric matrix. In some embodiments, the lithium ion-selective membrane 350a, 350b includes a glass frit with lithium ion conducting particles disposed within.

In an alternative method of manufacturing by electrodeposition the double sided lithium electrode 315 of the galvanic cell 325 of FIG. 12, the electrolytic cell 105 of FIG. 8 is used. According to this method, the lithium ion-selective membranes 150a, 150b and the conductive substrate 110 each remain stationary in the electrolytic cell. A variable voltage is applied across the positive electrodes 120a, 120b and the conductive substrate 110 of the electrolytic cell 105, in order to maintain a constant current, thereby causing lithium ions to move through the aqueous lithium salt solutions 140a, 140b, cross from the first and fourth chambers 126a, 126b to the second and third chambers 128a, 128b, respectively, through the lithium ion-selective membranes 150a, 150b, into the non-aqueous electrolytes 130a, 130b, travel to the first and the second faces of the conductive substrate 110, where each lithium ion gains an electron, thereby causing layers of elemental lithium 160a, 160b to be electrodeposited on the conductive substrate 110. As the layers of elemental lithium 160a, 160b grow, they displace non-aqueous electrolytes 130a, 130b from the second and third chambers 128a, 128b, respectively, eventually coming into contact with and bonding to the lithium ion-selective membranes 150a, 150b, thereby forming the double-sided lithium metal electrode 315 of FIG. 12, comprising the conductive substrate 110 and the layers of lithium 160a, 160b, wherein the layers of lithium 160a, 160b are bonded, respectively, on the first and second faces of the conductive substrate 110 and to the lithium ion-selective membranes

150a, 150b, wherein the lithium ion-selective membranes 150a, 150b, are configured to function as solid state electrolytes.

In preferred embodiments, the lithium metal electrodes described herein can be integrated into batteries, including but not limited to the batteries embodied in FIGS. 9 and 12.

The methods described above are well-suited for vertically integrated battery production, thereby allowing for a supply chain for LMB production that is regionally controlled in any region where lithium is mined (for example, in the US). The development of such a local regional supply chain greatly reduces costs, and provides LMBs that are inherently cobalt free.

Figure 15:
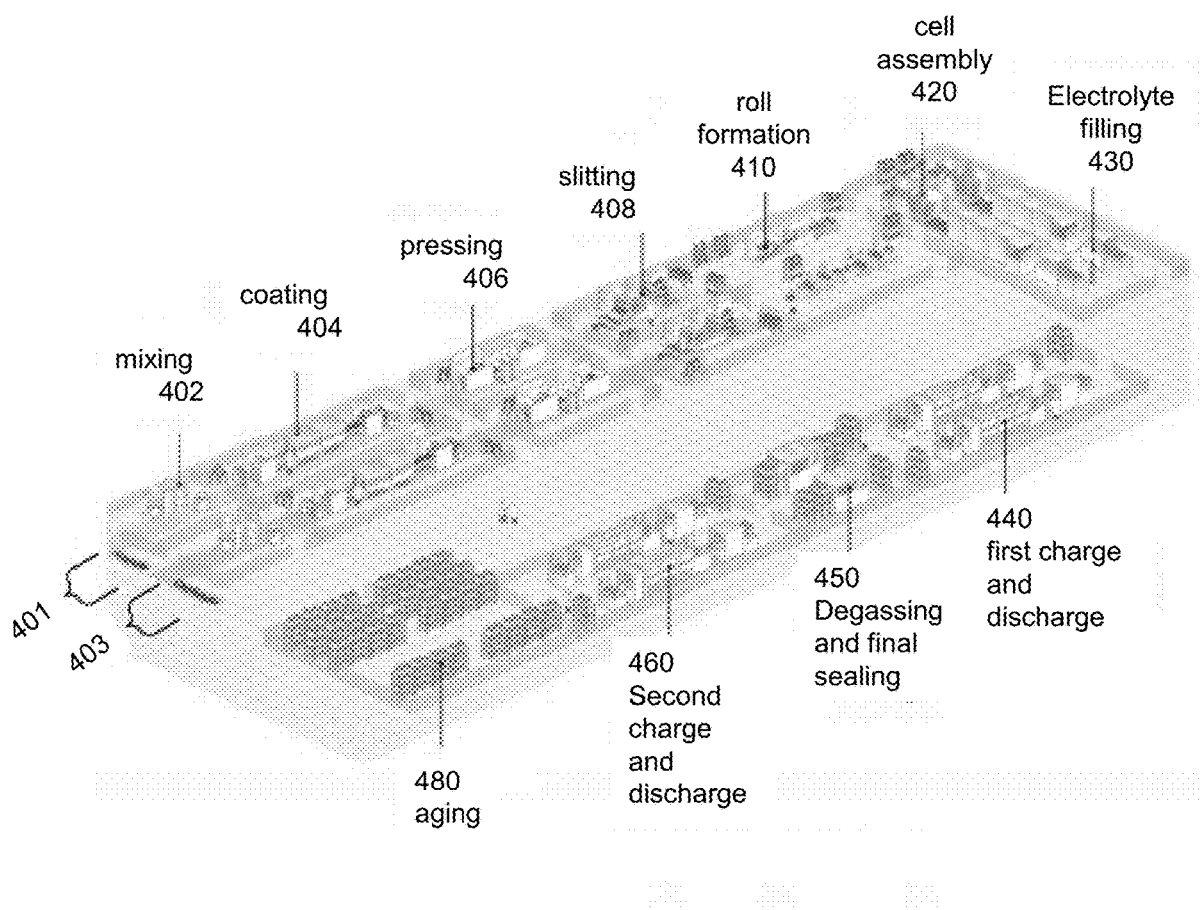
FIG. 15 shows a lithium ion battery manufacturing facility, according to Prior Art.

A typical fabrication facility for lithium ion batteries according to the prior art is shown in FIG. 15. Manufacturing stages involve fabrication of anodes 401 and cathodes 403, cell assembly and cell finishing and testing. Anodes 401 and cathodes 403 follow parallel tracks involving mixing 402 to form a slurry, coating 404 onto conductive foil, pressing 406 to bond coating to foil, and slitting 408 to form desired electrode dimensions. Following roll formation 410, cells are assembled 420, filled with electrolyte and sealed 430. Because LIB cells are manufactured in a fully discharged state, the final stage of the process involves cell finishing, a time-consuming that may include steps of charge and discharge 440, degassing and final sealing 450, further charge and discharge 460 and finally aging 480. Because of the multiple, time-consuming steps, the finishing process can take between 20-30 days.

According to the embodiments described above, lithium metal electrodes can be fabricated in situ, thereby providing lithium metal anodes for LMBs in a fully charged state. According to the embodiment of FIG. 16, the processes described above for lithium metal anode fabrication can be vertically integrated into a cost- and energy-efficient manufacturing method for LMBs. As embodied in FIG. 16, the cathode 403 is still manufactured by conventional methods involving mixing 402, coating 404, and pressing 406. However, the working anode is now formed by electrolysis 405 according to the process embodied in FIG. 4, involving blanketing an electrolytic cell with a blanketing atmosphere 2, applying constant current to the cell 4, flowing Li across a lithium selective membrane 6, reducing Li to Li metal 8, and fabricating a Li metal battery 12, by steps involving pouch formation 412, cell assembly 420, cell filling and sealing 430, and finishing steps 490. Cell assembly 420 includes the steps of assembling a casing with contents including the working anode, and other components to form a lithium metal battery, and sealing the casing to isolate the contents from reactants present in the air.

Figure 16:
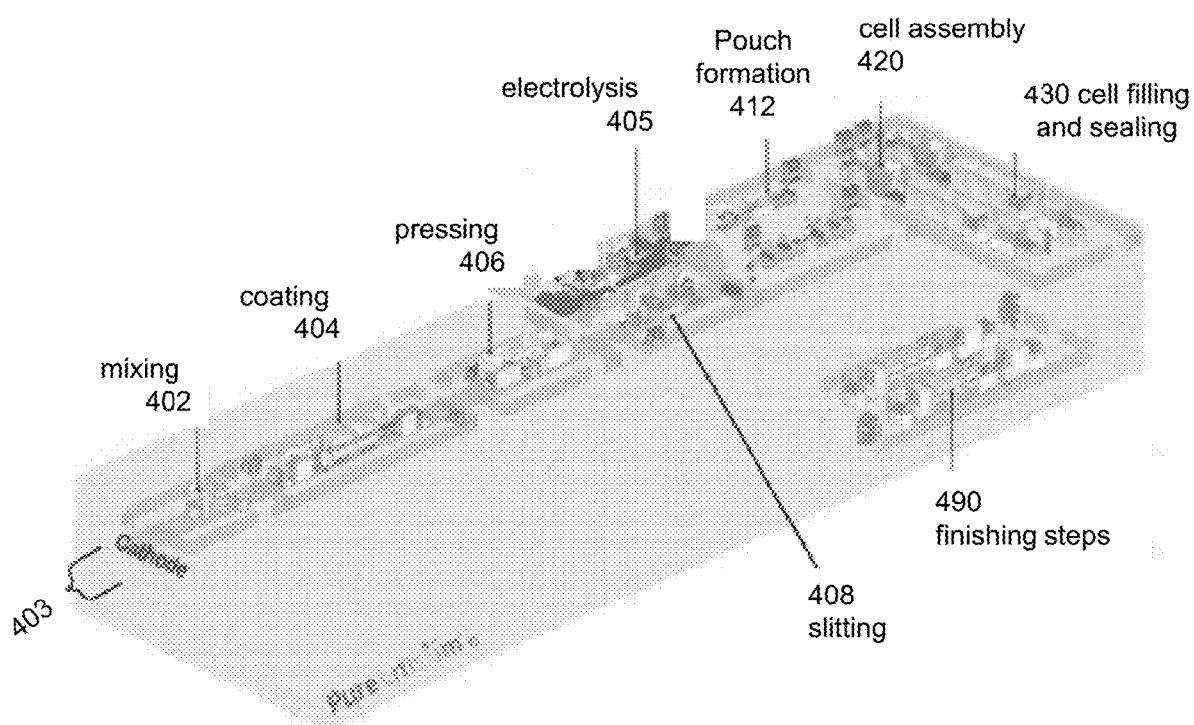
FIG. 16 shows a vertically integrated lithium metal battery manufacturing facility with manufacturing as embodied in the methods described in the present disclosure.

As embodied in FIG. 16, LMB manufacture according to the current disclosure is a vertically integrated process that replaces the anode fabrication process by an in situ low-temperature electrodeposition process, utilizing as feedstock an aqueous lithium salt solution, where the electrodeposition occurs through a lithium ion-selective membrane to produce a highly pure lithium metal anode, resistant to dendrite formation. Because lithium metal negative electrodes are fabricated in a fully charged state, the lengthy formation process required for lithium ion batteries is not required.

Because of the use of the lithium ion-selective membrane, and the high current densities, a relatively inexpensive impure feed such as $Li_2SO_4$ can be used for electrodeposition, saving energy and reducing costs. Impurities in the lithium metal anodes are further reduced by performing the electrodeposition entirely in a blanketing atmosphere, substantially depleted of lithium reactive components including nitrogen, oxygen, ozone, oxides of nitrogen, sulfur and phosphorous, carbon dioxide, halogens, hydrogen halides, and water. In preferred embodiments, the inert atmosphere is purified argon gas. In some embodiments, steps following electrodeposition, including cell assembly, electrolyte/cell filling and sealing are also performed in the inert atmosphere. In other embodiments, only the lithium electrodeposition occurs under inert atmosphere, with remainder of battery manufacturing processes taking place in "dry air," where dry air refers to air with less than 1% RH (relative humidity) (−45° C. dew point). In preferred embodiments, during LMB manufacture the temperature is kept between about 20° C. and about 30° C. In preferred embodiments, during LMB manufacture the temperature is kept between about 23° C. and about 27° C.

Figure 17:
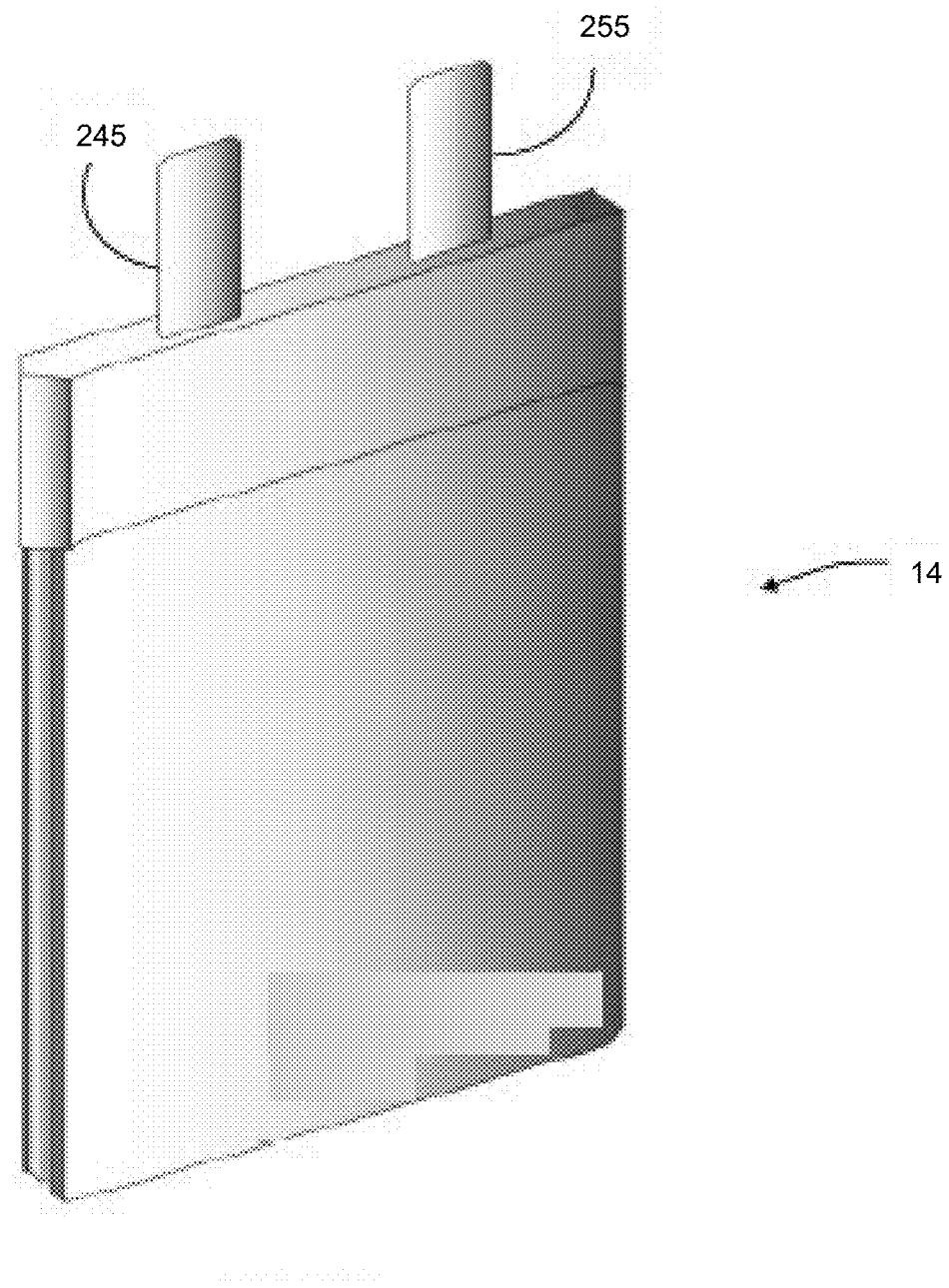
FIG. 17 shows a battery case for a battery with a single-sided lithium anode according to embodiments of the present disclosure.
Figure 18:
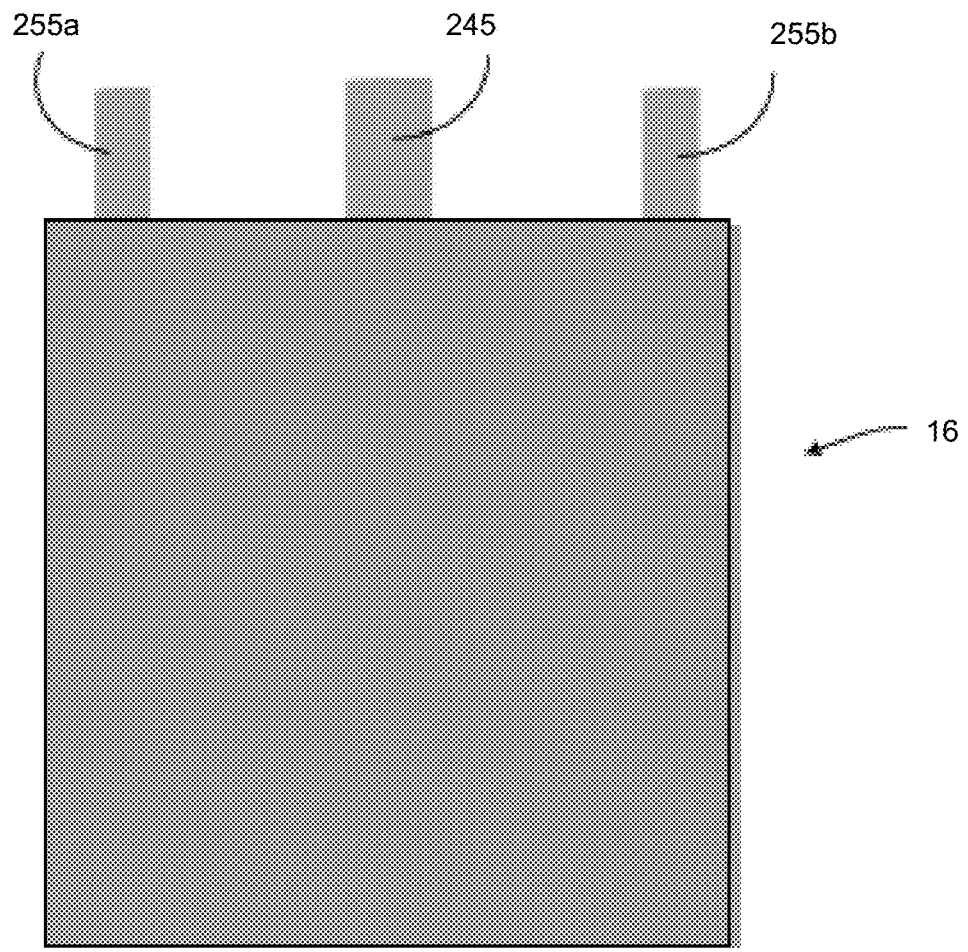
FIG. 18 shows a battery case for a battery with a double-sided lithium anode according to embodiments of the present disclosure.

A variety of different LMB battery configurations are understood to be encompassed by the disclosure described above. FIG. 17 embodies a single-cell battery configuration 14, shown as manufactured with a battery case, showing electrical contacts to the anode 245 and to the cathode 255. FIG. 18 embodies a double-cell battery configuration 16, as manufactured with a battery case, showing a single electrical contact to the anode 245, and two electrical contacts 255a, 255b, to the cathode.

The embodiments of the disclosure described above are intended to be merely exemplary; numerous variations and modifications will be apparent to those skilled in the art. All such variations and modifications are intended to be within the scope of the present disclosure as defined in any appended claims.

FIG. 4 shows steps in manufacturing a lithium metal battery (LMB) according to embodiments of the current disclosure. An electrolytic cell, such as in the embodiments of FIGS. 5, 7, 9, 10, 12, and 13 is blanketed with blanketing atmosphere 2, the blanketing atmosphere being substantially free of lithium reactive components, including nitrogen, oxygen, ozone, oxides of nitrogen, sulfur and phosphorous, carbon dioxide, halogens, hydrogen halides, and water. In some embodiments, the blanketing atmosphere includes no more than 10 ppm of lithium reactive components on a molar basis. In some embodiments, the blanketing atmosphere includes no more than 5 ppm of lithium reactive components on a molar basis. In preferred embodiments, the blanketing atmosphere contains no more than 10 ppm nitrogen on a molar basis. In preferred embodiments, the blanketing atmosphere contains no more than 5 ppm nitrogen on a molar basis. In preferred embodiments, the blanketing atmosphere contains no more than 1 ppm nitrogen on a molar basis. In preferred embodiments, the blanketing atmosphere is argon gas. In preferred embodiments, the argon gas has a purity of greater than 99.998 weight percent. The electrolytic cell operates at or near room temperature, and uses an aqueous lithium salt solution as an anolyte providing a lithium feed for electrodepositing to form a negative electrode. In preferred embodiments, the aqueous lithium salt solution includes lithium sulfate ($Li_2SO_4$) and/or lithium carbonate ($Li_2CO_3$). When a $Li_2SO_4$ solution is used as feed, the only byproduct is $O_2$ gas which is generated at the anode, vented from the anolyte, and does not come into contact with the inert catholyte area. $Li_2SO_4$ is a lithium feedstock that is very low in the process chain, and thus $Li_2SO_4$ solutions provide an economical source of lithium ions for methods according to the instant disclosure. When $Li_2CO_3$ is used as feedstock, the minimal amount of carbon dioxide generated can likewise be vented off at the anode of the electrolysis cell. Typically, $Li_2CO_3$ is more expensive than $Li_2SO_4$. However, it is not uncommon for battery manufacturers to receive lithium carbonate that fails to meet quality control standards, and such lithium carbonate could be easily repurposed for lithium metal production. The aqueous lithium salt solutions do not need to be highly concentrated since as lithium ions are depleted by electrodeposition, flow cells may allow depleted lithium ions to be replaced. The aqueous lithium salt solution can be a brine.

Voltage across the electrolytic cell is regulated in order to apply a constant current to the cell 4. The applied voltage causes lithium ions to flow across a lithium ion-selective membrane from the anolyte to a catholyte 6, wherein the lithium ion-selective membrane is configured to allow the passage of lithium ion but to preclude the passage of other chemical species. At the cathode, lithium ion is reduced to the lithium metal, thereby plating onto a conductive substrate, and forming a lithium metal electrode 8. In some embodiments the conductive substrate is selected from the group consisting of copper, aluminum, graphite coated copper, and nickel. In some embodiments, the conductive substrate is copper. When constant current is applied within the range of about 10 mA/cm$^2$ to about 50 mA/cm$^2$, the lithium ions crossing the lithium ion-selective membrane and electrodepositing onto a conductive substrate do not produce nanorods or dendrites. Rather, current within this range produces an extremely dense lithium metal deposit and allows electrodeposition to proceed to completion in between one and 60 minutes. In preferred embodiments, the constant current applied is about 10 mA/cm$^2$ to about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the density of the lithium metal deposited ranges from about 0.4 g/cm$^3$ to 0.543 g/cm$^3$. In some preferred embodiments the density of lithium metal deposited ranges from 0.45 g/cm$^3$ to 0.543 g/cm$^3$. A constant current of about 10 mA/cm$^2$ to about 50 mA/cm$^2$ is higher than the operating current during charge/discharge cycles of operating batteries manufactured using lithium metal electrodes of the disclosure. Lithium metal electrodes formed at higher current densities than are used in an operating battery enhance the charge-discharge recycling capacity of such batteries. Without being bound by theory, it is believed that lithium metal electrodes formed at higher current densities than used in an operating battery will not form dendrites upon cycling if there are no impurities elsewhere in the battery. During the electrodeposition process, lithium continually passes through a lithium ion-selective membrane and accumulates on the conductive substrate until the desired thickness is achieved (a film of 15 pm can be made in under five minutes). Only lithium ions pass through from the lithium ion containing aqueous electrolyte, allowing for the use of inexpensive impure feed solutions containing Li$_2$SO$_4$ and/or Li$_2$CO$_3$. The lithium electrodeposited on the negative electrode is elementally pure and remains so because it is never handled or exposed to air prior to entering a battery. Because the electrodepositing occurs in a blanketing atmosphere substantially free of lithium-reactive components, including nitrogen, the formation of impurities, including in particular Li$_3$N, is avoided.

In some embodiments, the lithium electrodeposited on the negative electrode coats all sides of the negative electrode. In some embodiments, the copper is in the form of a mesh. In some embodiments, the copper is in the form of a foam. In some embodiments, the conductive substrate comprises a plate with two faces, and lithium metal coats at least one face of the plate. In some embodiments, the lithium metal coats both of the two faces of the plate.

In some embodiments, the lithium ion-selective membrane is a hybrid organic-inorganic membrane including a polymeric matrix and a plurality of ion-conducting particles disposed within the polymeric matrix. In some such embodiments, an inorganic coating is deposited on the polymeric matrix, the inorganic coating being a uniform layer of 1 to 10,000 atoms thick (0.1 nanometer to 5 micrometers). In some embodiments, the polymer may be a silica-based polyurethane, polyethylene oxide, polystyrene, or a polyamide.

In some embodiments, the lithium ion-selective membrane comprises a glass frit with lithium ion conducting particles disposed within.

In some embodiments, the ion conducting particles are selected from the group consisting of LifePO$_4$, LiCoO$_2$, NASICON electrolytes, lithium-lanthanum titanates (LLTO), garnet type electrolytes, LISICON and Thio-LISICON electrolytes, Li$_7$La$_3$Zr$_3$O$_{12}$ (LLZO), the cubic phase (c-LLZO).

Finally, the lithium metal electrode thus formed is used in the fabrication of a LMB 12. In some embodiments, all of the steps in the manufacturing method are performed at a single manufacturing facility. In some embodiments, the single manufacturing facility is contained in an area of no greater than 10 km$^2$. In some embodiments the manufacturing facility is contained in an area less than about 1 km$^2$. Because lithium metal batteries of the instant disclosure are fabricated in a fully charged state, the invention reduces the footprint, cost and time of rechargeable batteries compared to conventional LIBs, which are initially fabricated in an uncharged state, and require timeconsuming finishing steps to obtain a fully charged battery. The manufacturing facility can be operatively coupled to a lithium resource mining facility. The manufacturing facility and a lithium resource mining facility can be contained in an area of no greater than 10 km$^2$. The manufacturing facility and a lithium resource mining facility can be contained in an area of no greater than 1 km$^2$. The lithium resource can comprise brine.

FIG. 5 provides a single-sided lithium electrode 15 according to an embodiment of the disclosure. The lithium electrode 15 includes a conductive substrate 10, in the form of a plate having two faces. In preferred embodiments, the conductive substrate is selected from the group consisting of copper, aluminum, graphite coated copper, and nickel. Bonded to one of the two faces of the conductive substrate is a layer of lithium metal 60, the lithium metal including no more than 5 ppm of non-metallic elements by mass. In some embodiments, the lithium metal includes no more than 1 ppm of non-metallic elements by mass. In some embodiments, the lithium metal includes no more than 1 ppm of nitrogen by mass. In some embodiments, the layer of lithium metal 60 has a thickness between about 1 micron and about 10 microns. The conductive substrate 10 and the layer of lithium metal 60 together comprise the single-sided lithium metal electrode 15, suitable for use as a fully charged working anode in a LMB. In some embodiments, the lithium metal electrode 15 has a specific capacity of greater than about 3800 mAh per gram of lithium metal. In some embodiments, the layer of lithium metal 60 has a density of between about 0.4 g/cm$^3$ and about 0.534 g/cm$^3$. In some embodiments, the layer of lithium metal 60 has a density of between about 0.45 g/cm$^3$ and about 0.543 g/cm$^3$.

In a method of manufacturing the single-sided lithium electrode 15 shown in FIG. 5, an electrolytic cell 5 is used, as shown in FIG. 6. During the manufacturing process, the electrolytic cell 5 of this embodiment is completely blanketed with a blanketing atmosphere 24, the blanketing atmosphere being substantially free of lithium reactive components. In some embodiments, the blanketing atmosphere includes no more than 10 ppm of lithium reactive components on a molar basis. In some embodiments, the blanketing atmosphere includes no more than 5 ppm of lithium reactive components on a molar basis. In some embodiments, the blanketing atmosphere includes no more than 10 ppm of nitrogen on a per molar basis. In some embodiments, the blanketing atmosphere includes no more than 5 ppm of nitrogen on a per molar basis. In some embodiments, the blanketing atmosphere includes no more than 1 ppm of nitrogen on a per molar basis. In a preferred environment, the blanketing atmosphere comprises argon with a purity of greater than 99.998 weight percent. In the embodiment of FIG. 6, the blanketing atmosphere 24 and the electrolytic cell 5 are enclosed in a gas-impermeable container 500. The cell 5 includes a first chamber 26 and a second chamber 28. The first chamber 26 contains a positive electrode 20 and an aqueous lithium salt solution 40 in contact with the positive electrode 20. The second chamber 28 contains the lithium metal electrode 15, a lithium ion-selective membrane 50, and a non-aqueous electrolyte 30. The lithium ion-selective membrane 50 has a first side and a second side, and physically separates the first chamber 26 from the second chamber 28, contacting the aqueous lithium salt solution 40 on the first side. In the second chamber 28, the non-aqueous electrolyte 30 is disposed between the lithium metal electrode 15 and the second side of the lithium ion-selective membrane 50, physically contacting both the lithium metal electrode 15 and the second side of the lithium ion-selective membrane 50. The lithium metal electrode 15 includes a conductive substrate 10, stationary during lithium metal electrodeposition within the second chamber, electrodeposited with a layer of elemental lithium 60. The lithium ion-selective membrane 50 allows lithium ions to pass between the first chamber 26 and the second chamber 28, but precludes the passage of other chemical species between the two chambers. In particular, the lithium ion-selective membrane does not allow water to pass from the first chamber 26 to the second chamber 28.

In manufacturing the single-sided lithium metal electrode 15 embodied in FIG. 5, a variable voltage is applied across the positive electrode 20 and the conductive substrate 10 of the electrolytic cell 5, in order to maintain a constant current, thereby causing lithium ions to move through the aqueous lithium salt solution 40, cross from the first chamber 26 to the second chamber 28, through the lithium ion-selective membrane 50, into the non-aqueous electrolyte, travel to the surface of the stationary conductive substrate 10, where each lithium ion gains an electron, thereby causing the layer of elemental lithium 60 to be electrodeposited on the conductive substrate 10, thereby forming the single-sided lithium metal electrode 15.

In some embodiments, the first chamber 26 of the electrolytic cell 5 of FIG. 5 is a flow chamber, with an entrance port 70 and an exit port 80 allowing aqueous lithium salt solution to enter the first chamber 26 to provide a renewable supply of lithium ions for electrodepositing.

In preferred embodiments, the constant current is between about 10 mA/cm² and about 50 mA/cm². In preferred embodiments, the constant current applied is about 25 mA/cm² to about 50 mA/cm². In preferred embodiments, the constant current applied is about 40 mA/cm² to about 50 mA/cm². In preferred embodiments, the constant current is applied for a time between about 1 minute and about 60 minutes.

In preferred embodiments, the aqueous lithium salt solution 40 is selected from the group consisting of $Li_2SO_4$, $Li_2CO_3$, and combinations thereof. In preferred embodiments, the aqueous lithium salt solution 40 includes $Li_2SO_4$. In preferred embodiments, the lithium ion-selective membrane 50 comprises a polymeric matrix and a plurality of ion-conducting particles disposed within the polymeric matrix. In some embodiments, the lithium ion-selective membrane 50 includes a glass frit with lithium ion conducting particles disposed within.

FIG. 7 provides a double-sided lithium metal electrode, according to an embodiment of the disclosure. The double-sided lithium metal electrode 115 includes a conductive substrate 110, in the form of a plate having a first face and a second face. In preferred embodiments, the conductive substrate 115 is selected from the group consisting of copper, aluminum, graphite coated copper, and nickel. The first face and a second face of the conductive substrate 115 are coated with a layer of lithium metal, 160a and 160b, respectively, the lithium metal including no more than 5 ppm of non-metallic elements by mass. In some embodiments, the lithium metal includes no more than 1 ppm of non-metallic elements by mass. In some embodiments, the layer of lithium metal 160a, 160b has a thickness between about 1 micron and about 10 microns. The conductive substrate 110 and the layers of lithium metal 160a and 160b together comprise the double-sided lithium metal electrode 115, which is suitable for use as a fully charged working anode in a LMB. In some embodiments, the lithium metal electrode 115 has a specific capacity of greater than about 3800 mAh per gram of lithium metal. In some embodiments, the layers of lithium metal 160a, 160b each have a density of between about 0.4 g/cm³ and about 0.543 g/cm³. In some embodiments, the layers of lithium metal 160a, 160b each have a density of between about 0.45 g/cm³ and about 0.543 g/cm³.

In a method of manufacturing the double-sided lithium electrode 115 shown in FIG. 7, an electrolytic cell 105 is used, as shown in FIG. 8. During the manufacturing process, the electrolytic cell 105 of this embodiment is blanketed with a blanketing atmosphere 24, the blanketing atmosphere 24 being inert to chemical reaction with lithium. In some embodiments, the blanketing atmosphere includes no more than 10 ppm of lithium reactive components on a molar basis. In some embodiments, the blanketing atmosphere includes no more than 5 ppm of lithium reactive components on a molar basis. In some embodiments, the blanketing atmosphere includes no more than 10 ppm of nitrogen on a per molar basis. In some embodiments, the blanketing atmosphere includes no more than 5 ppm of nitrogen on a per molar basis. In some embodiments, the blanketing atmosphere includes no more than 1 ppm of nitrogen on a per molar basis. In a preferred environment, the blanketing atmosphere comprises argon with a purity of greater than 99.998 weight percent. In the embodiment of FIG. 8, the blanketing atmosphere 24 and the electrolytic cell 105 are enclosed in a gas-impermeable container 500. The cell 105 includes a first chamber 126a, a second chamber 128a, a third chamber 126b, and a fourth chamber 128b. The first chamber 126a contains a positive electrode 120a and an aqueous lithium salt solution 140a in contact with the positive electrode 120a and the third chamber 126b contains a positive electrode 120b and an aqueous lithium salt solution 140b in contact with the positive electrode 120b. The second chamber 128a and the fourth chamber 128b share the double-sided lithium metal electrode 115, which bounds the two chambers, the double-sided lithium metal electrode 115 including a central conductive substrate 110 having a first face and a second face, the first and the second faces electrodeposited with the layers of lithium metal 160a, 160b, respectively, with the layer of lithium metal 160a extending into the second chamber 128a, and the layer of lithium metal 160b extending into the fourth chamber. The second chamber 128a contains a lithium ion-selective membrane 150a, and a non-aqueous electrolyte 130a. The lithium ion-selective membrane 150a has a first side and a second side, and physically separates the first chamber 126a from the second chamber 128a, contacting the aqueous lithium salt solution 140a on the first side. In the second chamber 128a, the non-aqueous electrolyte 130a is disposed between the lithium metal layer 160a and the second side of the lithium ion-selective membrane 150a. The fourth chamber contains a lithium ion-selective membrane 150b, and a non-aqueous electrolyte 130b. The lithium ion-selective membrane 150b has a first side and a second side, and physically separates the third chamber 126b from the fourth chamber 128b, contacting the aqueous lithium salt solution 140b on the first side. In the fourth chamber 128b, the non-aqueous electrolyte 130b is disposed between the lithium metal layer 160b and the second side of the lithium ion-selective membrane 150b. The lithium ion-selective membranes 150a, 150b allow lithium ions to pass between first chamber 126a and the second chamber 128a, and between the third chamber 126b and the fourth chamber 128b, respectively, but preclude the passage of other chemical species between the first and second chambers 126a, 128a and between the third and the fourth chambers 126b, 128b, respectively.

In manufacturing the double-sided lithium metal electrode 115 embodied in FIG. 7 using the electrolytic cell 105, a variable voltage is applied across the positive electrodes 120a, 120b and the conductive substrate 110 of the electrolytic cell 105, in order to maintain a constant current, thereby causing lithium ions to move through the aqueous lithium salt solutions 140a, 140b, cross from the first and third chambers 126a, 126b to the second and fourth chambers 128a, 128b, respectively, through the respective lithium ion-selective membranes 150a, 150b, and into the non-aqueous electrolytes 130a, 130b, respectively, travel to the first and second faces of the conductive substrate 110, where each lithium ion gains an electron, thereby causing layers of elemental lithium 160a, 160b to be electrodeposited, respectively, on the first face and the second face of the conductive substrate 110, thereby forming the double-sided lithium metal electrode 115. During electrodeposition of the lithium metal layers 160a, 160b onto the first face and the second face of the conductive substrate 110, the conductive substrate 110 remains stationary.

In some embodiments, the first and third chambers 126a, 126b of the electrolytic cell 105 of FIG. 7 are flow chambers, with entrance ports 170a, 170b and exit ports 180a, 180b allowing aqueous lithium salt solutions 140a, 140b to enter the first chamber 126a and the third chamber 126b to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 140a, 140b is selected from the group consisting of $Li_2SO_4$, $Li_2CO_3$, and combinations thereof. In preferred embodiments, the aqueous lithium salt solution 140a, 140b includes $Li_2SO_4$. In preferred embodiments, the lithium ion-selective membrane 150a, 150b comprises a polymeric matrix and a plurality of ion-conducting particles disposed within the polymeric matrix. In some embodiments, the lithium ion-selective membrane 150a, 150b includes a glass frit with lithium ion conducting particles disposed within.

FIG. 9 provides a galvanic cell 225 manufactured with a single-sided lithium metal electrode 215 configured to function as an anode. The lithium metal electrode 215 includes a conductive substrate 210, bonded to a layer of lithium metal 260, the lithium metal including no more than 5 ppm of non-metallic elements by mass. In some embodiments, the lithium metal includes no more than 1 ppm of non-metallic elements by mass. In some embodiments, the lithium metal includes no more than 1 ppm of nitrogen by mass. The conductive substrate 210 and the layer of lithium metal 260 together comprise the single-sided lithium metal electrode 215, of the galvanic cell 225. In some embodiments, the lithium metal electrode 215 has a specific capacity of greater than about 3800 mAh per gram of lithium metal. In some embodiments, the layer of lithium metal 60 has a density of between about 0.4 g/cm$^3$ and about 0.534 g/cm$^3$. In some embodiments, the layer of lithium metal 260 has a density of between about 0.45 g/cm$^3$ and about 0.543 g/cm$^3$. In preferred embodiments, the conductive substrate is selected from the group consisting of copper, aluminum, graphite coated copper, and nickel. The layer of lithium metal 260 has a first face and a second face and is bonded on the first face to the conductive substrate 210 and on the second face to the lithium ion-selective membrane 250. The lithium ion-selective membrane 250, is configured to function as a solid state electrolyte. The lithium ion-selective membrane 250 separates the layer of lithium metal 260 from a catholyte 290. In preferred embodiments, the catholyte 290 includes ionic liquid-forming salts. In preferred embodiments, the catholyte 290 comprises an ionic liquid. The catholyte 290 in turn separates the lithium ion-selective membrane 250 from a cathode/catholyte interface 295, which covers a face of a cathode 235, separating the cathode 235 from the catholyte 290. Electrical contacts to the anode 245 allow electrons to flow from the electrode 215 to corresponding electrical contacts to the cathode 255, and then on to the cathode 235. In this configuration, the lithium ion-selective membrane 250 is configured to function as a solid state electrolyte. During discharge of the battery, the layer of pure lithium metal is oxidized to lithium ions, releasing electrons which flow through the electrical contacts 245, 255 from the single-sided electrode 215 to the cathode 235, and lithium ions, which flow through the lithium ion-selective membrane 250 into the catholyte 290, and into the cathode 235, where electrons are taken up. In various embodiments, the catholyte 290 can include an organic cation and an inorganic ion, comprising a salt capable of forming an ionic liquid. In embodiments, the catholyte 290 comprises an ionic liquid. In embodiments, the catholyte 290 comprises lithium salts of an organic anion capable of forming ionic liquids, the organic anions selected from the group consisting of trifluoromethanesulfonyl-imide (TFSI), N-butyl-N-methylpyrrolidinium bis(trifluoromethanesulfonyl)imide (PyruTFSI), trifluoromethanesulfonyl-imide, bis(trifluoromethanesulfonyl)imide (LiTFSI), and 1-ethyl-3-methylimidazolium-bis(trifluoromethylsulfonyl) imide (EMI-TFSI). In some embodiments, the catholyte 290 comprises ionic liquid-forming salts dissolved in 1,3-dioxolane (DOL), 1,2 dimethoxyethane (DME), or tetraethylene glycol dimethyl ether (TEGDME). In an embodiment, the catholyte comprises concentrated (4.0-5.0 M) lithium bis(fluorosulfonyl)imide (LiFSI) in 1:1 DOL/DME.

Without being bound by theory, it is believed that elementally pure lithium metal chemically bonded to a substrate which is then chemically bonded to a lithium ion-selective membrane configured to function as a solid state electrolyte will eliminate impedance variations at the electrode/solid electrolyte separator interface, thereby minimizing dendrite formation.

In a method of manufacturing by electrodeposition the single-sided lithium electrode 215 of the galvanic cell 225 of FIG. 9, an electrolytic cell 205 is used. FIG. 10 shows the electrolytic cell 205 prior to electrodeposition and FIG. 11 shows the electrolytic cell following electrodeposition. According to the method, the electrolytic cell 205 is completely blanketed with a blanketing atmosphere 24, the blanketing atmosphere being inert to chemical reaction with lithium. In some embodiments, the blanketing atmosphere includes no more than 10 ppm of lithium reactive components on a molar basis. In some embodiments, the blanketing atmosphere includes no more than 5 ppm of lithium reactive components on a molar basis. In some embodiments, the blanketing atmosphere includes no more than 10 ppm of nitrogen on a per molar basis. In some embodiments, the blanketing atmosphere includes no more than 5 ppm of nitrogen on a per molar basis. In some embodiments, the blanketing atmosphere includes no more than 1 ppm of nitrogen on a per molar basis. In a preferred environment, the blanketing atmosphere comprises argon with a purity of greater than 99.998 weight percent. In the embodiment of FIGS. 10 and 11, the blanketing atmosphere 24 and the electrolytic cell 5 are enclosed in a gas-impermeable container 500. During the process of electrodeposition, the electrolytic cell 205 is confined to the blanketing atmosphere 24.

The electrolytic cell 205 includes a conductive substrate 210, configured as a negative electrode, an ion-selective membrane 250, an aqueous lithium salt solution 240, and a positive electrode 220. The aqueous lithium salt solution 240 is interposed between the conductive substrate 210 and the positive electrode 220. Prior to electrodeposition, as shown in FIG. 10, the lithium ion-selective membrane 250 covers the conductive substrate 210, and forms a barrier separating the lithium salt solution 240 and the conductive substrate 210. Prior to electrodeposition, as shown in FIG. 10, the conductive substrate 210 is physically coated with a lithium ion-selective membrane 250, configured to function as a solid state electrolyte. After electrodeposition, as shown in FIG. 11, a layer of lithium metal 260 is electrodeposited between the conductive substrate 210 and the lithium ion-selective membrane 250, bonding to both the conductive substrate 210 and to the lithium ion-selective membrane 250. During the process of electrodeposition, the lithium ion-selective membrane 250 separates the conductive substrate 210 and the electrodeposited lithium metal layer 260 from the lithium salt solution 240. The lithium ion-selective membrane 250 is configured to function as a solid state electrolyte, allowing the passage of lithium ions from the aqueous salt solution 240 to electrodeposit onto the surface of the conductive substrate 210, but precluding the passage of other chemical species.

In manufacturing the single-sided lithium metal electrode 215 for the galvanic cell embodied in FIG. 9, a variable voltage is applied across the positive electrode 220 and the conductive substrate 210 of the electrolytic cell 205, in order to maintain a constant current, thereby causing lithium ions to move through the aqueous lithium salt solution 240, through the lithium ion-selective membrane 250, travel to the surface of the conductive substrate 210, where each lithium ion gains an electron, thereby electrodepositing a layer of elemental lithium 260 onto the conductive substrate 210, the layer of elemental lithium thus forming and bonding to the conductive substrate on a first side of the layer of elemental lithium 260 and the lithium ion-selective membrane 250 on a second side of the layer of elemental lithium 260. In this manner, as shown in FIGS. 10 and 11, the single-sided lithium metal electrode 215 is manufactured so that a sandwich of the layer of lithium metal 260 is formed between the conductive substrate 210 and the lithium ion-selective membrane 250. During the process of electrodeposition, the conductive substrate 210 is stationary in the electrolytic cell.

In some embodiments, the electrolytic cell 205 of FIG. 10 is a flow chamber, with an entrance port 270 and an exit port 280 allowing aqueous lithium salt solution 240 to enter the electrolytic cell 205 to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 240 is selected from the group consisting of $Li_2SO_4$, $Li_2CO_3$, and combinations thereof. In preferred embodiments, the aqueous lithium salt solution 240 includes $Li_2SO_4$. In preferred embodiments, the lithium ion-selective membrane 250 comprises a polymeric matrix and a plurality of ion-conducting particles disposed within the polymeric matrix. In some embodiments, the lithium ion-selective membrane 250 includes a glass frit with lithium ion conducting particles disposed within.

In an alternative method of manufacturing by electrodeposition the single sided lithium electrode 215 of the galvanic cell 225 of FIG. 9, the electrolytic cell 5 of FIG. 6 is used. According to this method, the lithium ion-selective membrane 50 and the conductive substrate 10 both remain stationary in the electrolytic cell. A variable voltage is applied across the positive electrode 20 and the conductive substrate 10 of the electrolytic cell 5, in order to maintain a constant current, thereby causing lithium ions to move through the aqueous lithium salt solution 40, cross from the first chamber 26 to the second chamber 28, through the lithium ion-selective membrane 50, into the non-aqueous electrolyte, travel to the surface of the conductive substrate 10, where each lithium ion gains an electron, thereby causing the layer of elemental lithium 60 to be electrodeposited on the conductive substrate 10. As the layer of elemental lithium 60 grows, it displaces non-aqueous electrolyte 30 from the second chamber 28, eventually coming into contact with and bonding to the lithium ion-selective membrane 50, thereby forming the single-sided lithium metal electrode 215 of FIG. 9, comprising the conductive substrate 10 and the layer of lithium 60, wherein the layer of lithium 60 is bonded on one face to the conductive substrate 10 and on the other face to the lithium ion-selective membrane 50, which is configured to function as a solid state electrolyte.

FIG. 12 provides a galvanic cell 325 manufactured with a double-sided lithium metal electrode 315, configured to function as an anode. The double-sided lithium metal electrode 315 includes a conductive substrate 310, in the form of a plate having a first face and a second face, with the first face and the second face bonded to first and second lithium metal sheets, 360a and 360b, respectively, the lithium metal including no more than 5 ppm of non-metallic elements by mass. In some embodiments, the lithium metal includes no more than 1 ppm of non-metallic elements by mass. In some embodiments, the lithium metal includes no more than 1 ppm of nitrogen by mass. The conductive substrate 310 and the first and second layers of lithium metal, 360a, 360b, respectively, together comprise the double-sided lithium metal electrode 315 of the galvanic cell 325. In some embodiments, the lithium metal electrode 315 has a specific capacity of greater than about 3800 mAh per gram of lithium metal. In some embodiments, the first and the second layers of lithium metal 360a, 360b, each has a density of between about 0.4 g/cm$^3$ and about 0.534 g/cm$^3$. In some embodiments, the layers of lithium metal 360a, 360b, each has a density of between about 0.45 g/cm$^3$ and about 0.543 g/cm$^3$. In preferred embodiments, the conductive substrate is selected from the group consisting of copper, aluminum, graphite coated copper, and nickel. Each layer of lithium metal 360a, 360b has a first face and a second face and is bonded on the first face to the conductive substrate 310 and on the second face to the lithium ion-selective membrane 350a, 350b, respectively. The lithium ion-selective membranes 350a, 350b, are configured to function as solid state electrolytes. The lithium ion-selective membrane 350a separates the layer of lithium metal 360a from a catholyte 390a. In preferred embodiments, the catholyte 390a includes ionic liquid-forming salts. In preferred embodiments, the catholyte 390a comprises an ionic liquid. The catholyte 390a in turn separates the lithium ion-selective membrane 350a from a cathode/catholyte interface 395a, which covers a face of a cathode 335a, separating the cathode 335a from the ionic liquid 390a. The lithium ion-selective membrane 350b separates the layer of lithium metal 360b from a catholyte 390b. In preferred embodiments, the catholyte 390b includes ionic liquid-forming salts. In preferred embodiments, the catholyte 390b comprises an ionic liquid. The catholyte 390b in turn separates the lithium ion-selective membrane 350b from a cathode/catholyte interface 395b, which covers a face of a cathode 335b, separating the cathode 335b from the ionic liquid 390b.

An electrical contact to the anode 345 allows electrons to flow from the electrode 315 to corresponding electrical contacts to the two cathodes 355a, 355b and then on to the cathodes 335a, 335b, respectively. During discharge of the battery, the layers of pure lithium metal 360a, 360b are oxidized to lithium ions, releasing electrons which flow through the electrical contact 345, through the electrical contacts 355a, 355b from the double-sided electrode 315 to the cathodes 335a, 335b and lithium ions, which flow through the lithium ion-selective membranes 350a, 350b into the ionic liquids 390a, 390b, and into the cathodes, 335a, 335b, where they intercalate into the cathodes 335a, 335b where electrons are taken up. In various embodiments, the catholyte can include an organic cation and an inorganic ion, comprising a salt capable of forming an ionic liquid. In various embodiments, the catholytes 390a, 390b can include an organic cation and an inorganic ion, comprising a salt capable of forming an ionic liquid. In embodiments, the catholytes 390a, 390b comprise an ionic liquid. In embodiments, the catholytes 390a, 390b comprise lithium salts of an organic anion capable of forming ionic liquids, the organic anions selected from the group consisting of trifluoromethanesulfonyl-imide (TFSI), N-butyl-N-methylpyrrolidinium bis(trifluoromethanesulfonyl)imide (PyruTFSI), trifluoromethanesulfonyl-imide, bis(trifluoromethanesulfonyl)imide (LiTFSI), and 1-ethyl-3-methylimidazolium-bis(trifluoromethylsulfonyl)imide (EMI-TFSI). In some embodiments, the catholytes 390a, 390b comprise ionic liquid-forming salts dissolved in 1,3-dioxolane (DOL), 1,2 dimethoxyethane (DME), or tetraethyl ene glycol dimethyl ether (TEGDME). In an embodiment, the catholytes 390a, 390b comprise concentrated (4.0-5.0 M) lithium bis(fluorosulfonyl)imide (LiFSI) in 1:1 DOL/DME.

Without being bound by theory, it is believed that elementally pure lithium metal chemically bonded to a substrate which is then chemically bonded to a lithium ion-selective membrane configured to function as a solid state electrolyte will eliminate impedance variations at the electrode/solid electrolyte separator interface, thereby minimizing dendrite formation.

In a method of manufacturing by electrodeposition the double-sided lithium electrode 315 of the galvanic cell 325 of FIG. 12, an electrolytic cell 305 is used. FIG. 13 shows the electrolytic cell 305 prior to electrodeposition and FIG. 14 shows the electrolytic cell following electrodeposition. According to the method, the electrolytic cell 305 is completely blanketed with a blanketing atmosphere 24, the blanketing atmosphere being inert to chemical reaction with lithium. In some embodiments, the blanketing atmosphere includes no more than 10 ppm of lithium reactive components on a molar basis. In some embodiments, the blanketing atmosphere includes no more than 5 ppm of lithium reactive components on a molar basis. In some embodiments, the blanketing atmosphere includes no more than 10 ppm of nitrogen on a per molar basis. In some embodiments, the blanketing atmosphere includes no more than 5 ppm of nitrogen on a per molar basis. In some embodiments, the blanketing atmosphere includes no more than 1 ppm of nitrogen on a per molar basis. In a preferred environment, the blanketing atmosphere comprises argon with a purity of greater than 99.998 weight percent. In the embodiment of FIGS. 13 and 14, the blanketing atmosphere 24 and the electrolytic cell 5 are enclosed in a gas-impermeable container 500. During the process of electrodeposition, the electrolytic cell 305 is confined to the blanketing atmosphere 24.

The electrolytic cell 305 includes a first chamber 326a, and a second chamber 326b, the first chamber having a proximal end and a distal end, and the second chamber having a proximal and a distal end. Contiguous to and separating the first chamber 326a from the second chamber 326b is the conductive substrate 310, the conductive substrate 310 having a first side facing the first chamber 326a and a second side facing the second chamber 326b. Prior to electrodeposition, as embodied in FIG. 13, the first side and the second side of the conductive substrate 310 are coated with, respectively, a first lithium ion-selective membrane 350a configured to function as a solid state electrolyte, extending into the proximal end of the first chamber 326a, and a second lithium ion-selective membrane 350b, configured to function as a solid state electrolyte, extending into the proximal end of the second chamber 326b. At their distal ends, the first chamber 326a and the second chambers, 326b contain, respectively, positive electrodes 320a and 320b. The positive electrode 320a and the first lithium ion-selective membrane 350a are separated by an aqueous salt solution 340a, the aqueous salt solution 340a physically contacting both the positive electrode 320a and the lithium ion-selective membrane 350a. In a like manner, the positive electrode 320b and the first lithium ion-selective membrane 350b are separated by an aqueous salt solution 340b, the aqueous salt solution 340b physically contacting both the positive electrode 320b and the lithium ion-selective membrane 350b.

After electrodeposition, as shown in FIG. 14, layers of lithium metal, 320a, 320b, are electrodeposited between the conductive substrate 310 and the lithium ion-selective membranes, 350a, 350b, respectively, the layers of lithium metal 320a, 320b, bonding to the conductive substrate 310 and the lithium ion-selective membranes 350a, 350b, respectively.

During the process of electrodeposition, the lithium ion-selective membranes 350a, 350b, separate the conductive substrate 310 and the electrodeposited lithium metal layers 360a, 360b, respectively, from the lithium salt solutions 340a, 340b.

The lithium ion-selective membranes 350a, 350b are configured function as solid state electrolytes, allowing lithium ions to pass between the aqueous lithium salt solutions 340a, 340b, and the conductive substrate 310, but preventing the passage of other chemical species.

In manufacturing the double-sided lithium metal electrode 315 for the galvanic cell embodied in FIG. 12, a variable voltage is applied across the positive electrodes 320a, 320b and the conductive substrate 310 of the electrolytic cell 305, in order to maintain a constant current, thereby causing lithium ions to move through the aqueous lithium salt solutions 340a, 340b, respectively, through the lithium ion-selective membranes 350a, 350b, respectively, travel to the surface of the conductive substrate 310, where each lithium ion gains an electron, thereby electrodepositing the layers of elemental lithium 360a, 360b onto the first side and the second side, respectively, of the conductive substrate 310, the layers of elemental lithium 360a, 360b thus forming and bonding to the conductive substrate 310 and, respectively, to the lithium ion-selective membranes 350a, 350b. In this manner, as shown in FIGS. 13 and 14, the double-sided lithium metal electrode 315 is manufactured as a sandwich with a central conductive substrate 310 bounded on opposite sides by layers of elemental lithium 360s, 360b, the layers of elemental lithium 360a, 360b in turn bounded by layers of lithium ion-selective membrane 350a, 350b. During the process of electrodeposition, the conductive substrate 310 is stationary in the electrolytic cell.

In some embodiments, the first and second chambers 326a, 326b of the electrolytic cell 305 of FIGS. 13 and 14 are flow chambers, with entrance ports 370a, 370b and exit ports 380a, 380b allowing aqueous lithium salt solutions 340a, 340b to enter the first chamber 326a and the second chamber 326b to provide a renewable supply of lithium ions for electrodepositing.

In preferred embodiments, the constant current is between about 10 mA/cm$^2$ and about 50 mA/cm$^2$. In preferred embodiments, the constant current applied is about 25 mA/cm$^2$ to about 50 mA/cm$^2$. In preferred embodiments, the constant current applied is about 40 mA/cm$^2$ to about 50 mA/cm$^2$. In preferred embodiments, the constant current is applied for a time between about 1 minute and about 60 minutes.

In preferred embodiments, the aqueous lithium salt solution 340a, 340b is selected from the group consisting of $Li_2SO_4$, $Li_2CO_3$, and combinations thereof. In preferred embodiments, the aqueous lithium salt solution 340a, 340b includes $Li_2SO_4$. In preferred embodiments, the lithium ion-selective membrane 350a, 350b comprises a polymeric matrix and a plurality of ion-conducting particles disposed within the polymeric matrix. In some embodiments, the lithium ion-selective membrane 350a, 350b includes a glass frit with lithium ion conducting particles disposed within.

In an alternative method of manufacturing by electrodeposition the double sided lithium electrode 315 of the galvanic cell 325 of FIG. 12, the electrolytic cell 105 of FIG. 8 is used. According to this method, the lithium ion-selective membranes 150a, 150b and the conductive substrate 110 each remain stationary in the electrolytic cell. A variable voltage is applied across the positive electrodes 120a, 120b and the conductive substrate 110 of the electrolytic cell 105, in order to maintain a constant current, thereby causing lithium ions to move through the aqueous lithium salt solutions 140a, 140b, cross from the first and fourth chambers 126a, 126b to the second and third chambers 128a, 128b, respectively, through the lithium ion-selective membranes 150a, 150b, into the non-aqueous electrolytes 130a, 130b, travel to the first and the second faces of the conductive substrate 110, where each lithium ion gains an electron, thereby causing layers of elemental lithium 160a, 160b to be electrodeposited on the conductive substrate 110. As the layers of elemental lithium 160a, 160b grow, they displace non-aqueous electrolytes 130a, 130b from the second and third chambers 128a, 128b, respectively, eventually coming into contact with and bonding to the lithium ion-selective membranes 150a, 150b, thereby forming the double-sided lithium metal electrode 315 of FIG. 12, comprising the conductive substrate 110 and the layers of lithium 160a, 160b, wherein the layers of lithium 160a, 160b are bonded, respectively on the first and second faces of the conductive substrate 110 and to the lithium ion-selective membranes 150a, 150b, wherein the lithium ion-selective membranes 150a, 150b, are configured to function as solid state electrolytes.

In preferred embodiments, the lithium metal electrodes described herein can be integrated into batteries, including but not limited to the batteries embodied in FIGS. 9 and 12.

The methods described above are well-suited for vertically integrated battery production, thereby allowing for a supply chain for LMB production that is regionally controlled in any region where lithium is mined (for example, in the US). The development of such a local regional supply chain greatly reduces costs, and provides LMBs that are inherently cobalt free.

A typical fabrication facility for lithium ion batteries according to the prior art is shown in FIG. 15. Manufacturing stages involve fabrication of anodes 401 and cathodes 403, cell assembly and cell finishing and testing. Anodes 401 and cathodes 403 follow parallel tracks involving mixing 402 to form a slurry, coating 404 onto conductive foil, pressing 406 to bond coating to foil, and slitting 408 to form desired electrode dimensions. Following roll formation 410, cells are assembled 420, filled with electrolyte and sealed 430. Because LIB cells are manufactured in a fully discharged state, the final stage of the process involves cell finishing, a time-consuming that may include steps of charge and discharge 440, degassing and final sealing 450, further charge and discharge 460 and finally aging 480. Because of the multiple, time-consuming steps, the finishing process can take between 20-30 days.

According to the embodiments described above, lithium metal electrodes can be fabricated in situ, thereby providing lithium metal anodes for LMBs in a fully charged state. According to the embodiment of FIG. 16, the processes described above for lithium metal anode fabrication can be vertically integrated into a cost- and energy-efficient manufacturing method for LMBs. As embodied in FIG. 16, the cathode 403 is still manufactured by conventional methods involving mixing 402, coating 404, and pressing 406. However, the working anode is now formed by electrolysis 405 according to the process embodied in FIG. 4, involving blanketing an electrolytic cell with a blanketing atmosphere 2, applying constant current to the cell 4, flowing Li across a lithium selective membrane 6, reducing Li to Li metal 8, and fabricating a Li metal battery 12, by steps involving pouch formation 412, cell assembly 420, cell filling and sealing 430, and finishing steps 490. Cell assembly 420 includes the steps of assembling a casing with contents including the working anode, and other components to form a lithium metal battery, and sealing the casing to isolate the contents from reactants present in the air.

As embodied in FIG. 16, LMB manufacture according to the current disclosure is a vertically integrated process that replaces the anode fabrication process by an in situ low-temperature electrodeposition process, utilizing as feedstock an aqueous lithium salt solution, where the electrodeposition occurs through a lithium ion-selective membrane to produce a highly pure lithium metal anode, resistant to dendrite formation. Because lithium metal negative electrodes are fabricated in a fully charged state, the lengthy formation process required for lithium ion batteries is not required.

Because of the use of the lithium ion-selective membrane, and the high current densities, a relatively inexpensive impure feed such as $Li_2SO_4$ can be used for electrodeposition, saving energy and reducing costs. Impurities in the lithium metal anodes are further reduced by performing the electrodeposition entirely in a blanketing atmosphere, substantially depleted of lithium reactive components including nitrogen, oxygen, ozone, oxides of nitrogen, sulfur and phosphorous, carbon dioxide, halogens, hydrogen halides, and water. In preferred embodiments, the inert atmosphere is purified argon gas. In some embodiments, steps following electrodeposition, including cell assembly, electrolyte/cell filling and sealing are also performed in the inert atmosphere. In other embodiments, only the lithium electrodeposition occurs under inert atmosphere, with remainder of battery manufacturing processes taking place in "dry air," where dry air refers to air with less than 1% RH (relative humidity) (−45° C. dew point). In preferred embodiments, during LMB manufacture the temperature is kept between about 20° C. and about 30° C. In preferred embodiments, during LMB manufacture the temperature is kept between about 23° C. and about 27° C.

A variety of different LMB battery configurations are understood to be encompassed by the disclosure described above. FIG. 17 embodies a single-cell battery configuration 14, shown as manufactured with a battery case, showing electrical contacts to the anode 245 and to the cathode 255. FIG. 18 embodies a double-cell battery configuration 16, as manufactured with a battery case, showing a single electrical contact to the anode 245, and two electrical contacts 255a, 255b, to the cathode.

Figure 19:
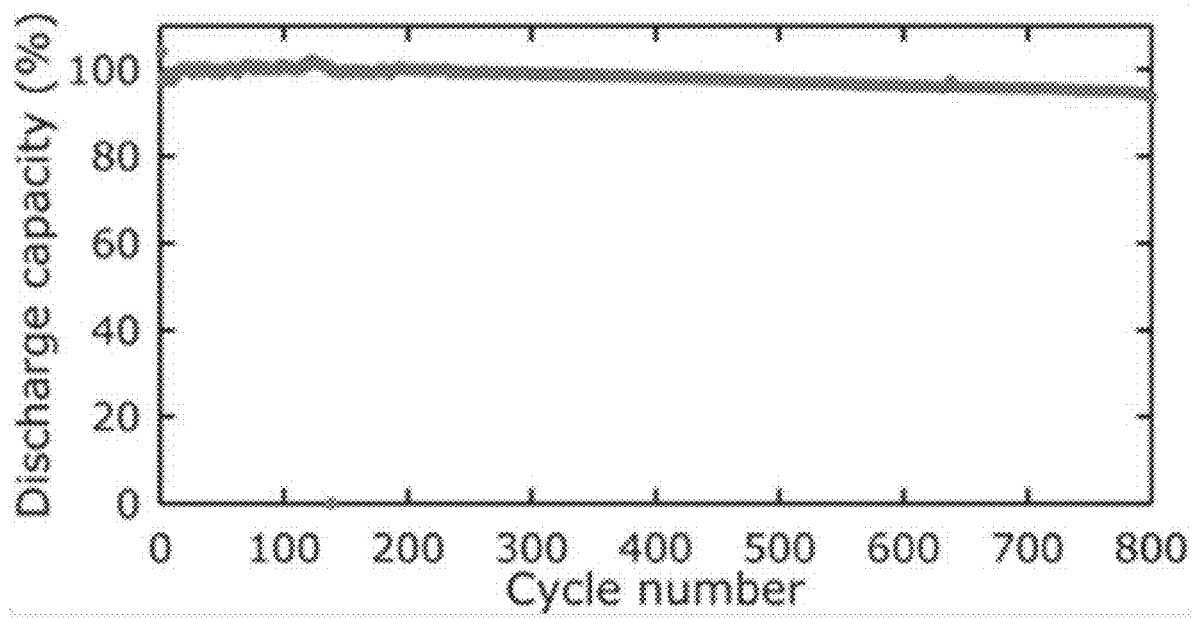
FIG. 19 shows a charge/discharge performance result of for a long term cycle performance of a full pouch cell manufactured according to embodiments of the present disclosure.

The experiments were carried out using electrochemical cells that incorporated the lithium metal electrodes, produced in accordance with the embodiments detailed in the present disclosure. As illustrated in FIG. 19, the long-term cycle performance of a full pouch cell was evaluated. The results showed that at least 97% of the discharge capacity continued to be maintained after about 800 cycles. Furthermore, throughout the measurement of these cycling evaluations, no dendrite formation or electrical shorting was detected, attesting to the high performance and safety of the lithium metal electrodes disclosed herein.

The embodiments of the disclosure described above are intended to be merely exemplary; numerous variations and modifications will be apparent to those skilled in the art. All such variations and modifications are intended to be within the scope of the present disclosure as defined in any appended claims.

What is claimed is:

1. A method for forming an energy storage device, comprising:
   (a) providing a device comprising a (i) conductive substrate and (ii) a lithium-ion selective membrane adjacent to the conductive substrate, wherein the lithium-ion selective membrane comprises a polymeric matrix and a plurality of ion-conducting particles disposed within the polymeric matrix; and
   (b) in an inert atmosphere, applying a current to the device, thereby flowing a plurality of lithium ions through the lithium-ion selective membrane towards the conductive substrate to form a layer of lithium metal coupled to the conductive substrate, thereby forming a negative electrode of the energy storage device, wherein the lithium-ion selective membrane allows passage of the plurality of lithium ions while substantially precluding passage of one or more non-metallic elements to the conductive substrate, and wherein the layer of lithium metal has (i) a density of at least 0.4 $g/cm^3$, (ii) a thickness between 1 micrometer and 50 micrometers, and (iii) a content of less than 300 parts-per-million (ppm) by mass of the one or more non-metallic elements,
   wherein the energy storage device comprises a positive electrode and the negative electrode, wherein the negative electrode comprises the layer of the lithium metal coupled to the conductive substrate, and wherein the lithium-ion selective membrane is disposed between the negative electrode and the positive electrode.

2. The method of claim 1, wherein the negative electrode has a specific capacity of at least about 3800 milliampere-hours per gram (mAh/g).

3. The method of claim 1, wherein the energy storage device is a rechargeable energy storage device.

4. The method of claim 1, further comprising using the energy storage device to provide electrical energy to a load operably coupled to the energy storage device.

5. The method of claim 1, wherein the current is from about 10 $mA/cm^2$ to about 50 $mA/cm^2$.

6. The method of claim 1, wherein the current is applied for a time duration between about 1 minute and about 60 minutes.

7. The method of claim 1, wherein the layer of lithium metal is electrodeposited on the conductive substrate using an aqueous lithium salt solution in proximity to the lithium-ion selective membrane.

8. The method of claim 7, wherein the aqueous lithium salt solution provides a source of the plurality of lithium ions.

9. The method of claim 7, wherein the aqueous lithium salt solution comprises LiCl, $Li_2SO_4$ or $Li_2CO_3$, or a combination thereof.

10. The method of claim 7, wherein the aqueous lithium salt solution is brine.

11. The method of claim 1, wherein the layer of lithium metal comprises (i) a first surface adjacent to the conductive substrate and (ii) a second surface adjacent to the lithium-ion selective membrane.

12. The method of claim 1, wherein the density of the layer of lithium metal is from about 0.45 g/cm$^3$ to about 0.543 g/cm$^3$.

13. The method of claim 1, wherein the conductive substrate comprises copper, aluminum, graphite coated copper, or nickel.

14. The method of claim 1, wherein the polymeric matrix comprises a silica-based polyurethane, polyethylene oxide, polystyrene, or polyamide.

15. The method of claim 1, wherein the polymeric matrix comprises an inorganic coating.

16. The method of claim 1, wherein the plurality of ion-conducting particles comprises a plurality of ceramic particles.

17. The method of claim 1, wherein the plurality of ion-conducting particles comprises LiFePO$_4$, LiCoO$_2$, NASICON electrolytes, lithium-lanthanum titanates (LLTO), garnet type electrolytes, LISICON and Thio-LISICON electrolytes, LizLa$_3$Zr$_3$O$_{12}$ (LLZO), or cubic phase c-LLZO.

18. The method of claim 1, wherein the layer of lithium metal is substantially free of the one or more non-metallic elements.

19. The method of claim 1, wherein the layer of lithium metal has a content of less than 5 ppm by mass of the one or more non-metallic elements.

20. The method of claim 1, wherein the one or more non-metallic elements comprises nitrogen, and wherein the layer of lithium metal has a content of less than 5 ppm of nitrogen.

21. The method of claim 1, wherein the layer of lithium metal is substantially free of Li$_3$N.

22. The method of claim 1, wherein the lithium-ion selective membrane substantially precludes passage of water to the conductive substrate.

23. The method of claim 1, wherein the inert atmosphere is inert to chemical reaction with lithium.

24. The method of claim 1, wherein the inert atmosphere includes no more than 10 ppm of lithium reactive components on a molar basis.

25. The method of claim 1, wherein the inert atmosphere includes no more than 5 ppm of lithium reactive components on a molar basis.

26. The method of claim 1, wherein the inert atmosphere includes no more than 10 ppm of nitrogen on a molar basis.

27. The method of claim 1, wherein the inert atmosphere includes no more than 5 ppm of nitrogen on a molar basis.

28. The method of claim 1, wherein the energy storage device is a battery.

29. The method of claim 28, wherein the negative electrode operates as an anode during discharge of the battery.

* * * * *